US008811897B2

(12) United States Patent
Matsumoto et al.

(10) Patent No.: US 8,811,897 B2
(45) Date of Patent: Aug. 19, 2014

(54) NEAR FIELD COMMUNICATION DEVICE AND METHOD OF CONTROLLING THE SAME

(75) Inventors: Michihiro Matsumoto, Kyoto (JP); Mitsuaki Oshima, Kyoto (JP); Masaru Yamaoka, Osaka (JP); Shohji Ohtsubo, Osaka (JP); Masao Nonaka, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 254 days.

(21) Appl. No.: 13/497,652

(22) PCT Filed: Jul. 22, 2011

(86) PCT No.: PCT/JP2011/004131
§ 371 (c)(1),
(2), (4) Date: Mar. 22, 2012

(87) PCT Pub. No.: WO2012/011289
PCT Pub. Date: Jan. 26, 2012

(65) Prior Publication Data
US 2012/0178367 A1 Jul. 12, 2012

(30) Foreign Application Priority Data
Jul. 23, 2010 (JP) ................................ 2010-166483

(51) Int. Cl.
*H04B 5/00* (2006.01)
(52) U.S. Cl.
USPC .... 455/41.1; 455/411; 455/343.1; 455/343.5; 455/461; 455/572; 235/439; 235/492; 320/108
(58) Field of Classification Search
CPC ................ H04W 52/0296; H04W 52/0254; H04W 52/0274; H04W 52/0277; H04W 52/028; H04W 52/0261

USPC ........... 455/41.1, 411, 343.1, 343.5, 461, 572
See application file for complete search history.

(56) References Cited

U.S. PATENT DOCUMENTS 7,775,442 B2 * 8/2010 Saarisalo ....................... 235/487
8,212,518 B2 * 7/2012 Pijnenburg et al. ........... 320/108
(Continued)

FOREIGN PATENT DOCUMENTS

| JP | 2000-020663 | 1/2000 |
| JP | 2004-272553 | 9/2004 |

(Continued)

OTHER PUBLICATIONS

International Search Report issued Sep. 6, 2011 in corresponding International (PCT) Application No. PCT/JP2011/004131.

*Primary Examiner* — Marceau Milord
(74) *Attorney, Agent, or Firm* — Wenderoth, Lind & Ponack, L.L.P.

(57) ABSTRACT

An NFC device according to the present invention includes the following units. An antenna unit receives radio waves from a reader/writer by NFC. A first power source unit generates power from the radio waves. A second power source unit is a drive power source. A power-supply state holding unit holds information indicating a power-supply state of the second power source unit. An NFC unit performs NFC via the antenna unit to transmit the information indicating the power-supply state of the second power source unit. A power source switch unit switches the second power source unit to the first power source unit according to the power-supply state of the second power source unit, in order to supply power to activate at least the NFC unit and the power-supply state holding unit.

12 Claims, 29 Drawing Sheets

(56) References Cited

U.S. PATENT DOCUMENTS

| | | | |
|---|---|---|---|
| 8,340,577 B2 * | 12/2012 | Griffin et al. | 455/41.2 |
| 8,351,854 B2 * | 1/2013 | Moosavi | 455/41.1 |
| 8,358,596 B2 * | 1/2013 | Byrne et al. | 370/255 |
| 8,502,497 B2 * | 8/2013 | Pijnenburg et al. | 320/108 |
| 8,509,808 B2 * | 8/2013 | Krutt et al. | 455/456.1 |
| 8,532,704 B2 * | 9/2013 | Ma et al. | 455/557 |
| 8,559,872 B2 * | 10/2013 | Butler | 455/41.1 |
| 2008/0090595 A1 * | 4/2008 | Liu et al. | 455/461 |
| 2010/0117807 A1 * | 5/2010 | Yokoo | 340/10.5 |

FOREIGN PATENT DOCUMENTS

| | | |
|---|---|---|
| JP | 2006-054757 | 2/2006 |
| JP | 2006-287536 | 10/2006 |
| JP | 2006-293943 | 10/2006 |
| JP | 2007-104514 | 4/2007 |
| JP | 2007-133556 | 5/2007 |
| WO | 2009/019735 | 2/2009 |

* cited by examiner

FIG. 11

| Power-Supply State to be Notified | Control Unit Power-Supply State Detection Unit | Control Unit Power-Supply State Recording Unit |
|---|---|---|
| Activation Impossible State | Impossible to detect power supply | Power-OFF State |
| Activation Impossible State | Impossible to detect power supply | Power-ON State |
| Power-OFF State | Possible to detect power supply | Power-OFF State |
| Power-ON State | Possible to detect power supply | Power-ON State |

NEAR FIELD COMMUNICATION DEVICE AND METHOD OF CONTROLLING THE SAME

TECHNICAL FIELD

The present invention relates to Near Field Communication (NFC) devices that perform communication by NFC and methods of controlling the NFC devices.

BACKGROUND ART

Near Field Communication (NFC) is a communication scheme applied in noncontact Integral Circuit (IC) cards (smart cards), Radio Frequency IDentificaiton (RF-ID), and the like. NFC has the following three characteristics. First, NFC has a short communication distance, approximately several centimeters. Therefore, only devices at a close distance can communicate with each other, so that the communicating devices can easily and instinctively detect each other. Second, setting for the communication (NFC) is not necessary. Since NFC has a short communication distance, a possibility of interference is low. NFC can be therefore used without setting such as pairing in Bluetooth or Service Set IDentifier (SSID) setting in wireless LAN. Third, in NFC, a device can supply power to another device. Since a device (such as a reader/writer in the case of a noncontact IC card) can supply power to another device (such as a noncontact IC card), NFC can be applied to IC cards not having a battery or the like.

For example, one of existing services using NFC is an electronic ticket system such as "SuiCa" used in East Japan Railway Company. In this system, a value is previously charged into a noncontact IC card at an automatic ticket vending machine, a card vending machine, or the like. Then, in boarding, the noncontact IC card is touched to an automatic ticket gate to pay a value corresponding to a transport zone. Such a noncontact IC card generally does not have a battery. The card is activated by power supplied from the automatic ticket vending machine, the automatic ticket gate, and the like. NFC is performed between the noncontact IC card and the automatic ticket vending machine, the automatic ticket gate, or the like. As a result, value charging, fare payment, and the like are executed. One of devices having the NFC function besides a noncontact IC card and RF-ID is a mobile phone that has already been commercialized. For example, a mobile phone having the NFC function serves as a noncontact IC card (smart card) to execute electronic money payment/settlement or credit payment/settlement. In addition, NFC can be used as communication between mobile phones having NFC function. In this case, by holding a mobile phone over another mobile phone, the mobile phones can exchange data such as an address book or an image. Here, a device having a power source, such as a mobile phone, generally uses the power source to supply power to an NFC unit without receiving power from a reader/writer (see Patent Literature 1, for example).

On the other hand, it is expected that various devices (apparatuses) such as air conditioners and microwaves which have not yet been connected to a network have a difficulty in being connected to a network, even if they are provided with functions such as wireless LAN in the future, because they do not have adequate display or input functions necessary for wireless LAN setting. However, if the NFC function is provided to these various devices, further service deployments can be expected. One example is given below.

FIG. 25 is a diagram showing an example of a configuration of a system including a conventional NFC device. This is one example of possible future systems using NFC. The system shown in FIG. 25 includes an NFC device 2031, a reader/writer 2302, and a server 2303.

Likewise a mobile phone or the like, the reader/writer 2302 has an NFC function and a function of connecting the reader/writer 2302 to the Internet 2305. Examples of the NFC device 2301 are an air conditioner, a microwave, and the like. The NFC device 2301 has the NFC function but does not have a function of connecting the NFC device 2301 to the Internet 2305. The server 2303 is on the Internet 2305. The server 2303 has a manual database (DB) 2304a in which data of a manual of the NFC device 2301 is stored, an error code DB 2304b in which error codes of the NFC device 2301 are stored, and the like.

In the system having the above-described configuration, the reader/writer 2302 receives information such as a type or model of the NFC device 2301 by using NFC, thereby obtains a corresponding manual of the NFC device 2301 from the server 2303, and then displays the manual. As described above, it is possible to provide a user with information relating to the NFC device 2301, via the reader/writer 2302.

FIG. 26 shows an example of a structure of the NFC device in FIG. 25. The NFC device 2301 shown in FIG. 26 includes an antenna unit 2401, a modulation/demodulation unit 2404 that modulates and demodulates NFC, an NFC control unit 2403 that controls NFC, a power source unit 2404, a system control unit 2405, and a clock generation unit 2406.

The power source unit 2404 supplies power to the system control unit 2405, the NFC control unit 2403, the modulation/demodulation unit 2402, and the antenna unit 2401.

The clock generation unit 2406 sends a clock signal to the system control unit 2405, the NFC control unit 2403, the modulation/demodulation unit 2402, and the antenna unit 2401.

The system control unit 2405 controls original functions of the NFC device 2301. In the case where the NFC device 2301 is, for example, an air conditioner, the system control unit 2405 controls a blast fan or a compressor to cool or warm air. The system control unit 2405 also communicates with the reader/writer 2302 via the NFC control unit 2403, the modulation/demodulation unit 2402, and the antenna unit 2401, in order to, for example, send information such as a type or model of the NFC device back to the reader/writer 2302 in response to an inquiry from the reader/writer 2302.

CITATION LIST

Patent Literature

[PTL 1] Japanese Unexamined Patent Application Publication No. 2007-104514

SUMMARY OF INVENTION

Technical Problem

However, if service for providing an NFC function as a communication module to devices (NFC devices 2301) such as an air conditioner and a microwave is to be achieved as shown in the system in FIG. 25, these devices (NFC devices 2301) should be powered ON but their power sources of the devices are sometimes OFF. For example, in practical use, there would be a situation where an air conditioner is not plugged in an outlet in order not to save standby energy in summer or in seasons except winter. Furthermore, for example, if the device (NFC device 2301) has a trouble, there would be a situation where a power source itself of the device cannot be turned ON.

In the case where power is not supplied to the device as described above, even if the NFC terminal (reader/writer 2302) is held over the NFC device (NFC device 2301), the NFC terminal cannot detect existence of the NFC device and fails to obtain information from the NFC device.

In order to address the above problem, Patent Literature 1 discloses a technique of detecting a power-supply state of the NFC device 2301 and lighting a Light-Emitting Diode (LED) or the like to notify the user of the power-supply state. However, the technique requires user operations to cause a trigger for the detection.

In order to address the above-described problems, an object of the present invention is to provide an NFC device that enables a reader/writer to obtain information indicating a power-supply state of the NFC device, however the power-supply state of the NFC device is.

Solution to Problem

In accordance with an aspect of the present invention for achieving the object, there is provided an Near Field Communication (NFC) device that performs NFC with a reader/writer, the NFC device including: an antenna unit configured to receive radio waves from the reader/writer by NFC; a first power source unit configured to generate power from the radio waves received by the antenna unit; a second power source unit that is a drive power source different from the first power source unit; a power-supply state holding unit configured to hold information indicating a power-supply state of the second power source unit; and an NFC unit configured to perform NFC with the reader/writer via the antenna unit to transmit the information indicating the power-supply state of the second power source unit to the reader/writer, the information being held in the power-supply state holding unit; and a power source switch unit configured to switch the second power source unit to the first power source unit according to the power-supply state of the second power source unit, in order to supply power to activate at least the NFC unit and the power-supply state holding unit, wherein the power source switch unit is configured to switch the second power source unit to the first power source unit, when the information indicates that the second power source unit is powered OFF.

With the above structure, if the second power source unit is ON, the power-supply state holding unit is activated by power supplied from the second power source unit. On the other hand, even in the situation where power is not supplied from the second power source unit (for example, even if the second power source unit is OFF), if an external reader/writer is approached to the NFC device for NFC, the first power source unit generates power from radio waves supplied from the external reader/writer, and thereby the power-supply state holding unit is activated by receiving power from the first power source unit. Therefore, the external reader/writer can obtain information of a power-supply state of the NFC device from the power-supply state holding unit, regardless whether the second power source unit is ON or OFF.

Advantageous Effects of Invention

According to the present invention, it is possible to provide an NFC device that enables a reader/writer to obtain information indicating a power-supply state of the NFC device, however the power-supply state of the NFC device is.

For example, even if a power source of the NFC device is OFF to save energy, the reader/writer can obtain a power-supply state of the NFC device.

BRIEF DESCRIPTION OF DRAWINGS

FIG. 11 is a table showing a relationship among (a) a state of a power-supply state detection unit, (b) a power-supply state held in a power-supply state recording unit, and (c) a power-supply state to be notified by an NFC control unit.

DESCRIPTION OF EMBODIMENTS

The following describes embodiments of the present invention with reference to the drawings.

Embodiment 1

Figure 1:
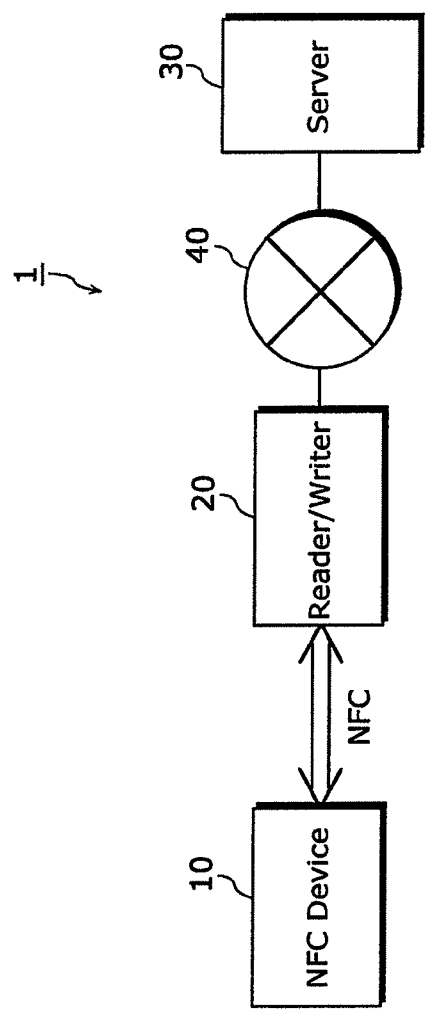
FIG. 1 is a diagram showing an example of a configuration of a system including a NFC device according to embodiments of the present invention.

FIG. 1 is a diagram showing an example of a configuration of a system including an NFC device according to embodiments of the present invention. The system shown in FIG. 1 includes an NFC device 10, a reader/writer 20, and a server 30.

Likewise a mobile phone, the reader/writer 20 has an NFC function and a function of connecting the reader/writer 20 to the Internet 40.

Examples of the NFC device 10 are an air conditioner, a microwave, and the like. The NFC device 10 has the NFC function but does not have a function of connecting the NFC device 10 to the Internet 40.

The server 30 is on the Internet 40. The server 30 has a database in which information regarding the NFC device 10 is stored.

In the system 1 having the above-described configuration, the reader/writer 20 receives information such as a type or model of the NFC device 10 by using NFC, thereby obtains corresponding information such as a manual of the NFC device 10 from the server 30, and then displays the obtained information. As described above, it is possible to provide a user with information regarding the NFC device 10, via the reader/writer 20.

Figure 2:
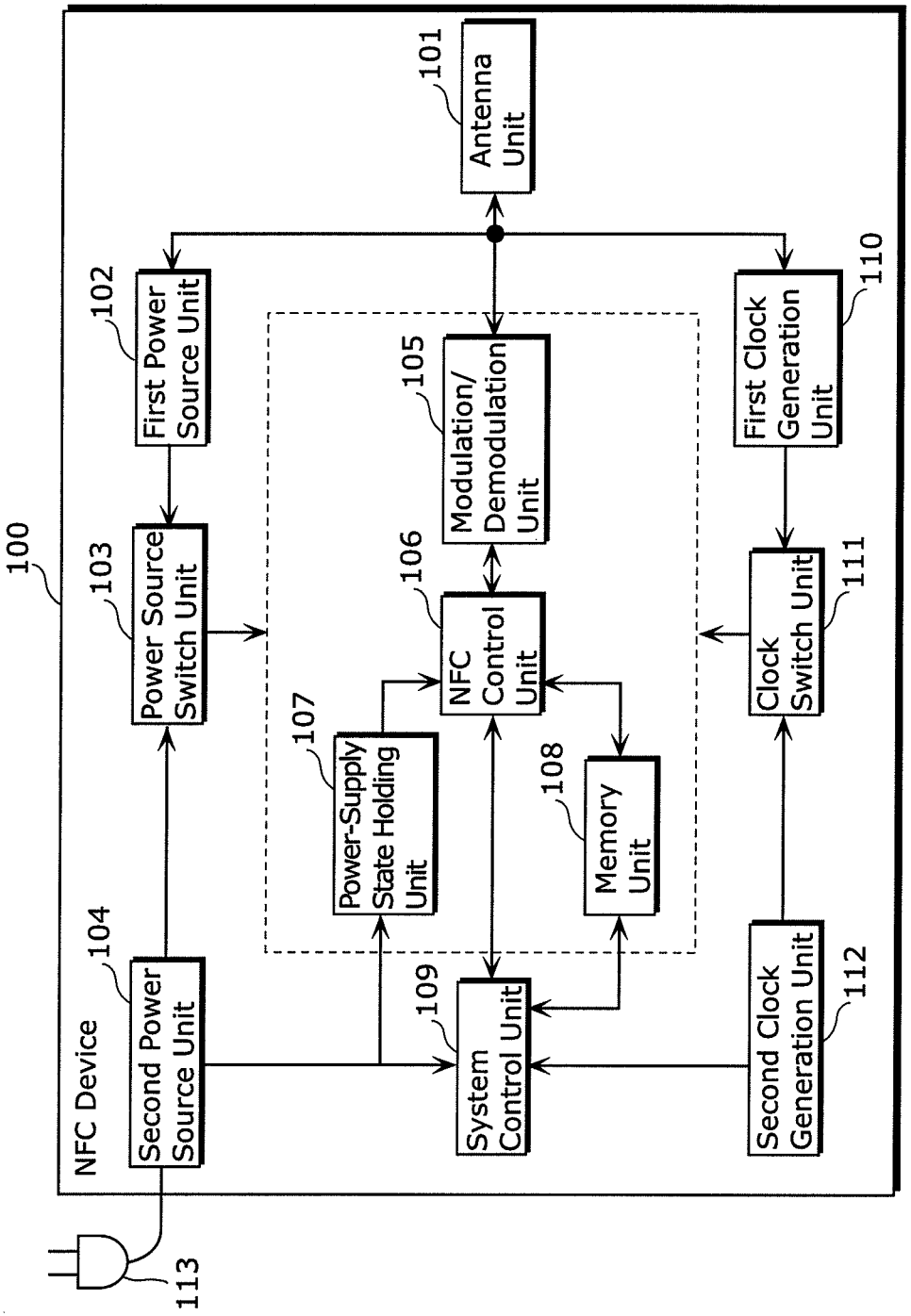
FIG. 2 is a block diagram showing an example of a structure of an NFC device according to Embodiment 1 of the present invention.

FIG. 2 is a block diagram showing an example of a structure of an NFC device according to Embodiment 1. Here, the NFC device 100 shown in FIG. 2 is one example of the NFC device 10 shown in FIG. 1.

The NFC device 100 includes an antenna unit 101, a first power source unit 102, a power source switch unit 103, a second power source unit 104, a modulation/demodulation unit 105, an NFC control unit 106 that controls NFC, a power-supply state holding unit 107, a memory unit 108, a system control unit 109, a first clock generation unit 110, a clock switch unit 111, and a second clock generation unit 112. The NFC device 100 is generally connected to a plug 113, for example, and receives power via the plug 113.

The system control unit 109 controls an original function of the NFC device 100, and also performs NFC with the reader/writer. Here, if the NFC device 100 is a microwave, the original function of the NFC device 100 is a function of heating foods, and the system control unit 109 controls, for example, microwave emission power and time.

The antenna unit 101 receives electromagnetic waves from the reader/writer 20, and the NFC device 100 emits electromagnetic waves caused by load modulation.

The first power source unit 102 generates power from the electromagnetic waves received by the antenna unit 101. The first power source unit 102 supplies the generated power to the modulation/demodulation unit 105, the NFC control unit 106, the power-supply state holding unit 107, and the memory unit 108.

The second power source unit 104 is a drive power source different from the first power source unit. The second power source unit 104 is a main power source of the NFC device 100. The second power source unit 104 converts, for example, power supplied from the plug 113 to DC having an appropriate voltage level, to be supplied to at least the system control unit 109, the NFC control unit 106, the modulation/demodulation unit 105, the power-supply state holding unit 107, and the memory unit 108. It should be noted that power may be supplied to the second power source unit 104 not only from the plug 113, but also from a battery or an Alternating Current (AC) adapter.

According to the power-supply state of the second power source unit 104, the power source switch unit 103 switches between the second power source unit and the first power source unit in order to supply power to activate at least the NFC unit and the power-supply state holding unit 107. More specifically, the power source switch unit 103 switches between the second power source unit 104 and the first power source unit 102 in order to supply power to the modulation/demodulation unit 105, the NFC control unit 106, the power-supply state holding unit 107, and the memory unit 108. For example, if the second power source unit 104 supplies power, the power source switch unit 103 performs the switching to cause the second power source unit 104 to supply power. On the other hand, if the second power source unit 104 does not supply power, the power source switch unit 103 performs the switching to cause the first power source unit 102 to supply power.

The modulation/demodulation unit 105 demodulates electromagnetic waves received by the antenna unit 101, and provides the NFC control unit 106 with communication signals generated by the demodulation. In addition, the modulation/demodulation unit 105 demodulates communication signals provided from the NFC control unit 106, and provides the demodulated signals to the reader/writer 20 via the antenna unit 101.

The NFC control unit 106 corresponds to the NFC unit according to the aspect of the present invention. The NFC control unit 106 analyzes and processes the communication signal provided from the modulation/demodulation unit 105.

If the NFC control unit 106 analyses that the communication signal is a signal for the system control unit 109, the NFC control unit 106 transfers the signal to the system control unit 109, then receives a response from the system control unit, and provides the received response details to the modulation/demodulation unit 105. Furthermore, for example, if the NFC control unit 106 analyses that the communication signal is a reference signal for reference to a power-supply state, the NFC control unit 106 refers to the power-supply state holding unit 107, then provides the modulation/demodulation unit 105 with a power-supply state held in the power-supply state holding unit 107 as a reference result in order to respond to the signal. Moreover, for example, if the NFC control unit 106 analyses that the communication signal is a reference signal for reference to the memory unit 108, the NFC control unit 106 refers to the memory unit 108 and provides the modulation/demodulation unit 105 with the reference result as a response.

The power-supply state holding unit 107 holds information of a power state of the second power source unit 104. More specifically, the power-supply state holding unit 107 detects a power, namely, a supply voltage that is supplied from the second power source unit 104 to the system control unit 109, and holds the detection result as a power-supply state of the second power source unit 104. It should be noted that it has been described that the power-supply state holding unit 107 holds information of a power state of the second power source unit 104, but the present invention is not limited to the above. It is also possible that the power-supply state holding unit 107 may hold the detected state of power (supply voltage) supplied to the system control unit 109, as a power-supply state of the system control unit 109. That is because the power-supply state held in the power-supply state holding unit 107 is not different between the above cases.

Here, examples of a structure of the power-supply state holding unit 107 are described. According to the present embodiment, the power-supply state holding unit 107 is assumed to be a circuit for detecting a voltage of the second power source unit 104.

Figure 3A:
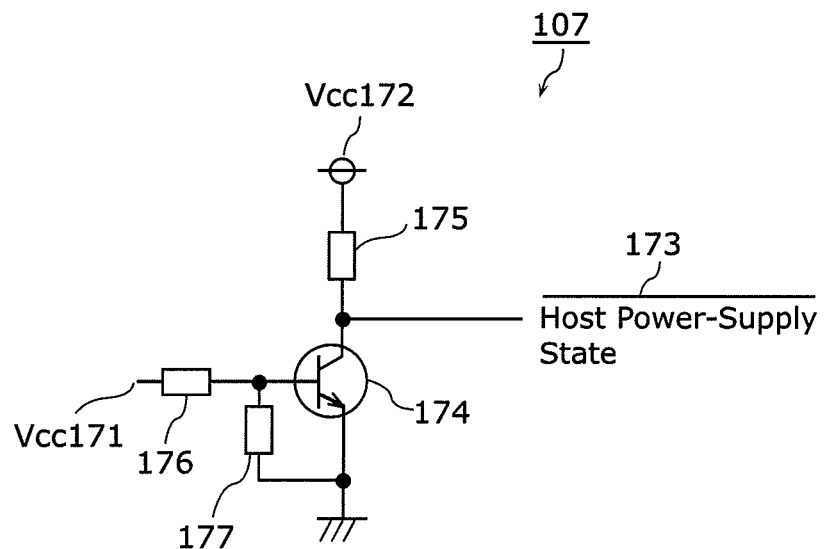
FIG. 3A is a diagram showing, as an example of a structure of a power-supply state holding unit 107, a circuit (voltage level converting circuit) using a transistor.
Figure 3B:
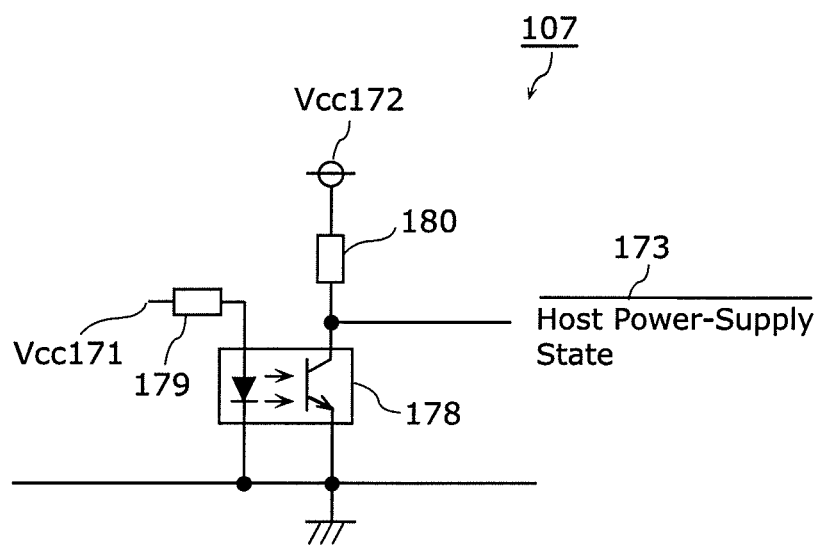
FIG. 3B is a diagram showing, as another example of the structure of the power-supply state holding unit 107, a circuit (voltage level converting circuit) using a photocoupler.

FIG. 3A is a diagram showing, as an example of the structure of the power-supply state holding unit 107, a circuit (voltage level converting circuit) using a transistor. FIG. 3B is a diagram showing, as another example of the structure of the power-supply state holding unit 107, a circuit (voltage level converting circuit) using a photocoupler. In these figures, Vcc 171 refers to a supply voltage of the second power source unit 104. The Vcc 172 is a voltage provided from the power source switch unit 103 to activate the power-supply state holding unit 107. A host power-supply state 173 refers to a converted voltage that is a value (detected value) read by the power-supply state holding unit 107.

The circuit (power-supply state holding unit 107) shown in FIG. 3A includes: a transistor 174 that is a bipolar transistor; and resistances 175, 176, and 177. It should be noted that the transistor 174 in the circuit shown in FIG. 3A is not limited to a bipolar transistor but may be a Metal-Oxide Semiconductor Field-Effect Transistor (MOSFET).

In FIG. 3A, when the Vcc 171 is supplied, a current flows through a collector of the transistor 174 and therefore the host power-supply state 173 becomes an output at a low level (approximately 0.7V). On the other hand, if the Vcc 171 is not supplied, a current does not flow through the collector of the transistor 174 and therefore the host power-supply state 173 becomes at a high level (a voltage almost equal to the Vcc 172).

The circuit (power-supply state holding unit 107) shown in FIG. 3B includes a photocoupler 178, a resistance 179, and a resistance 180.

Also in FIG. 3B, when the Vcc 171 is supplied, a light-emitting diode (LED) in the photocoupler 178 lights up, therefore a current flows through a collector of the photo-transistor and the host power-supply state 173 becomes an output at a low level. On the other hand, if the Vcc 171 is not supplied, the LED in the photocoupler 178 lights out, therefore a current does not flow through the collector of the photo-transistor and the host power-supply state 173 becomes at a high level (a voltage almost equal to the Vcc 172).

As described above, each of the circuits (power-supply state holding unit 107) shown in FIGS. 3A and 3B can detect and hold a power-supply state of the second power source unit 104.

The memory unit 108 is implemented as a non-volatile memory on which data such as a type of the NFC device 100, an error code caused in the device, and a use history of the device are recorded. The system control unit 109 makes it possible to write the data into or read data from the memory unit 108. Furthermore, the NFC control unit 106 makes it possible to at least read the data from the memory unit 108. It should be noted that the memory unit 108 may be implemented as an Electrically Erasable Programmable Read-Only Memory (EEPROM), a Flash memory, a Ferroelectric Random Access Memory (FeRAM), or the like, but is not limited to these memories.

The first clock generation unit 110 generates a clock (clock signal) from electromagnetic waves received by the antenna unit 101, and provides the clock signal to the NFC control unit 106, the modulation/demodulation unit 105, the power-supply state holding unit 107, and the memory unit 108.

The second clock generation unit 112 generates a clock (clock signal) by using power supplied from the second power source unit 104, and provides the clock signal to the system control unit 109, the NFC control unit 106, the modulation/demodulation unit 105, the power-supply state holding unit 107, and the memory unit 108.

The clock switch unit 111 switches a clock signal to be provided to the NFC control unit 106, the modulation/demodulation unit 105, the power-supply state holding unit 107, and the memory unit 108. More specifically, the clock switch unit 111 switches between clock signal sources according to a state of the second power source unit. If the second power source unit supplies power, the clock switch unit 111 causes the second clock generation unit 112 to supply a clock signal. On the other hand, if the second power source unit does not supply power, the clock switch unit 111 causes the first clock generation unit 110 to supply a clock signal.

The following describes processing performed by the NFC device 100 having the above-described structure.

Figure 4:
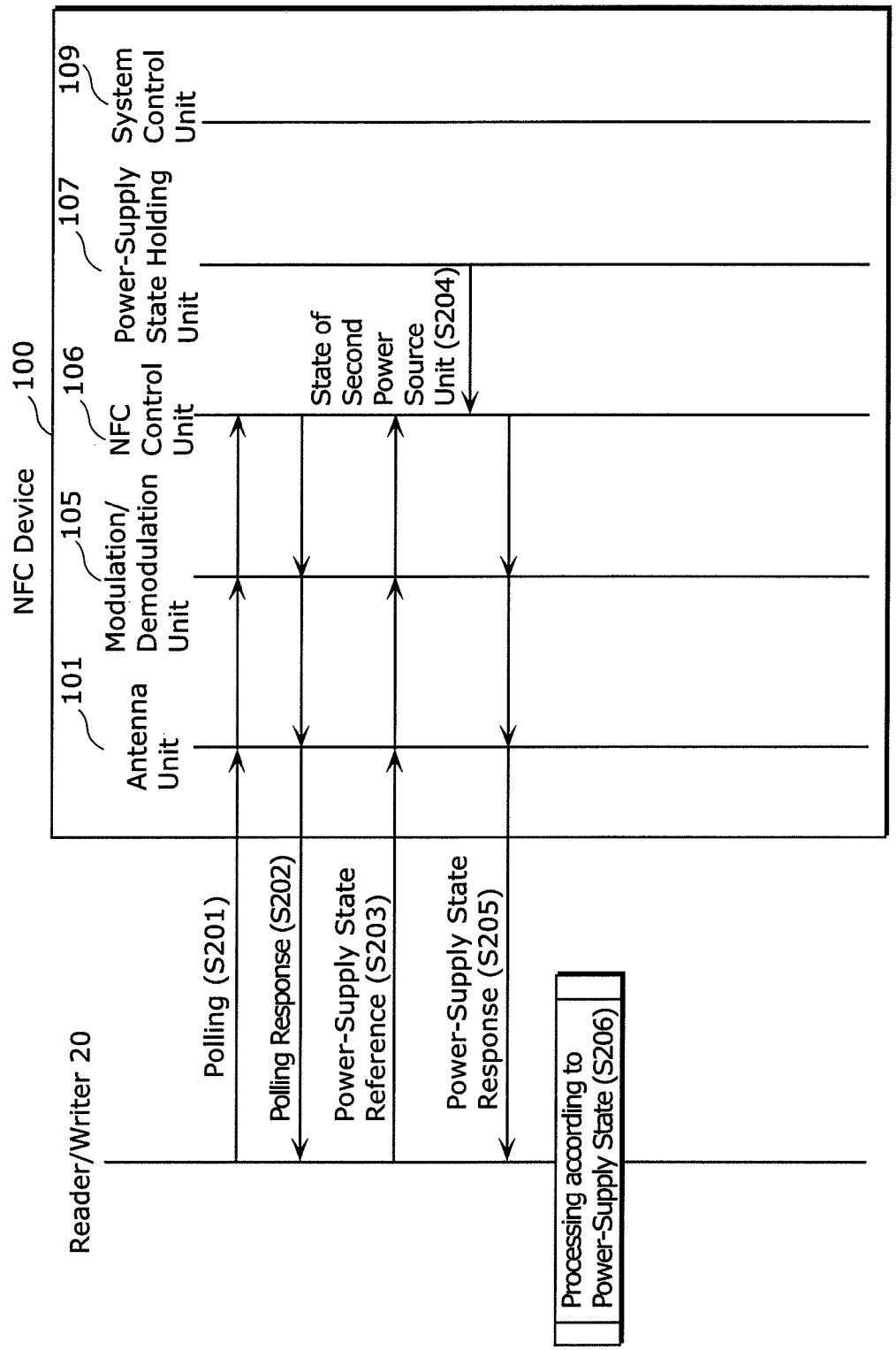
FIG. 4 is a diagram for explaining communication processing performed between the NFC device and a reader/writer according to Embodiment 1.

FIG. 4 is a diagram for explaining communication processing performed between the NFC device and the reader/writer according to Embodiment 1.

First, the reader/writer 20 performs polling to search for the NFC device 100 (S201).

Next, if the NFC device 100 is within a communicable range where the NFC device 100 can communicate with the reader/writer 20, the NFC device 100 receives the polling from the reader/writer 20 and sends a polling response back to the reader/writer 20 (S202). Here, in the NFC device 100, the modulation/demodulation unit 105 modulates the electromagnetic waves received by the antenna unit 101 into a communication signal, and the NFC control unit 106 analyzes the modulated communication signal. Then, the NFC control unit 106 generates a polling response to the analyzed communication signal. The modulation/demodulation unit 105 modulates the polling response. The antenna unit 101 emits the modulated signal as electromagnetic waves.

Then, when the reader/writer 20 receives the polling response and thereby detects that the NFC device 100 is within the communicable range, the reader/writer 20 transmits a power-supply state reference packet (S203).

The NFC control unit 106 in the NFC device 100 receives the power-supply state reference packet, and access the power-supply state holding unit 107 to obtain information of a power-supply state of the second power source unit 104 (S204). The NFC control unit 106 transmits, as a power-supply state response packet, the obtained information of the power-supply state of the second power source unit 104 via the modulation/demodulation unit 105 and the antenna unit 101 (S205).

Next, when the reader/writer 20 receives the power-supply state response packet and learns the power-supply state of the second power source unit 104, the reader/writer 20 performs processing according to the obtained power-supply state (S206).

As described above, the NFC device 100 and the reader/writer 20 perform communication processing.

In the above-described communication processing, the antenna unit 101, the modulation/demodulation unit 105, the NFC control unit 106, and the power-supply state holding unit 107 operate in the NFC device 100. These units operate by receiving power from the second power source unit 104 when the second power source unit 104 is ON. On the other hand, if the second power source unit 104 is OFF, these units operate by receiving power from the first power source. As described above, however the state of the second power source unit 104 is, the reader/writer 20 can perform the processing leading up to S205 at which the power-supply state response is received from the NFC device 100.

Next, the description is given for an example of transition of a screen displayed on the reader/writer 20 during the above-described communication processing between the NFC device 100 and the reader/writer 20.

Figure 5:
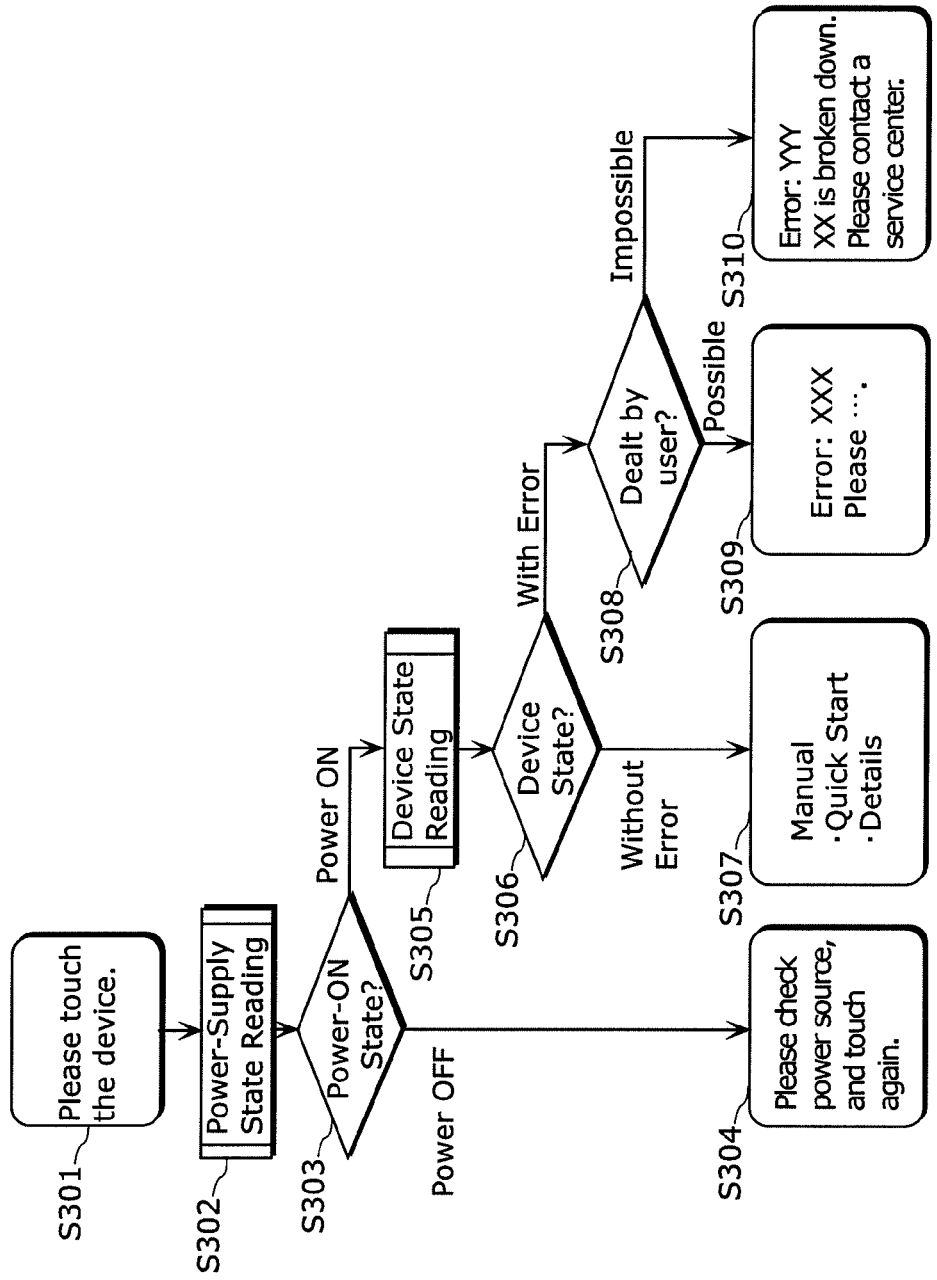
FIG. 5 is a flowchart for explaining an example of transition of a screen of the reader/writer according to Embodiment 1.

FIG. 5 is a flowchart for explaining the example of the transition of the screen of the reader/writer according to Embodiment 1.

First, the reader/writer 20 displays, on a screen, a notice to persuade a user to touch the NFC device 100 by the reader/writer 20, such as "Please touch the device." (S301).

Next, when the user causes the reader/writer 20 to touch the NFC device 100 according to the screen display, the above-described communication from S201 to S205 in FIG. 4 is performed. Then, the reader/writer 20 obtains information indicating a power-supply state of the NFC device 100 (S302).

Next, the reader/writer 20 confirms the power-supply state of the NFC device 100 (power-supply state of the second power source unit 104) (S303). If a power-supply state of the NFC device 100 (power-supply state of the second power source unit 104) is OFF (Power OFF at S303), then the reader/writer 20 displays a notice to persuade the user to check the power source of the NFC device, or to power the NFC device 100 ON (S304).

On the other hand, if the power-supply state of the NFC device 100 is ON (Power ON at S303), then the reader/writer 20 performs further communication with the NFC device 100. More specifically, the reader/writer 20 reads information of a device state of the NFC device 100 in order to check whether or not the NFC device 100 has an error (S305).

Subsequently, the reader/writer 20 checks the device state of the NFC device 100 (S306)

If the NFC device 100 has no error (Without Error at S306), then the reader/writer 20 determines that the user does not know how to use the NFC device 100, and therefore displays how to use the NFC device 100, such as a manual of the NFC device 100 (S307). On the other hand, if the NFC device 100 has an error (With Error at S306), then the reader/writer 20 determines whether or not the error can be restored by user's maintenance such as filter cleaning, or cannot be dealt by user's maintenance, for example, a part breakage (S308).

Subsequently, if the reader/writer 20 determines that the error can be restored by maintenance (Possible at S308), then the reader/writer 20 displays a maintenance method, for example "Error: XXX, Please . . . " (S309). On the other hand, if the reader/writer 20 determines that the error cannot be restored by maintenance (Impossible at S308), then the reader/writer 20 displays details of the error and a notice to persuade the user to contact a service center or the like (S310).

As described above, the reader/writer 20 transits the screen display.

As described above, according to the present embodiment, it is possible to provide an NFC device that enables the reader/writer 20 to obtain information indicating a power-supply state of the NFC device, however the power-supply state of the NFC device is.

More specifically, if the second power source unit 104 is ON, the system control unit 109, the NFC control unit 106, the modulation/demodulation unit 105, the power-supply state holding unit 107, and the memory unit 108 operate by using power supplied from the second power source unit 104 and a clock supplied from the second clock generation unit. Therefore, the reader/writer 20 can access the functions provided by the system control unit 109, the memory unit 108, and the power-supply state holding unit 107. In other words, the reader/writer 20 can obtain information indicating a power-supply state of the NFC device 100. On the other hand, if the second power source unit 104 is OFF, the NFC control unit 106, the modulation/demodulation unit 105, the power-supply state holding unit 107, and the memory unit 108 operate by using power which the first power source unit 102 generates from electromagnetic waves provided from the reader/writer 20, and a clock supplied from the first clock generation unit. Therefore, the reader/writer 20 can access the functions provided by the memory unit 108 and the power-supply state holding unit 107. In other words, the reader/writer 20 can obtain information indicating a power-supply state of the NFC device 100. As described above, the reader/writer 20 can check a power-supply state of the second power source unit 104 which is detected and held in the power-supply state holding unit 107, however a state of the second power source unit 104 is. As a result, the reader/writer 20 can perform processing according to the power-supply state.

Therefore, even if the power source of the NFC device 100 is OFF to save energy, or even if breakdown of the NFC device 100 prevents power supply, the NFC device 100 has a means for notifying the reader/writer 20 of the power-supply state of the NFC device 100. In addition, the NFC device 100 enables the reader/writer 20 to notify the user of the power-supply state without causing the user to perform operations such as operations using a power-supply check button, and to display a menu based on the power-supply state, for example. As a result, the NFC device 100 can improve a usability.

Embodiment 2

In Embodiment 2, description is given for another example of the structure of the NFC device 100 according to Embodiment 1.

Figure 6:
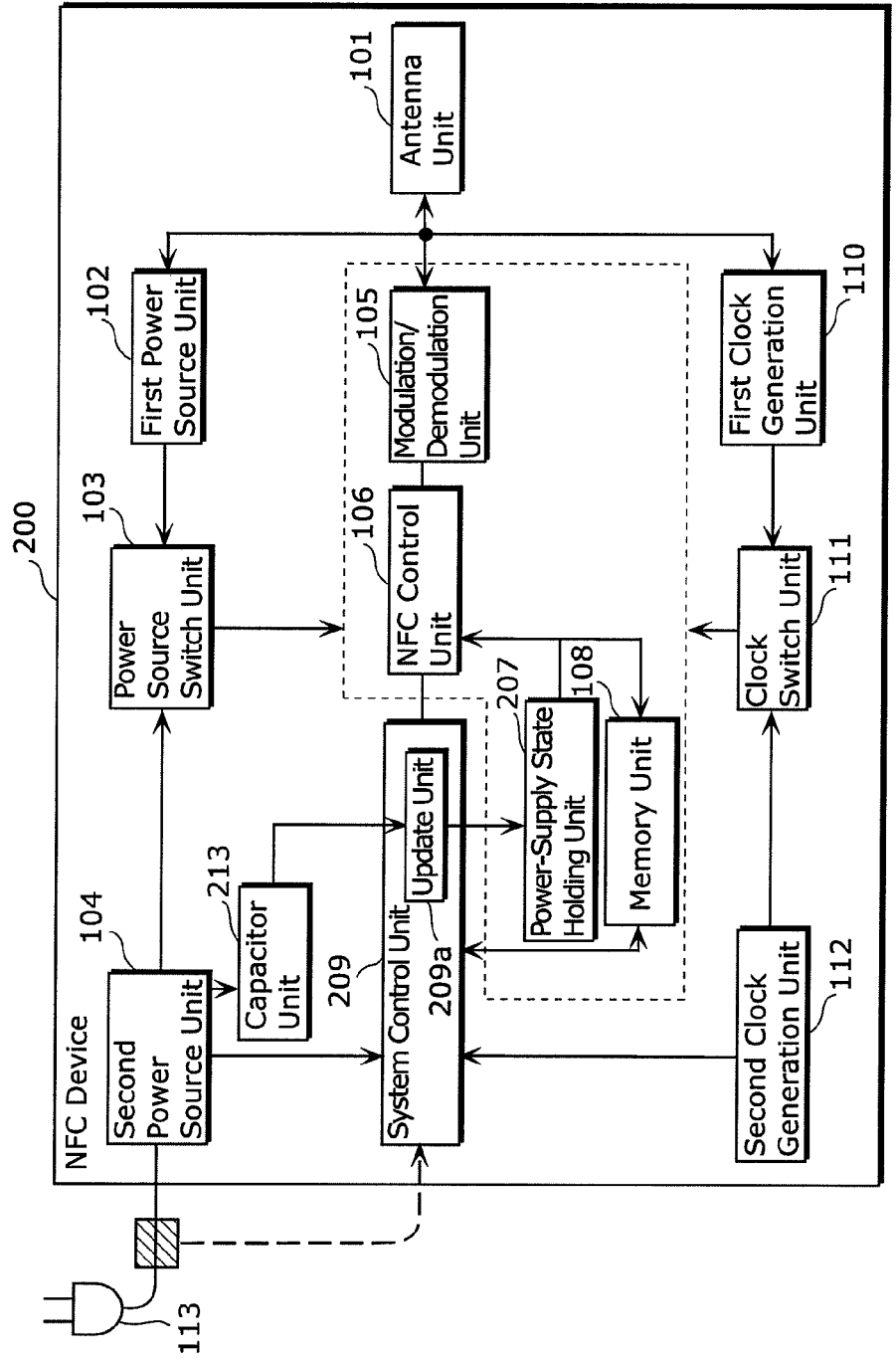
FIG. 6 is a block diagram showing an example of a structure of an NFC device according to Embodiment 2 of the present invention.

FIG. 6 is a block diagram showing an example of a structure of the NFC device according to Embodiment 2. Here, the same reference numerals of FIG. 2 are assigned to the identical units of FIG. 6, so that the identical units are not explained in detail again below.

The NFC device 200 shown in FIG. 6 includes the antenna unit 101, the first power source unit 102, the power source switch unit 103, the second power source unit 104, the modulation/demodulation unit 105, the NFC control unit 106, the memory unit 108, the first clock generation unit 110, the clock switch unit 111, the second clock generation unit 112, a power-supply state holding unit 207, a system control unit 209, and a capacitor unit 213. The NFC device 200 is generally connected to the plug 113, for example, and receives power via the plug 113.

The NFC device 200 shown in FIG. 6 differs from the NFC device 100 according to Embodiment 1 in structures of the power-supply state holding unit 207, the system control unit 209, and the capacitor unit 213.

The second power source unit 104 converts power supplied from the plug 113 to DC having an appropriate voltage level, to be supplied to at least the system control unit 209, the NFC control unit 106, the modulation/demodulation unit 105, the power-supply state holding unit 207, and the memory unit 108. The second power source unit 104 also charges the power to the capacitor unit 213. It should be noted that power may be supplied to the second power source unit 104 not only from the plug 113, but also from a battery or an AC adapter.

The power-supply state holding unit 207 is implemented as a non-volatile memory on which information indicating a state (power-supply state) of power supplied to the system control unit 209 is recorded. On the power-supply state holding unit 207, information indicating whether power is ON or OFF or information indicating that activation is impossible is recorded as a power-supply state. The system control unit 209 makes it possible to write the information into or read information from the power-supply state holding unit 207. The NFC control unit 106 makes it possible to at least read the information from the power-supply state holding unit 207.

It should be noted that the power-supply state holding unit 207 may be implemented as an EEPROM, a Flash memory, a FeRAM, or the like, but is not limited to these memories. It should also be noted that the power-supply state holding unit 207 may be implemented as a part of the memory of the memory unit 108.

The system control unit 209 controls original functions of the NFC device 200, and also performs control for NFC with the reader/writer 20.

In addition, the system control unit 209 updates a value in the power-supply state holding unit 207 according to a power-supply state of the second power source unit 104. More specifically, the system control unit 209 includes an update unit 209a. The update unit 209a has a part of the function of the system control unit 209 for updating the value of the power-supply state holding unit 207 according to the power-supply state of the second power source unit 104.

In the capacitor unit 213, power supplied from the second power source unit 104 is charged while the second power source unit 104 is ON. The capacitor unit 213 supplies power to the system control unit 209 and the power-supply state holding unit 207 via the system control unit 209, when the power supply from the second power source unit 104 is stopped. It should be noted that the capacitor unit 213 may be implemented as a secondary battery such as a lithium-ion battery, a capacitor, an electric double layer capacitor, or the like, but the capacitor unit 213 is not limited to them.

The following describes processing performed by the NFC device 200 having the above-described structure.

It is assumed that the NFC device 200 receives a trigger from a user to power the NFC device 200 OFF, when a power-supply state of the second power source unit 104 is ON and the system control unit 209 is operating. For example, the user presses a power-OFF switch or the NFC device 200 receives a power-OFF signal from a remote controller or the like. Under the assumption, the system control unit 209 writes information indicating the power-OFF onto the power-supply state holding unit 207, then stops the original functions, and powers the second power source unit 104 OFF. It should be noted that the system control unit 209 may not perform the above processing. It is also possible that the system control unit 209 sends a signal to the second power source unit 104 to stop supplying power to the original functions except the system control unit 209, and also sends an instruction signal to the second clock generation unit 112 to lower a frequency of a generated clock. In short, the system control unit 209 may write information indicating power-OFF into the power-supply state holding unit 207, and then transits to a low power consumption mode.

Furthermore, it is assumed in the NFC device 200 that the second power source unit 104 stops supplying power, for example, the plug 113 is pulled out, but the NFC device 200 does not receive a power-OFF trigger from the user, when a power-supply state of the second power source unit 104 is ON and the system control unit 209 is operating. Under the assumption, the capacitor unit 213 starts supplying power to at least the update unit 209a, which is a part of the function of the system control unit 209, and the power-supply state holding unit 207. Then, into the power-supply state holding unit 207, the system control unit 209 (or the update unit 209a) writes information indicating that the second power source unit 104 cannot be activated. Here, there is a trigger between the plug 113 and the second power source unit 104. The trigger detects stop of the power supply from the plug 113, and notifies the system control unit 209 of the detection result. Therefore, without receiving a power-OFF trigger from the user, the system control unit 209 (or the update unit 209a) can detect that the second power source unit 104 stops power supply, for example, the plug 113 is pulled out. As a result, the system control unit 209 (or the update unit 209a) can update the information indicating the power-supply state held in the power-supply state holding unit 207.

Moreover, in the NFC device 200, if the second power source unit 104 is powered ON while a power-supply state of the second power source unit 104 is OFF, the system control unit 209 (or the update unit 209a) writes information indicating the power-ON state as the power-supply state onto the power-supply state holding unit 207, and then starts control of the original functions.

As described above, the NFC device 200 performs characteristic processing.

It should be noted that, also in Embodiment 2, the communication processing between the NFC device 200 and the reader/writer 20 is the same as that described in Embodiment 1, so that the communication processing performed by the structure shown in FIG. 6 is not described again below.

Next, the description is given for an example of transition of a screen displayed on the reader/writer 20 during the above-described communication processing between the NFC device 200 and the reader/writer 20.

Figure 7:
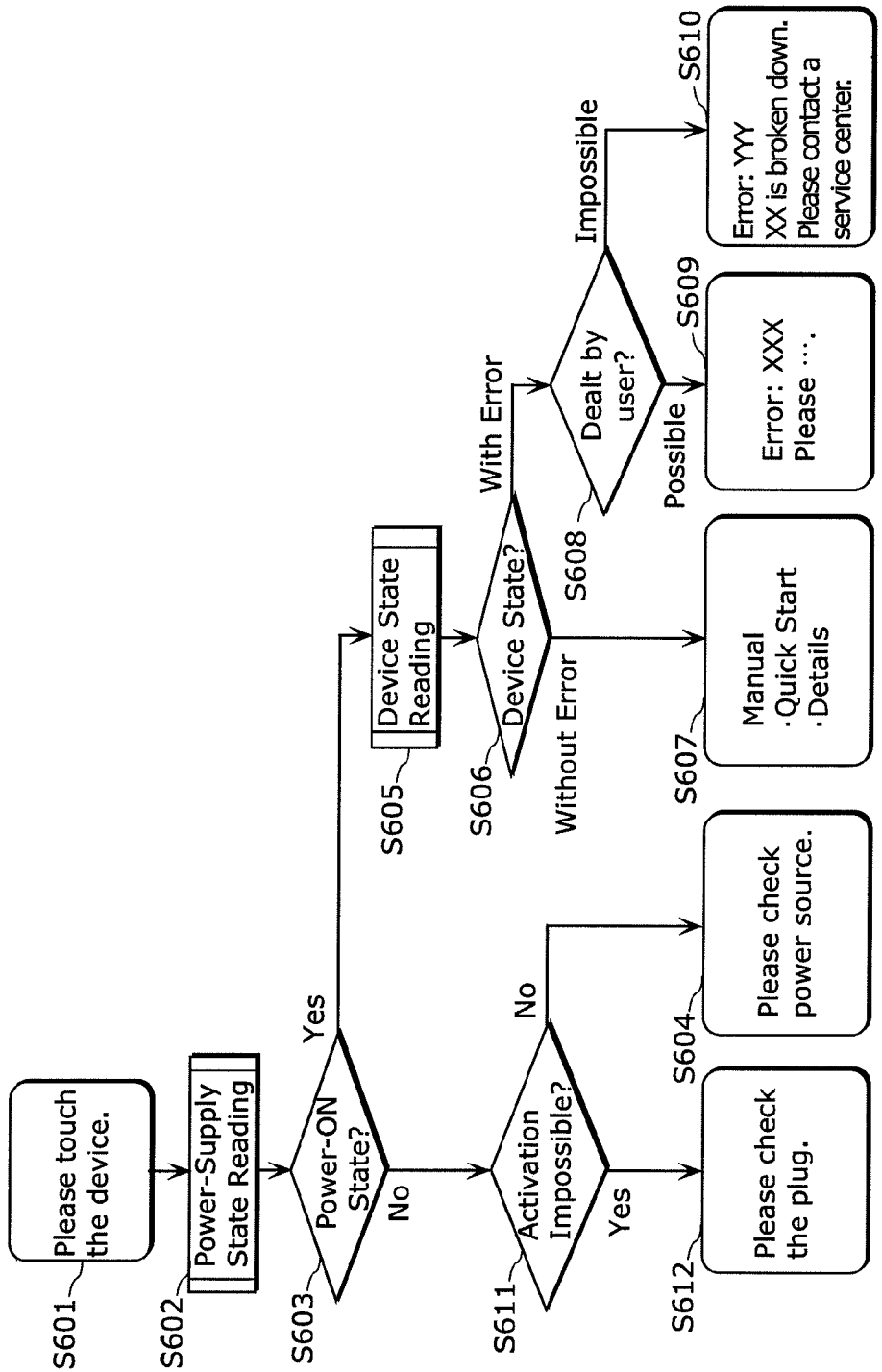
FIG. 7 is a flowchart for explaining an example of transition of a screen of a reader/writer according to Embodiment 2.

FIG. 7 is a flowchart for explaining the example of the transition of the screen of the reader/writer according to Embodiment 2. It should be noted that S601, S602, and S605 to S610 are identical to S301, S302, and S305 to S310 in FIG. 5 so that the identical steps are not described again below.

At S603, the reader/writer 20 checks a power-supply state of the NFC device 200 (power-supply state of the second power source unit 104) in order to determine whether or not a power-supply state of the second power source unit 104 is ON. If the NFC device 200 is in a state except the ON state (No at S603), then the reader/writer 20 further checks a power-supply state of the NFC device 200 (power-supply state of the second power source unit 104) in order to determine whether or not the NFC device 200 is incapable of being activated or is powered OFF (S611).

If the NFC device 200 is incapable of being activated (Yes at S611), then the reader/writer 20 displays a notice to persuade the user to check a state of the plug 113, for example, "Please check the plug" (S612). On the other hand, if the NFC device 200 is OFF (No at S611), then the reader/writer 20 displays a notice to persuade the user to check a power source switch, for example, "Please check the power source" (S604).

It should be noted that the display transition example of the reader/writer 20 is not limited to that shown in. FIG. 7. For example, the memory unit 108 in the NFC device 200 may hold a power source type information for the NFC device 200. The power source type information indicates whether the second power source unit 104 in the NFC device 200 operates by using a battery or the NFC device 200 receives power from the plug 113. In this case, the reader/writer can read the power source type information in addition to the power-supply state at S602 in FIG. 7. If the power source type information indicates that the NFC device 200 receives power from the plug 113 at S612, the reader/writer 20 displays a notice to persuade the user to check the plug. On the other hand, if the power source type information indicates that the NFC device 200 operates by a battery at S612, the reader/writer 20 may display a notice that a remaining battery charge is 0.

As described above, the reader/writer 20 transits the screen display.

As described above, according to the present embodiment, it is possible to implement an NFC device that enables the reader/writer 20 to obtain information indicating a power-supply state of the NFC device, however the power-supply state of the NFC device is.

More specifically, when a power-supply state of the NFC device 200 (second power source unit 104) is changed, the system control unit 209 (update unit 209a) records (updates) the power-supply state onto the power-supply state holding unit 207 by using power supplied from the reader/writer 20. Therefore, however the power-supply state of the second power source unit 104 is, the reader/writer 20 can read the power-supply state from the power-supply state holding unit 207.

Furthermore, even if the second power source unit 104 is unexpectedly powered OFF, the system control unit 209 can write the power-supply state onto the power-supply state holding unit 207 by using power supplied from the capacitor unit 213. As a result, the power-supply state holding unit 207 is always updated to hold the latest state.

Embodiment 3

In Embodiment 3, description is given for another example of the structure of the NFC device 200 according to Embodiment 2.

Figure 8:
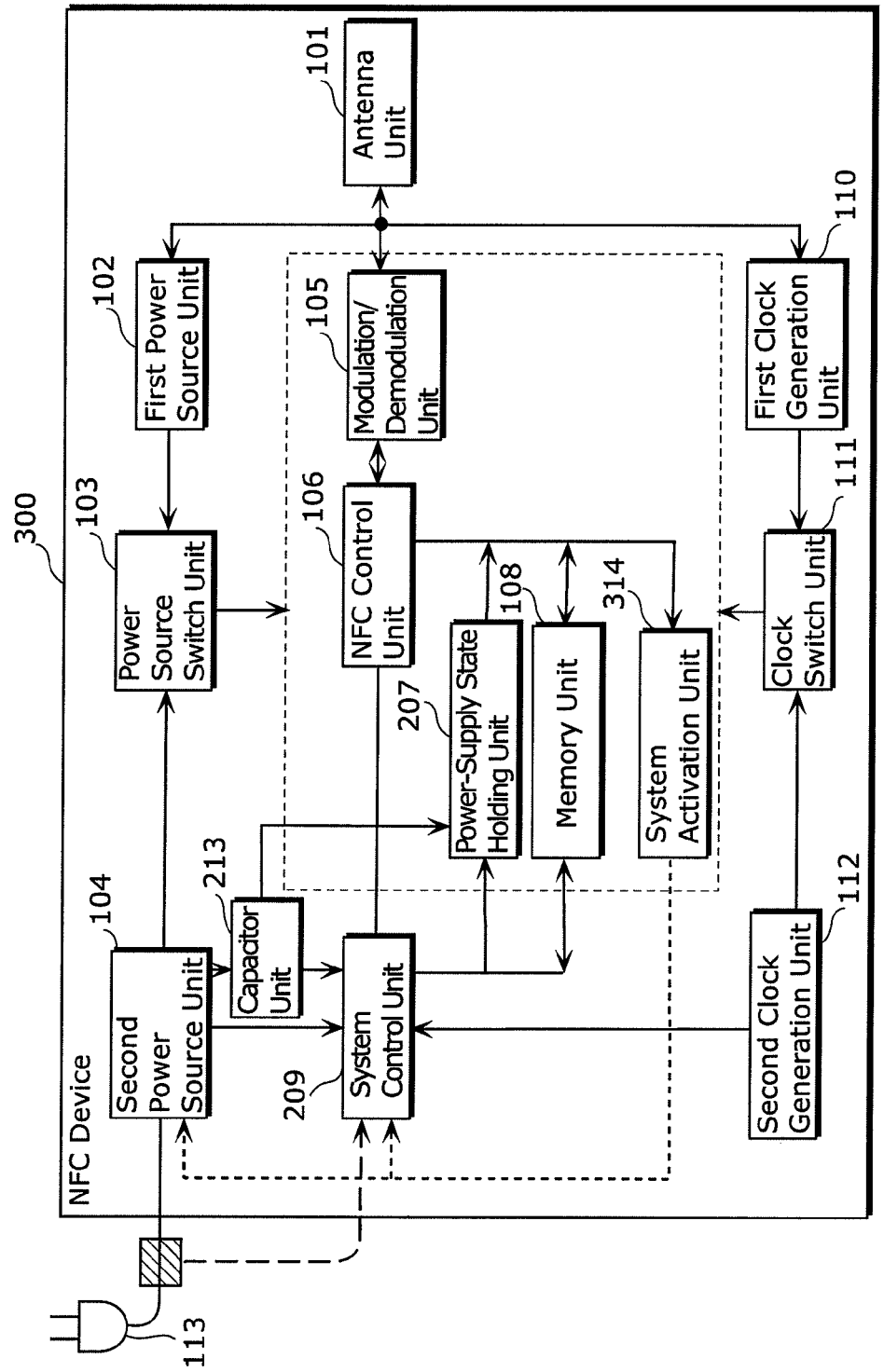
FIG. 8 is a block diagram showing an example of a structure of an NFC device according to Embodiment 3 of the present invention.

FIG. 8 is a block diagram showing an example of a structure of an NFC device according to Embodiment 3. Here, the same reference numerals of FIG. 6 are assigned to the identical units of FIG. 8, so that the identical units are not explained again below.

The NFC device 300 shown in FIG. 8 includes the antenna unit 101, the first power source unit 102, the power source switch unit 103, the second power source unit 104, the modulation/demodulation unit 105, the NFC control unit 106, the memory unit 108, the first clock generation unit 110, the clock switch unit 111, the second clock generation unit 112, the power-supply state holding unit 207, the system control unit 209, the capacitor unit 213, and a system activation unit 314. The NFC device 300 is generally connected to the plug 113, for example, and receives power via the plug 113.

The NFC device 300 shown in FIG. 8 differs from the NFC device 200 according to Embodiment 2 in that the NFC device 300 further includes the system activation unit 314.

The system activation unit 314 can operate by power supplied from at least the first power source unit. If a power-ON signal instructing to power the NFC device 300 (or the second power source unit 104) ON is received from the NFC control unit 106, the system activation unit 314 powers the second power source unit ON. Furthermore, if the system control unit 209 is in a low power consumption mode, the system activation unit 314 changes the system control unit 209 from the low power consumption mode to a normal operation mode when a wakeup signal is received. Here, the low power consumption mode is an operation mode at which the second power source unit 104 stops supplying power to the original functions except the system control unit 209 so that only a part of functions of the system control unit 209 operates. The wakeup signal is a system activation request signal for requesting start of power supply from the second power source unit 104 and activation of all functions of the system control unit 209.

Thus, the NFC device 300 has the above-described structure.

It should be noted that it has been described that the NFC device 300 includes the power-supply state holding unit 207, the capacitor unit 213, and the system control unit 209, but the NFC device 300 is not limited to the structure. The NFC device 300 may have the same structure as that according to Embodiment 1. That is because the same effects can be offered. In other words, it is also possible that the NFC device 300 shown in FIG. 8 includes the power-supply state holding unit 107 and the system control unit 109, but does not include the capacitor unit 213.

It should be noted that, also in Embodiment 3, the communication processing between the NFC device 300 and the reader/writer 20 is the same as that described in Embodiments 1 and 2, so that the communication processing in FIG. 4 is not described again below.

Next, the description is given for an example of transition of a screen displayed on the reader/writer 20 during the above-described communication processing between the NFC device 300 and the reader/writer 20.

Figure 9:
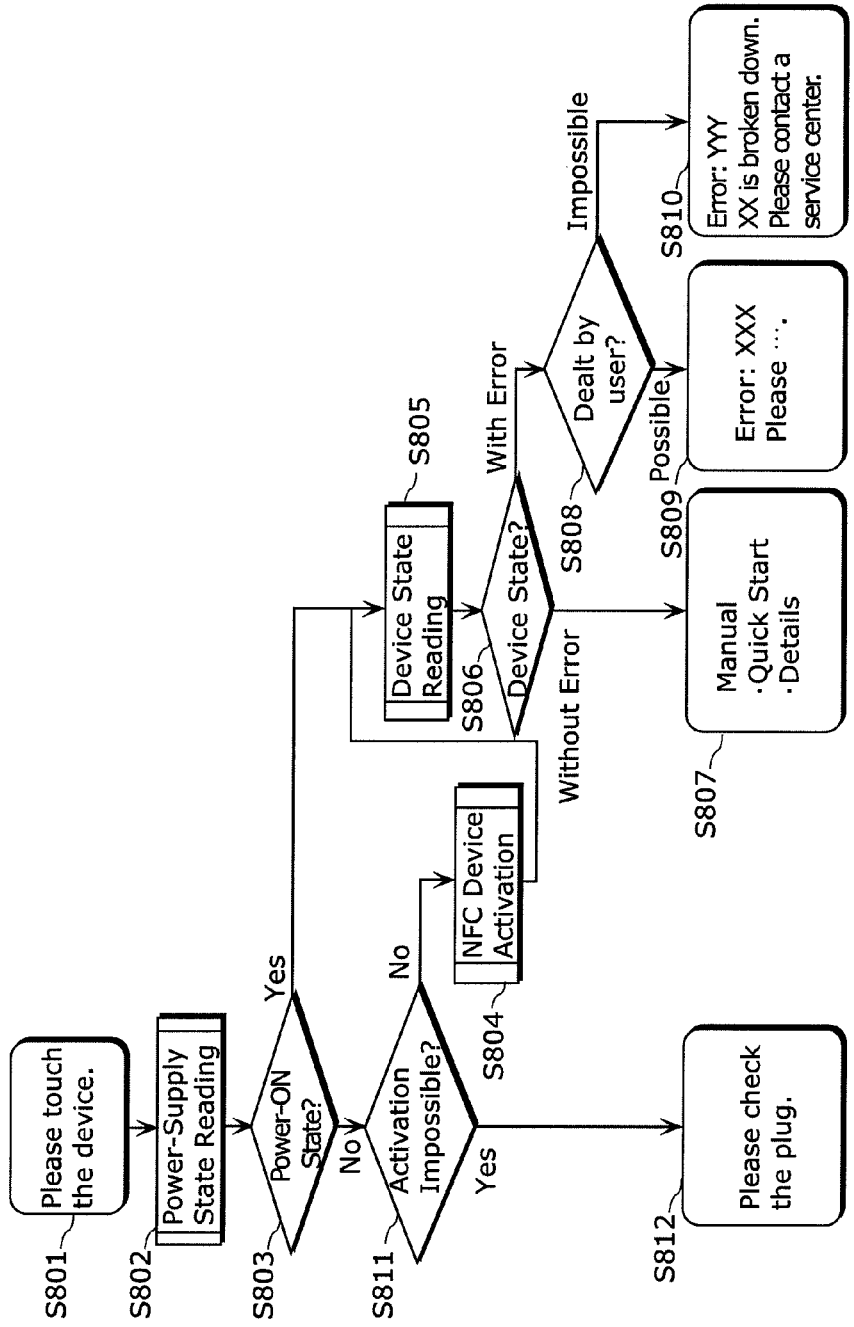
FIG. 9 is a flowchart for explaining an example of transition of a screen of a reader/writer according to Embodiment 3.

FIG. 9 is a flowchart for explaining the example of the transition of the screen of the reader/writer according to Embodiment 3. It should be noted that S801 to S803 and S805 to S812 are identical to S601 to S603 and S605 to S612 in FIG. 6 so that the identical steps are not described again below.

If it is determined at S811 that the NFC device 300 is not incapable of being activated (No at S811), then the reader/writer 20 transmits a power-ON signal to the NFC device 300 (S804). Then, the system activation unit 314 in the NFC device 300 receives the power-ON signal from the reader/writer 20 via the NFC control unit 106, and the system activation unit 314 powers the second power source unit 104 ON to activate the system control unit 209.

Then, the reader/writer 20 reads a device state, such as an error state, from the NFC device 300 (S805). Here, at S805, the above processing is performed even if the power is ON at S803.

If it is determined at S804 that the NFC device 300 is a device that changes to the low power consumption mode, then the reader/writer 20 transmits a wakeup signal to the NFC device 300. In this case, in the NFC device 300, the system activation unit 314 receives the wakeup signal from the reader/writer 20 via the NFC control unit 106, and changes the system control unit 209 from the low power consumption mode to the normal operation mode. Then, the reader/writer 20 reads the device state from the NFC device 300 (S805).

As described above, the reader/writer 20 transits the screen display.

As described above, according to the present embodiment, it is possible to implement an NFC device that enables the reader/writer 20 to obtain information indicating a power-supply state of the NFC device, however the power-supply state of the NFC device is.

Therefore, even if the second power source unit of the NFC device 300 is OFF, the reader/writer 20 can power the second power source unit 104 ON. Furthermore, if the system control unit 209 is in an energy saving mode (low power consumption mode), the reader/writer can change the system control unit 209 from the low power consumption mode to the normal operation mode. As described above, the NFC device 300 enables the reader/writer 20 to check the device state of the NFC device 300, without causing a user to check the power-supply state of the NFC device 300.

Embodiment 4

In Embodiment 4, an example of a combination of the NFC devices according to Embodiments 1 to 3 is described.

Figure 10:
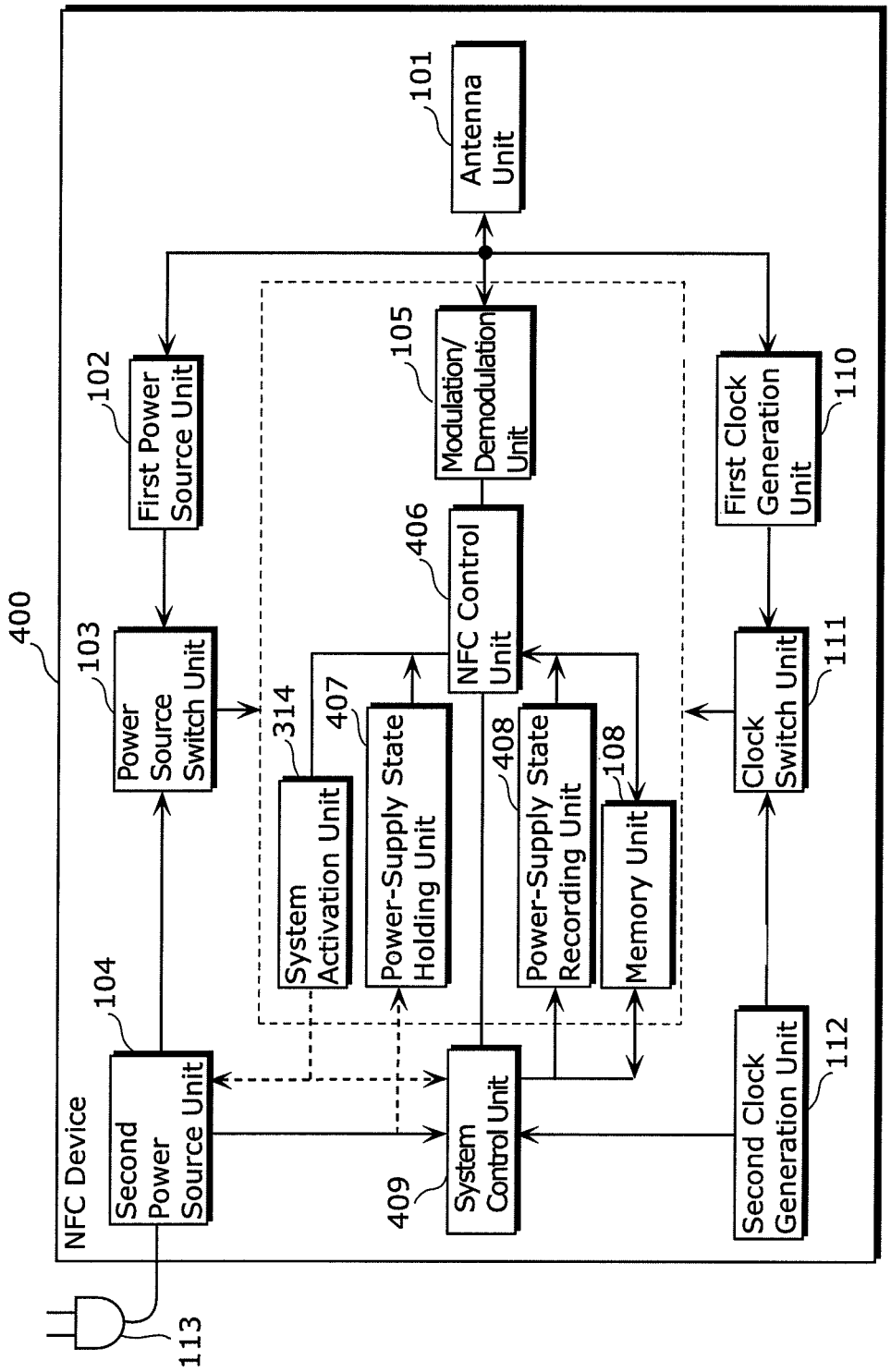
FIG. 10 is a block diagram showing an example of a structure of an NFC device according to Embodiment 4 of the present invention.

FIG. 10 is a block diagram showing an example of a structure of an NFC device according to Embodiment 4. Here, the same reference numerals of FIGS. 2, 6, and 8 are assigned to the identical units of FIG. 10, so that the identical units are not explained again below.

The NFC device 400 shown in FIG. 10 includes the antenna unit 101, the first power source unit 102, the power source switch unit 103, the second power source unit 104, the modulation/demodulation unit 105, the memory unit 108, the first clock generation unit 110, the clock switch unit 111, the second clock generation unit 112, the system activation unit 314, an NFC control unit 406, a power-supply state detection unit 407, a power-supply state recording unit 408, and a system control unit 409.

The NFC device 400 shown in FIG. 9 differs from the NFC devices according to Embodiments 1 to 3 in the structures of the NFC control unit 406, the power-supply state detection unit 407, the power-supply state recording unit 408, and the system control unit 409.

The power-supply state detection unit 407 is the same as the power-supply state holding unit 107 having a structure as a circuit for detecting a voltage of the second power source unit 104. More specifically, the power-supply state detection unit 407 is implemented, for example, in a circuit for detecting a voltage of the second power source unit 104 as shown in FIG. 3A or 3B. The power-supply state detection unit 407 therefore detects a power-supply voltage of power supplied from the second power source unit 104 to the system control unit 409, and holds the detection result as a power-supply state of the system control unit 409 (second power source unit 104).

The power-supply state recording unit 408 is the same as the power-supply state holding unit 207 that is implemented as a non-volatile memory on which information indicating a state (power-supply state) of power supplied to the system control unit 409 is recorded. In other words, the power-supply state recording unit 408 is implemented as a non-volatile memory on which information indicating a power-supply state of power supplied to the system control unit 409 is recorded. On the power-supply state recording unit 408, information indicating a power-ON state or information indicating a power-OFF state is recorded as the power-supply state. The system control unit 409 makes it possible to write the information into or read the information from the power-supply state recording unit 408. The NFC control unit 406 makes it possible to at least read the information from the power-supply state recording unit 408.

It should be noted that the power-supply state recording unit 408 may be implemented as an EEPROM, a Flash memory, a FeRAM, or the like, but is not limited to these memories. It should also be noted that the power-supply state recording unit 408 may be implemented as a part of the memory of the memory unit 108.

The system control unit 409 is the same as the system control unit 209 according to Embodiment 2. The system control unit 409 controls the original functions of the NFC device 400, and also performs control for NFC with the reader/writer 20.

It is assumed that the system control unit 409 receives a trigger from a user to power the NFC device 400 OFF, when the second power source unit 104 is ON and operating. For example, the user presses a power-OFF switch, or the system control unit 409 receives a power-OFF signal from a remote controller or the like. Under the assumption, the system control unit 409 writes information indicating the power OFF into the power-supply state recording unit 408, then stops the original functions, and powers the second power source unit 104 OFF. It should be noted that the system control unit 409 may not perform the above processing. It is also possible that the system control unit 409 sends a signal to the second power source unit 104 to stop supplying power to the original functions except the system control unit 409, and also sends an instruction signal to the second clock generation unit 112 to lower a frequency of a generated clock. In short, the system control unit 409 may write information indicating power-OFF into the power-supply state recording unit 408, and then transits to a low power consumption mode.

Moreover, if, for example, the second power source unit 104 is powered ON while a power-supply state of the second power source unit 104 is OFF, the system control unit 409 writes information indicating the power-ON state as the power-supply state onto the power-supply state recording unit 408, and then starts control of the original functions.

The NFC control unit 406 includes at least the above-described functions of the NFC control unit 106. In addition, if the NFC control unit 406 receives a signal (power-supply state reference packet) for referring to a power-supply state of the NFC device 400 from the reader/writer 20, the NFC control unit 406 refers to the power-supply state recording unit 408 and the power-supply state detection unit 407.

If, for example, the power-supply state detection unit 407 is incapable of detecting a power-supply state (power-supply-non-detected state), the NFC control unit 406 notifies the reader/writer 20 of an activation impossible state indicating that the NFC device 400 is incapable of being activated. On the other hand, if the power-supply state detection unit 407 is capable of detecting a power-supply state (power-supply-detected state), the NFC control unit 406 notifies the reader/writer 20 of the state held in the power-supply state recording unit 408. Here, FIG. 11 shows relationship among (a) a state of the power-supply state detection unit 407, (b) a power-supply state held in the power-supply state recording unit 408, and (c) a power-supply state to be notified by the NFC control unit 406.

As described above, the NFC control unit 406 notifies the reader/writer 20 of the power-supply state with reference to the state of the power-supply state detection unit 407 and the power-supply state held in the power-supply state recording unit 408.

The following describes processing performed by the NFC device 400 having the above-described structure.

Figure 12:
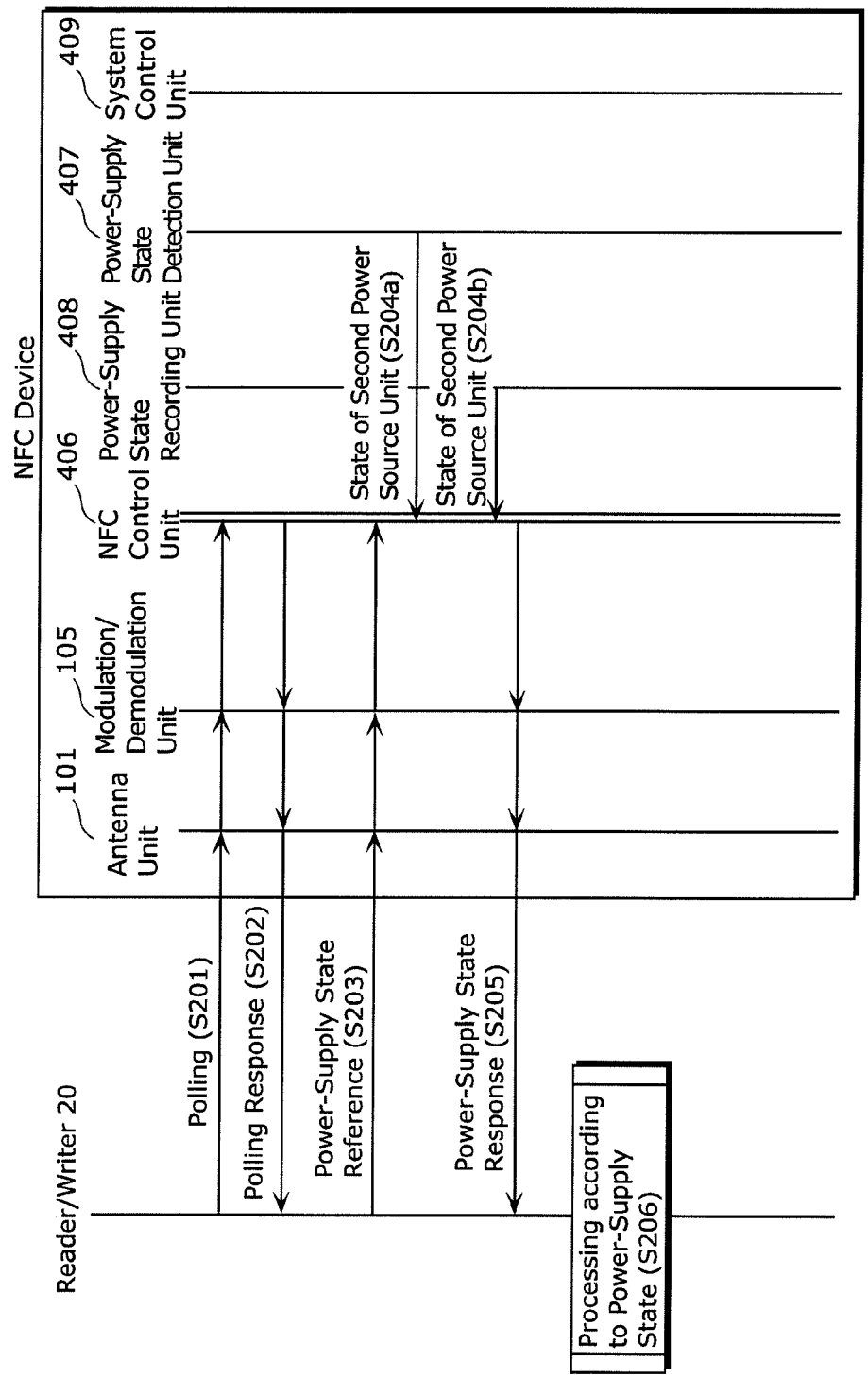
FIG. 12 is a diagram for explaining communication processing performed between the NFC device and a reader/writer according to Embodiment 4.

FIG. 12 is a diagram for explaining communication processing performed between the NFC device and the reader/writer according to Embodiment 4. Here, the same reference numerals of FIG. 4 are assigned to the identical steps of FIG. 12, so that the identical steps are not explained in detail again below.

At S203, the reader/writer 20 transmits a power-supply state reference packet. Subsequently, when the power-supply state reference packet is received, the NFC control unit 406 of the NFC device 400 accesses the power-supply state detection unit 407 and the power-supply state recording unit 408 to obtain the power-supply state detected by the power-supply state detection unit 407 and the power-supply state held in the power-supply state recording unit 408 (S204a, S204b).

Next, according to the power-supply states obtained at S204a and S204b, namely, according to the table of FIG. 11, the NFC control unit 406 determines the power-supply state to be notified to the reader/writer 20. Then, the NFC control unit 406 transmits a power-supply state response including the determined power-supply state back to the reader/writer 20 via the modulation/demodulation unit 105 and the antenna unit 101 (S205).

As described above, the NFC device 400 and the reader/writer 20 perform communication processing.

It should be noted in Embodiment 4 that the screen transition displayed on the reader/writer during the above-described communication processing between the NFC device 400 and the reader/writer 20 is the same as that described in Embodiment 3 with reference to FIG. 9. Therefore, the screen transition is not described again below.

As described above, according to the present embodiment, it is possible to implement an NFC device that enables the reader/writer 20 to obtain information indicating a power-supply state of the NFC device, however the power-supply state of the NFC device is.

More specifically, if the system control unit 409 controls the second power source unit 104 to be powered ON or OFF, the system control unit 409 updates the power-supply state recording unit. Therefore, the reader/writer 20 can learn the power-supply state of the NFC device 400 with reference to the power-supply state recording unit 408 via the NFC control unit 406. Furthermore, if the second power source unit 104 is powered OFF without control of the system control unit 409, for example, if the plug 113 is pulled out, the reader/writer 20 can learn the power-supply state of the NFC device 400 with reference to the power-supply state detection unit 407 via the NFC control unit 406. As described above, however the state of the second power source unit 104 is, the reader/writer 20 can check the power-supply state of the second power source unit 104. Therefore, the reader/writer 20 can perform processing according to the checked power-supply state.

Furthermore, even if the second power source unit 104 is OFF, the provision of the system activation unit 314 enables the reader/writer 20 to power the second power source unit 104 ON.

Figure 13:
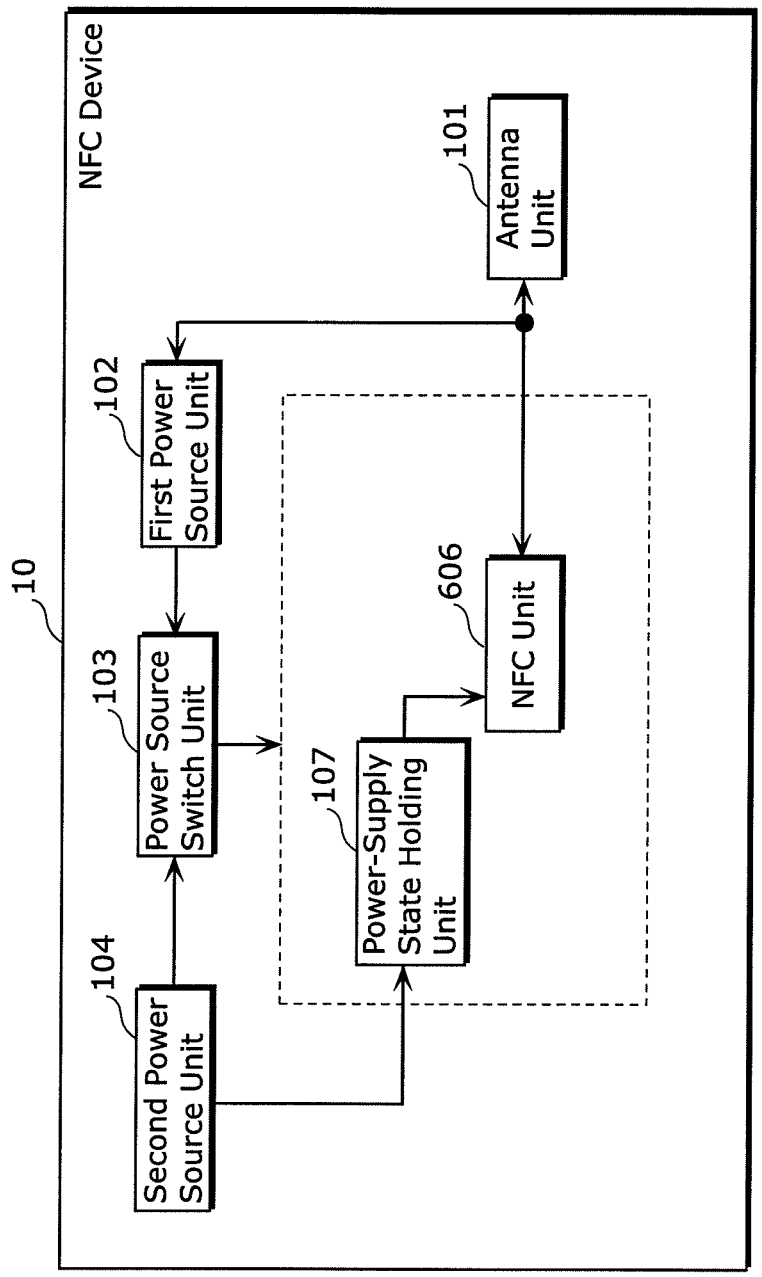
FIG. 13 is a block diagram showing a minimum structure of a communication device according to the present invention.

It should be noted that it has been described in Embodiments 1 to 4 that the NFC devices 100 to 400 are examples of the NFC device 10, but the NFC device 10 is not limited to these examples. As shown in FIG. 13, the NFC device 10 may include, as a minimum structure, the antenna unit 101, the first power source unit 102, the power source switch unit 103, the second power source unit 104, the NFC 606, and the power-supply state holding unit 107. Here, the NFC unit 606 includes at least the NFC control unit 106, and may include the modulation/demodulation unit 105. FIG. 13 shows a block diagram showing the minimum structure of the communication device according to the present invention.

Embodiment 5

In Embodiment 5, description is given for a system or the like using the NFC device 10 according to Embodiments 1 to 4.

The following describes a system according to the present embodiment in detail with reference to the corresponding figures. The system includes: a terminal device (NFC device 10) having an NFC function; a mobile device that performs NFC with the terminal device; and a server device connected to the mobile device via a general-purpose network such as the Internet or a mobile phone network. The system is used to register information such as information detected by the terminal device to a database in the server device via a reader/writer.

Figure 14:
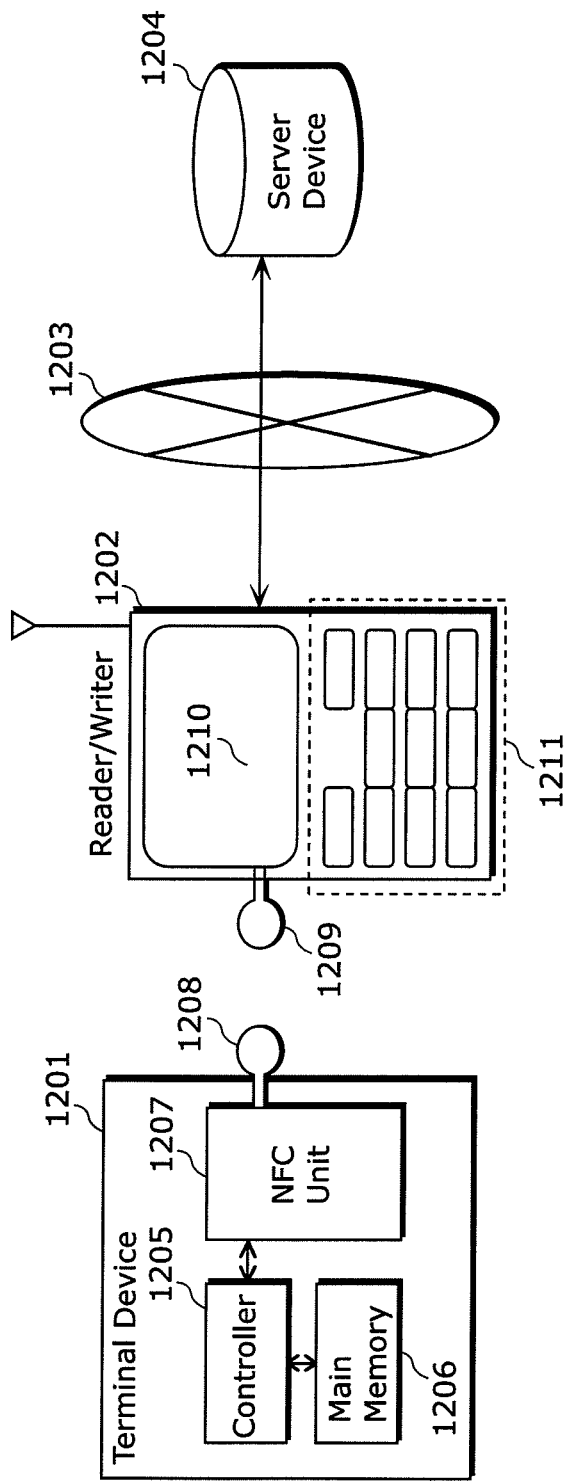
FIG. 14 is a schematic diagram showing an entire system according to Embodiment 5 of the present invention.

FIG. 14 is a schematic diagram showing the entire system according to Embodiment 5. The system includes a terminal device 1201, a mobile device 1202, and a server device 1204.

The terminal device 1201 and the mobile device 1202 can communicate with each other by NFC. NFC in the present embodiment is assumed to be communication between a Radio Frequency Identification (RF-ID) tag (ISO1443) and a reader/writer, which is performed by electromagnetic induction of 13.56 MHz band (High Frequency (HF) band), radio waves between 52 MHz to 954 MHz band (Super High Frequency (UHF) band), or the like, or communication of Near Field Communication (NFC) (ISO/IEC 21481) of 13.56 MHz band. A communicable distance is generally limited to several dozens of centimeters in the HF band, or several centimeters in the UHF band. Therefore, the mobile device is presented to (or touches) the terminal device to establish the communication.

In the present embodiment, the description is given for the configuration in which the mobile device 1202 side has a reader/writer function and the terminal device 1201 has an IC tag function. However, the present embodiment is characterized in that the terminal device 1201 and the mobile device 1202 can exchange information by FSC. Therefore, it is also possible in the present embodiment that the mobile device 1202 side has the IC tag function and the terminal device 1201 side has the reader/writer function. Moreover, for the NFC, a peer-to-peer (P2P) communication function, a tag emulation, and a reader/writer emulation have been standardized. These functions make no difference which device should have an IC tag or a reader/writer. Therefore, for the sake of simplicity in the description, it is assumed in the present embodiment that the mobile device 1202 side has a reader/writer function and the terminal device 1201 has an IC tag function.

The terminal device 1201 includes a controller 1205, a main memory 1206, an NFC unit 1207, and a loop antenna 1208.

The controller 1205 is a Central Processing Unit (CPU) that is a system controller of the terminal device 1201. The controller 1205 performs at least system control for the processing units in the terminal device 1201 except the FSC unit.

The main memory 1206 and an NFC memory 1315 serve as the memory unit 108. Here, as described above, the memory unit 108 is a memory on which data regarding the terminal device 1201 can be recorded. The data includes at least a use history indicating a history of operations of the terminal device 1201 corresponding to the NFC device. The main memory 1206 holds data regarding the terminal device 1201. More specifically, the main memory 1206 is a memory including a non-volatile memory that is capable of holding control software executed by the controller 1205, and various data detected by the terminal device 1201. The main memory 1206 is generally embedded in a Large-Scale Integration (LSI) of the controller 1205. However, the main memory 1206 may be outside the terminal device 1201.

The NFC unit 1207 communicates with the reader/writer in the mobile device 1202. The NFC unit 1207 modulates data to be transmitted to the reader/writer, and demodulates data transmitted from the reader/writer. In addition, the NFC unit 1207 generates power from radio waves received from the reader/writer of the mobile device 1202, in order to establish at least FSC, and also extracts clock signals from the received radio waves. Therefore, at least the NFC unit in the terminal device 1201 operates by using the power and clock obtained from the radio waves received from the reader/writer. As a result, the FSC unit 1207 can perform FSC with the mobile device 1202 even if a main power source of the terminal device 1201 is OFF.

The loop antenna 1208 is used to perform NFC with the reader/writer of the mobile device 1202.

The mobile device 1202 includes an antenna 1209, a display unit 1210, and keys 1211.

The antenna 1209 is used to perform NFC with the terminal device 1201. For example, when polling is sent to an IC tag of the terminal device 1201 and communication is established between the terminal device 1201 and the mobile device 1202, the antenna 1209 reads information from the terminal device 1201 or writes information into the terminal device 1201.

The display unit 1210 is a unit for displaying a result of NFC with the terminal device 1201, or data transmitted from the server device 1204. An example of the display unit 1210 is a liquid crystal display.

The set of keys 1211 is an interface that enables a user to operate the mobile device 1202. When an input is made by using the keys 1211, the NFC unit in the mobile device 1202 is activated. After the activation, the mobile device 1202 starts polling to the terminal device 1201 for FSC. In general, polling keeps emitting radio waves to unspecified receivers. The mobile device driven by a battery is therefore under load in terms of battery duration. Therefore, if the mobile device 1202 may be provided with a button dedicated for polling, it is possible to avoid unnecessary polling and to reduce user's load of device operations.

The server device 1204 is a server having a database. The server device 1204 is generally implemented as a web server having a database. The server device 1204 registers, onto the database, information transferred from the mobile device 1202, then transfers the result information to the mobile device 1202, and causes the display unit 1210 of the mobile device 1202 to display the result information.

In the above-described system configuration, it is possible to register information detected by the terminal device 1201 onto the database in the server device 1204 via the mobile device 1202. For example, to the mobile device 1202, the terminal device 1201 transfers, by FSC, information such as a product serial number, a model number, manufacturer identification information, and the like which are used to uniquely identify the terminal device. Then, the mobile device 1202 transfers, to the server device 1204, (a) information received from the terminal device 1201 via FSC, (b) information for identifying the user or the mobile device itself, which is stored in the mobile device 1202 (an e-mail address, a telephone number, a mobile terminal identification information, or a Substriber Identity Module (SIM) card ID), and (c) information for determining a position if the mobile device 1202 can detect position information (GPS information, Assisted-GPS information, or position information estimated based on a base station in a mobile network). The server device 1204 registers these pieces of information onto the database, which makes it possible to eliminate user's load for inputting various pieces of information, and, in practice, to perform user registration of the terminal device 1201 merely by presenting the mobile device 1202 to the terminal device 1201.

Furthermore, as detected information of the terminal device 1201, the mobile device 1201 can sent a trouble occurrence state or use history information to the server device 1204. The above configuration enables the manufacturer to, for example, speedily determine and handle an initial failure of a specific lot in the terminal device 1201. Moreover, the above configuration enables the manufacturer to specify functions used by each user based on the use history information in order to develop next products.

The following describes the terminal device 1202 according to the present embodiment in more detail with reference to corresponding figures.

Figure 15:
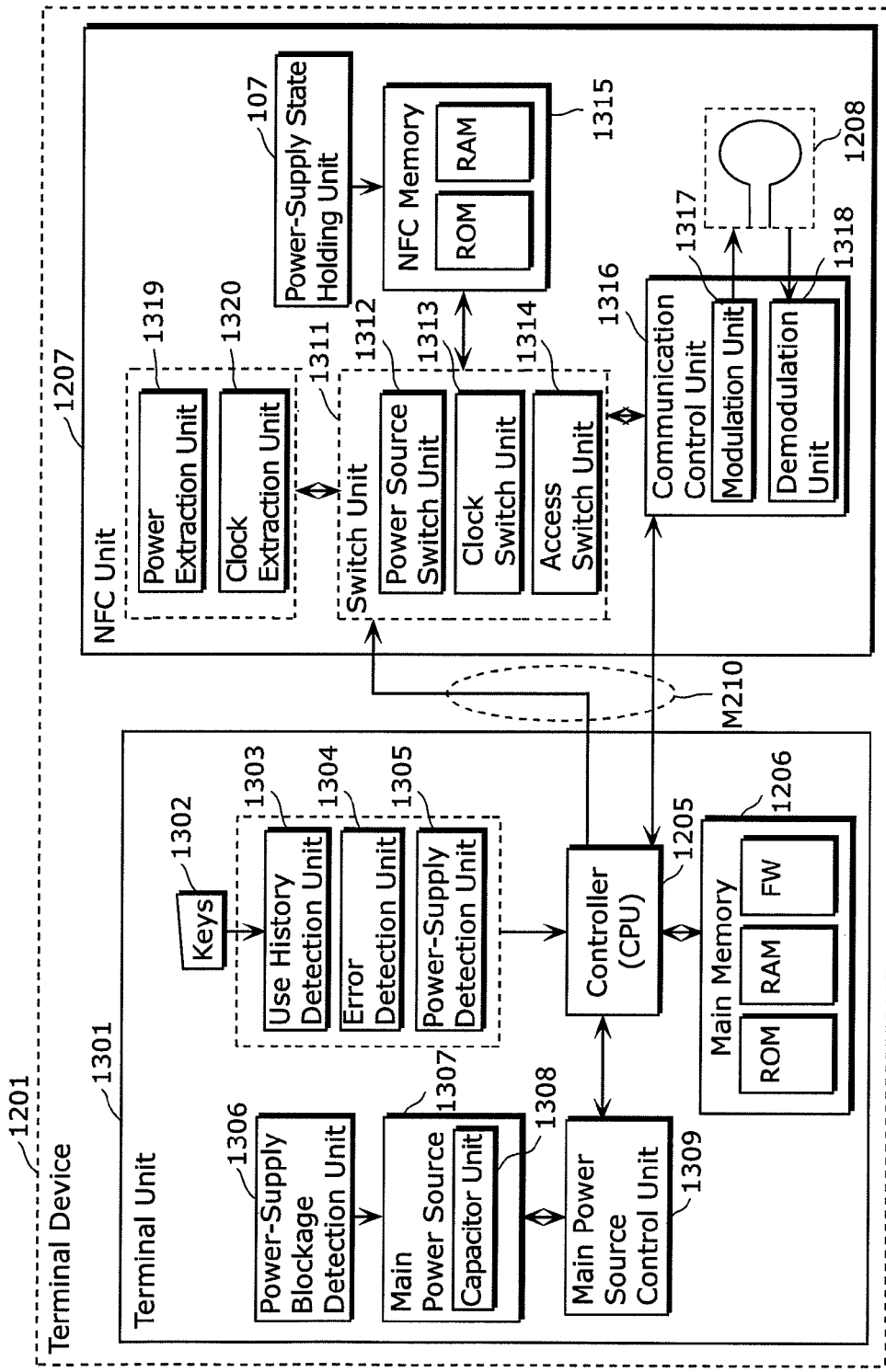
FIG. 15 is a block diagram showing a structure of a terminal device according to Embodiment 5.

FIG. 15 is a block diagram showing a structure of the terminal device 1201 according to Embodiment 5.

The terminal device 1201 includes a terminal unit 1301 and an NFC unit 1207. The terminal unit 1301 and the NFC unit 1207 are connected by an interface (serial interface, Universal Serial Bus (USB), or the like) to be communicable with each other.

The terminal unit 1301 serves as a primary function of the terminal device 1201. If the terminal device 1201 is a refrigerator, the terminal unit 1301 is a refrigerating function. If the terminal device 1201 is a microwave, the terminal unit 1301 is a cooking function. If the terminal device 1201 is an air conditioner, the terminal unit 1301 is an air-conditioning function. The terminal device 1201 according to the present embodiment is any electronic terminal device or home appliance. The following describes only common functions shared by such terminal devices 1201 according to the present embodiment.

The terminal unit 1301 includes a controller 1205, a main memory 1206, a set of keys 1302, a use history detection unit 1303, an error detection unit 1304, a power-supply detection unit 1305, a power-supply blockage detection unit 1306, a main power source 1307, and a main power source control unit 1309.

The controller 1205 is a system controller capable of controlling at least the terminal unit 1301 and a switch unit 1311 in the NFC unit 1207. Therefore, the controller 1205 is implemented as a microcomputer or a CPU. It should be noted that the controller 1205 corresponds to the above-described system control unit 109.

The main memory 1206 includes: a non-rewritable Read-Only Memory (ROM) region; a rewritable Random Access Memory (RAM) region; and a firmware (FW) region on which a firmware describing control procedures of the controller 1205 is recorded. On the ROM region, identification information for identifying the terminal unit 1301, production year/month/date, manufacturer identification information, and the like regarding the terminal device 1201 are recorded. On the RAM region, use history information collected by the use history detection unit 1303, error information detected by the error detection unit 1304, and the like regarding the terminal device 1201 are recorded. On the FW region, a firmware that is control procedures of the controller 1205 is recorded. The FW region may be a ROM memory or a RAM memory. However, in order to provide a below-described function of updating the firmware, a RAM memory is adopted as the FW region.

The keys 1302 are operation buttons of the terminal device 1201. The keys 1302 receive user operations.

According to a user's operation using the keys 1302, the use history detection unit 1303 detects, as a user history, a history of operations performed, and accumulates the detected use history into the main memory 1206. In general, there is a possibility that infinite use histories are accumulated. It is therefore desirable that the main memory 1206 has a First In First Out (FIFO) stack structure, so that newer history information is recorded on a memory region on which pieces of use history information can be accumulated.

The power-supply detection unit 1305 detects a power-supply state of the main power source 1307 described later. The power-supply state to be detected is classified into at least three states: a state where power is ON (power-ON state), a state where a controller can control a power source (sleep mode), and a state where power is OFF (power-OFF state). More specifically, the power-ON state is detected when power is ON. Then, a change from the power-ON state to a sleep mode or a power-OFF state is detected immediately prior to the change by the controller 1205. The power state is managed in the main memory or the NFC memory 1315 in the NFC unit 1207. It should be noted that the power-supply detection unit 1305 corresponds to the above-described power-supply state holding unit 107.

The power-supply blockage detection unit 1306 detects that a power source such as a plug is unexpectedly blocked from supplying power to the terminal device 1201 not having a power source such as a battery. The power-supply blockage detection unit 1306 detects such power-supply blockage according to decrease or the like of a value of a voltage applied to the main power source 1307. Furthermore, the power-supply blockage detection unit 1306 is operated by receiving power from the capacitor unit 1308 in the main power source 1307. Therefore, even if the plug is disconnected, the power-supply blockage detection unit 1306 can stably detect the power-supply blockage and notify the detection result to the power-supply detection unit 1305. As a result, the power-supply detection unit 1305 stores flag information indicating the power-supply blockage into the main memory or the NFC memory in the NFC unit 1207.

The main power source 1307 is a main power source of the terminal device 1201. The main power source 1307 supplies power by using a battery or plug connection. The main power source 1307 performs the power supply for at least accesses from the terminal unit 1301 to the NFC memory 1315 and the NFC communication unit 1207 to the NFC memory 1315. It should be noted that the main power source 1307 corresponds to the above-described second power source unit 104.

The main power source control unit 1309 starts (activation) or stops (termination) power supply depending on an activation or termination instruction from the controller. It should be noted that the main power source control unit 1309 corresponds to the above-described system control unit 109 and the like.

On the other hand, the NFC unit 1207 is coupled with the terminal unit 1301 via a serial interface or the like. The NFC unit 1207 includes the power-supply state holding unit 107, the switch unit 1311, the NFC memory 1315, a communication control unit 1316, a power extraction unit 1319, a clock extraction unit 1320, and the loop antenna 1208.

The loop antenna 1208 receives radio waves from an external reader/writer.

The communication control unit 1316 includes: a demodulation unit 1318 that demodulates radio waves received by the loop antenna 1208; and a modulation unit 1317 that modulates information to be transfers to a reader/writer via the loop antenna 1208. It should be noted that the communication control unit 1316 corresponds to the to above-described NFC control unit 106 that includes the modulation/demodulation unit 105.

The power extraction unit 1319 generates power necessary to operate at least the NFC unit 1207 by electromagnetic induction from radio waves received by the loop antenna 1208.

Furthermore, the clock extraction unit 1320 extracts a clock signal from the radio waves transmitted from the reader/writer, and provides the clock signal to a digital circuit unit in the NFC unit 1207.

The NFC unit 1207 can operate by using the power extracted by the power extraction unit 1319 and the clock signal, extracted by the clock extraction unit 1320. Therefore, the NFC unit 1207 has a passive tag function (battery-less mode) by which, however the state of the main power source 1307 in the terminal unit 1301 is, if radio waves are received from a reader/writer, the NFC unit 1207 can transfer the information stored in the NFC memory 1315 to the reader/writer, or receive transfer data from the reader/writer to be recorded on the NFC memory 1315. In other words, the NFC memory 1315 is a memory directly from which the NFC unit 1207 can read data.

The NFC memory 1315 performs mirror recording of a part of data regarding the terminal device 1201 recorded on the main memory 1206. The NFC unit 1207 can read the data directly from the NFC memory 1315. More specifically, the NFC memory 1315 has a ROM region and a RAM region. It should be noted that the NFC memory 1315 may have the power-supply state holding unit 107 as a part of the RAM region.

On the ROM region (a region that is not rewritable, or is updatable only once at the time of production), at least (a) identification information for uniquely identifying the NRC unit, (b) terminal device identification information or model number for uniquely identifying the terminal device 1201, and (c) address information of the server device 1204 are recorded.

On the RAM region, also the use history information extracted by the use history detection unit 1303 in the terminal unit 1301, the error information detected by the error detection unit 1304, and the power-supply state detected by the power-supply detection unit 1305 are stored by the controller 1205. In addition, information transferred from the reader/writer is temporarily stored in the RAM region. Therefore, the RAM region stores, by mirroring, a part of the information recorded on the main memory 1206.

The switch unit 1311 includes a power source switch unit 1312, a clock switch unit 1313, and an access switch unit 1314. The power source switch unit 1312 switches between the power source in the terminal unit 1301 and the power source detected by the power extraction unit 1319, in order to supply power to activate the NFC memory 1315. The clock switch unit 1313 switches between the clock signal generated in the terminal unit 1301 and the clock signal extracted by the clock extraction unit 1320, in order to be provided to activate the NFC memory 1315. The switch unit 1311 provides the NFC memory 1315 with the power extracted by the power extraction unit 1319 and the clock signal extracted by the clock extraction unit 1320, if there is no instruction from the controller 1205. Moreover, the switch unit 1311 performs control according to an instruction from the controller 1205 in order to supply power and clock from the terminal unit 1301, when data recorded on the NFC memory 1315 is to be referred to or rewritten according to access from the controller 1205. The switch unit 1311 desirably performs the control to prioritize a first-come access. For example, even if an instruction for switching is received from the controller 1205 while the switch unit 1311 accesses the NFC memory via NFC, the switch unit 1311 does not perform the instructed switching but notifies the controller of that the NFC is being performed. On the other hand, even if the reader/writer requests to access the NFC memory 1315 by using NFC while the controller 1205 is accessing the NFC memory 1315, the switch unit 1311 does not accept the access request during the access from the controller 1205. With the above structure, it is possible to prevent two accesses to the NFC memory 1315 from updating the data in the NFC memory at the same time. Furthermore, if at least the RAM region in the NFC memory 1315 has a redundant capacity to receive two accesses at the same time, it is not necessary to wait during another access. As a result, an access speed can be increased. It should be noted that the switch unit 1311 corresponds to the above-described power source switch unit 103 and the clock switch unit 111. It should also be noted that the power extraction unit 1319 corresponds to the first power source unit 102. It should also be noted that the clock extraction unit 1320 corresponds to the above-described first clock generation unit 110.

The above structure has advantages in the following situations. For example, the error detection unit 1304 detects an error, and at the same time, the controller 1205 causes the NFC memory 1315 to hold the use history information recorded in the main memory 1206 and the detected error. Therefore, even if the error detected by the terminal unit 1301 causes an inoperative state of the terminal unit 1301, use histories leading up to the error are accumulated in the NFC memory 1315. As a result, an external device with a reader/writer, such as the mobile device 1202, can read the use histories leading up to the error. The manufacturer can therefore easily replicate the trouble and analyze the trouble.

Moreover, for example, if update information of a firmware of the terminal unit 1301 is received from a reader/writer and the firmware is to be updated, or if data for updating a function of the terminal device 1201, such as an addition of a recipe for a microwave, is received, the terminal unit 1301 should be powered ON. In this case, a power-supply state of the terminal device 1201 is also recorded on the NFC memory 1315. Therefore, the reader/writer can read the power-supply state of the terminal unit 1301 from the NFC memory 1315 by merely touching the terminal device 1201. As a result, the reader/writer can determine whether or not the firmware can be updated. As described above, if the power-supply state of the terminal unit 1301 is recorded on the NFC memory 1315, the mobile device 1201 having a reader/writer and the server device 1204 capable of communicating with the mobile device 1202 can determine the power-supply state of the terminal unit 1301 and perform processing according to the power-supply state. For example, if the server device 1204 determines that the version of the firmware of the terminal device 1201 should be upgraded and that the terminal unit 1301 is at the sleep mode, the server device 1204 can transmit an activation command to the terminal device 1201 via the mobile device 1202. Moreover, if the terminal unit 1301 is disconnected from the plug, it is possible to display, on the display unit 1210 of the mobile device 1202, a message for persuading the user to connect the plug to the terminal unit 1301.

Figure 16A:
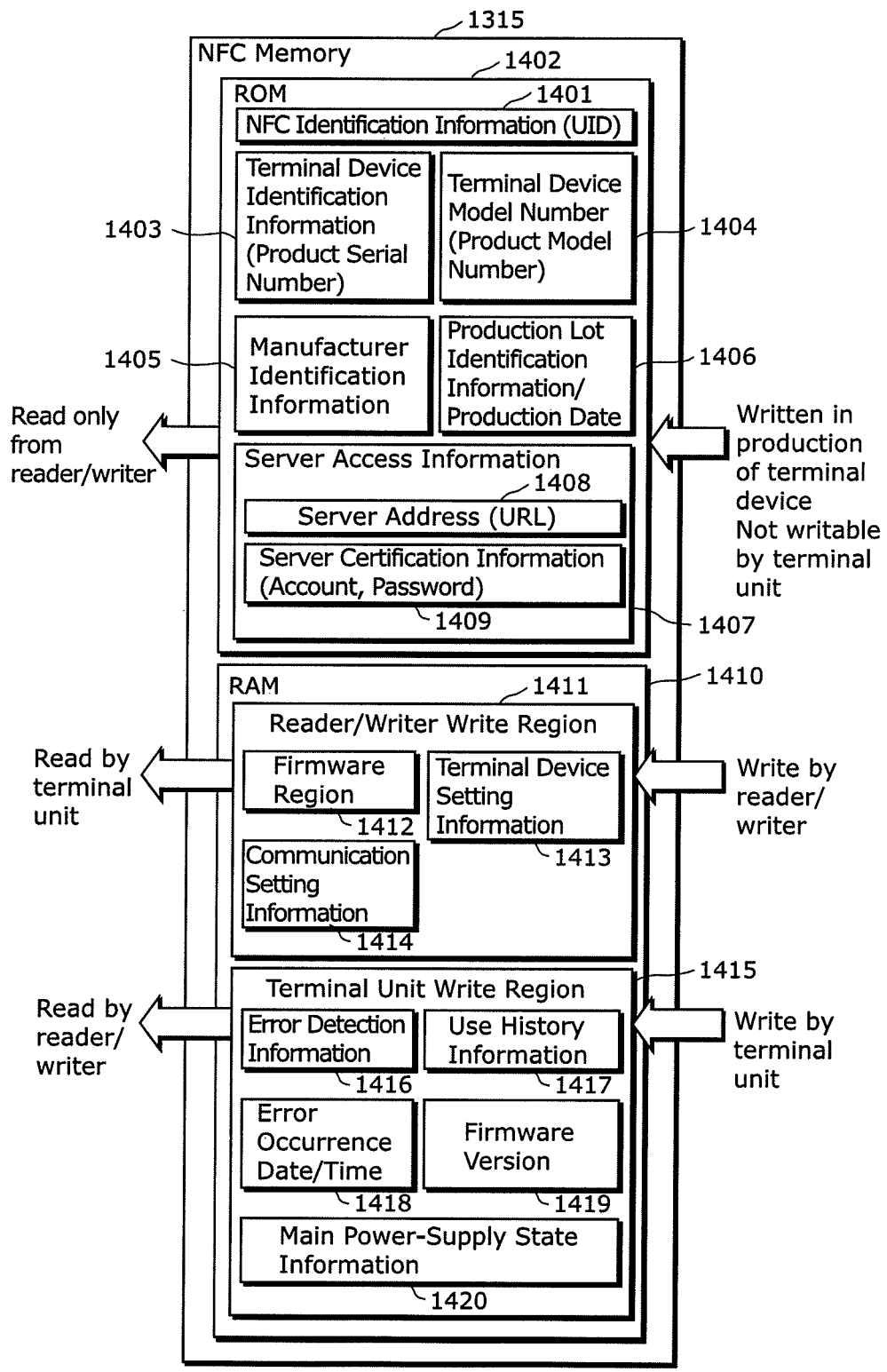
FIG. 16A is a schematic diagram showing pieces of information recorded on a NFC memory in the terminal device according to Embodiment 5.

FIG. 16A is a schematic diagram showing pieces of information recorded on the NFC memory 1315 in the NFC unit 1207 of the terminal device 1201 according to Embodiment 5.

The NFC memory 1315 includes a rewritable ROM region 1402 and an updatable RAM region 1410.

The ROM region 1402 holds: NFC identification information (UID) 1401 for uniquely identifying the NFC unit 1207; terminal device identification information (product serial number) 1403 written at a process in production of the terminal device 1201; a terminal device model number (product model number) 1404, the manufacture identification information 1405, and production lot identification information/ production date 1406. These pieces of information are transmitted to the server device 1204 so that the manufacturer can identify the terminal device based on the information.

Furthermore, server access information 1407 is also recorded on the ROM region 1402. The server access information 1407 is necessary to transfer information read from the terminal device 1201 by using NFC, to the server device 1204 via the mobile device 1202. The server access information 1407 includes a sever address (URL) 1408 and server certification information (login account, password) 1409. The server access information 1407 is also recorded during the production process of the terminal device 1201. With the structure, it is possible to prevent that terminal device information of a company A is transferred to a server of a company B different from the company A. User use history and the like of a company is important data which the company does not wish to leak to other companies. Therefore, it is important to connect to a server corresponding to the terminal device. Thereby, the connection can be realized by recording the server access information on the NFC memory 1315.

Furthermore, as described previously, the pieces of information in the ROM region have been written in the production of the terminal device 1201. It should be noted that the ROM region may be physically implemented as a rewritable Flash memory or the like. In this case, the ROM region is managed as a read-only region for the reader/writer of the mobile device 1202. The above structure can prevent malicious operations such as impersonation by maliciously rewriting identification information and rewriting recorded information to wrong server access information. As a result, security can be improved.

On the other hand, the updatable RAM region 1410 includes: a region (reader/writer write region 1411) to which only the reader/writer of the mobile device 1201 is permitted to write data; and a region (terminal unit write region 1415) to which only the terminal unit 1301 of the terminal device 1201 is permitted to write data.

The reader/writer write region 1411 includes a firmware region 1412 and a communication setting information region 1414. The firmware region 1412 is a region holding a firmware (hereinafter, referred to also as a "new-version firmware") to which the firmware of the terminal device 1201 is to be updated. The communication setting information region 1414 holds terminal device setting information 1413 indicating setting information of the terminal device, such as recipe information for a microwave and a steaming program for a rice steamer. Or, if the terminal device 1201 has a general-purpose network (for example, Wi-Fi, Zegbee, Eather, or the like) different from NFC, the communication setting information region 1414 holds communication certification information (WEP/WPA key for Wi-Fi) for the network.

The terminal unit write region 1415 is a region to which only the controller 1205 of the terminal unit 1301 is permitted to write data. The information recorded on the main memory 1206 is written into the terminal unit write region 1415. The terminal unit write region 1415 includes error detection information 1416, the error occurrence date/time 1418, use history information 1417, a firmware version 1419, and main power-state information 1420. The error detection information 1416 indicates an error detected by the error detection unit 1304 of the terminal unit 1301. The error occurrence date/time 1418 indicates date and time of occurrence of the error. The use history information 1417 indicates a history of a use detected by the use history detection unit 1303. The firmware version 1419 indicates a version of the firmware recorded on the firmware region of the main memory 1206 of the terminal unit 1301. The main power-supply state information 1420 indicates a power-supply state detected by the power-supply detection unit 1305. These pieces of information are read by the reader/writer of the mobile device 1202 and transmitted to the server device 1204. Thereby, the server device 1204 can determine, based on the firmware version of the terminal device 1201, whether or not the firmware can be updated. In addition, the server device 1204 can determine, based on the power-supply state information, whether or not the firmware updating is possible.

It should be noted that the pieces of information recorded on the NFC memory 1315 are not limited to the pieces of information shown in FIG. 16A. The following describes another example of the pieces of information with reference to FIG. 16B.

Figure 16B:
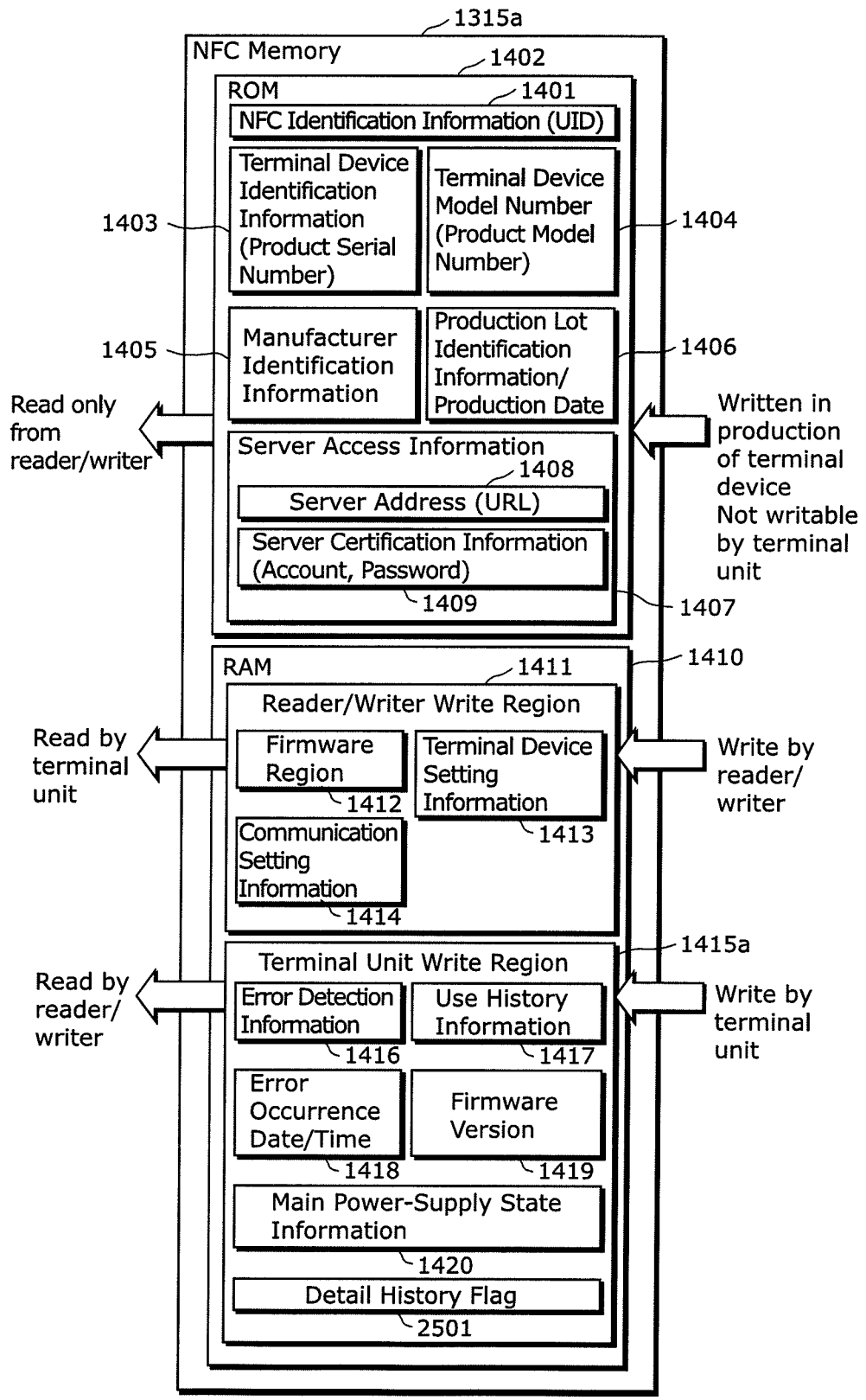
FIG. 16B is a schematic diagram showing pieces of information recorded on the NFC memory in the terminal device according to Embodiment 5.

FIG. 16B is a schematic diagram showing pieces of information recorded on the NFC memory 1315 in the NFC unit 1207 of the terminal device 1201 according to Embodiment 5. Here, the same reference numerals of FIG. 16A are assigned to the identical elements of FIG. 16B, so that the identical elements are not explained again below.

An NFC memory 1315a shown in FIG. 16B differs from the NFC memory 1315 shown in FIG. 16A in that a terminal unit write region 1415a further includes a detail history flag 2501.

The detail history flag 2501 is a flag indicating whether or not there is any data which is recorded on the main memory 1206 but not mirror-recorded on the NFC memory 1315a. More specifically, the detail history flag 2501 indicates whether or not the main memory 1206 of the terminal device 1201 holds history information or detailed information such as detailed error information, which cannot be stored in the terminal unit write region 1415a of the NFC memory 1315a due to a capacity limit.

Then, from the main memory 1206, the NFC unit 1207 reads data which is not mirror-recorded from the main memory 1206 to the NFC memory 1315a. More specifically, the reader/writer 1202 refers to the main power-supply state information 1420 and the detail history flag 2501 in the NFC memory 1315a via the NFC unit 1207. If the main power source 1307 is ON and the main memory 1206 of the terminal device 1201 holds the detailed history, the reader/writer 1202 accesses the main memory 1206 of the terminal device 1201 to read the detailed history.

With the above structure, the reader/writer 1202 can read detailed history or detailed error information that cannot be stored in the NFC memory 1315a due to capacity limit.

Here, examples of the detailed history is a history of channel setting if the terminal device 1201 is a TV, and a history of temperature setting information if the terminal device 1201 is a refrigerator. The detailed history may be a history indicating how the user has used the terminal device, information of a clock, and the like. In short, the detailed history is a history of information indicating a current state and setting state of the terminal device 1201, except information indicating a power-supply state.

For example, if the terminal device 1021 has a trouble or the like, there is a situation where the data mirror-recorded in the NFC memory 1315 is not enough to determine the trouble. In the situation, the detail history flag 1202 allows the reader/writer 1202 to detect that the main memory 1206 holds information more than the information mirror-recorded on the NFC memory 1315. Therefore, the reader/writer 1202 can obtain further information (detailed history, detailed error information, or the like) regarding the terminal device 1201 from the main memory 1206. As a result, more detailed trouble determination can be made.

As described above, the NFC memory 1315 may further include a detail history flag 2501. With the structure, although the NFC memory 1315 is independent from the main memory 1206, the reader/writer 1202 can determine based on the detail history flag 2501 whether or not information read from the NFC memory 1315a is enough or it is necessary to access the main memory 1206 to obtain more information.

Next, the flow of the processing performed by the controller 1205 of the terminal unit 1301 is described.

Figure 17A:
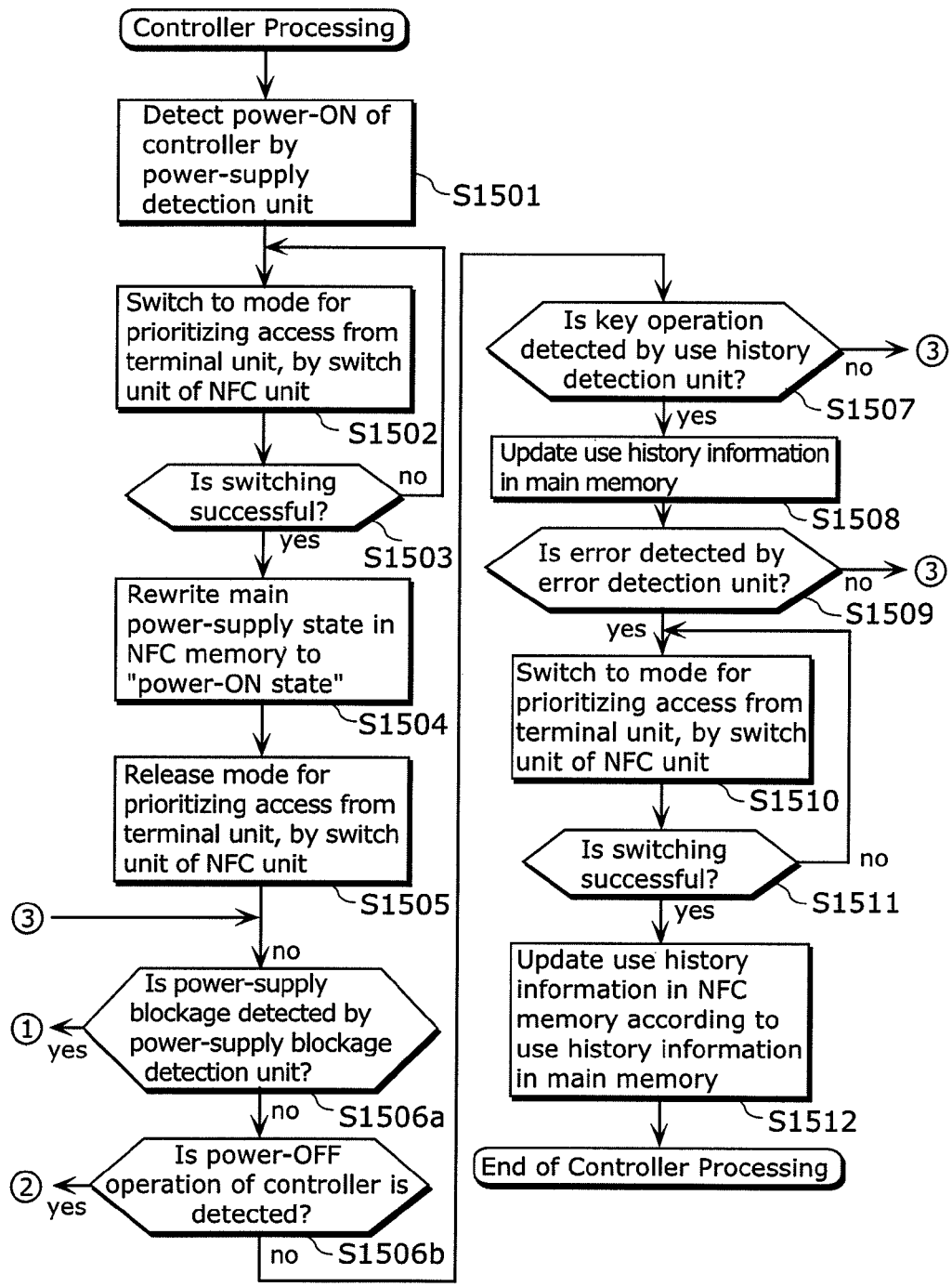
FIG. 17A is a flowchart showing processing performed by a controller of the terminal device according to Embodiment 5.
Figure 17B:
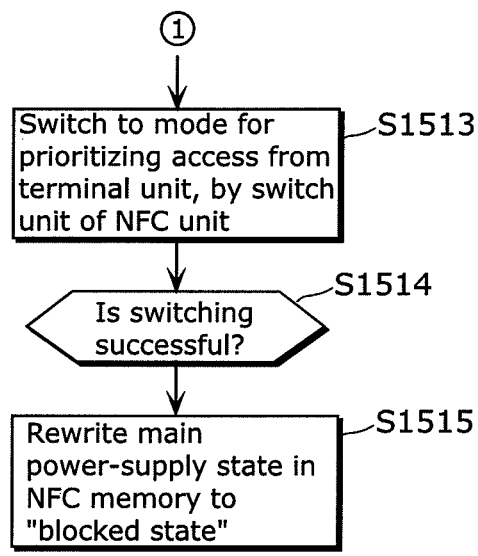
FIG. 17B is a flowchart showing processing performed by the controller of the terminal device according to Embodiment 5.
Figure 17C:
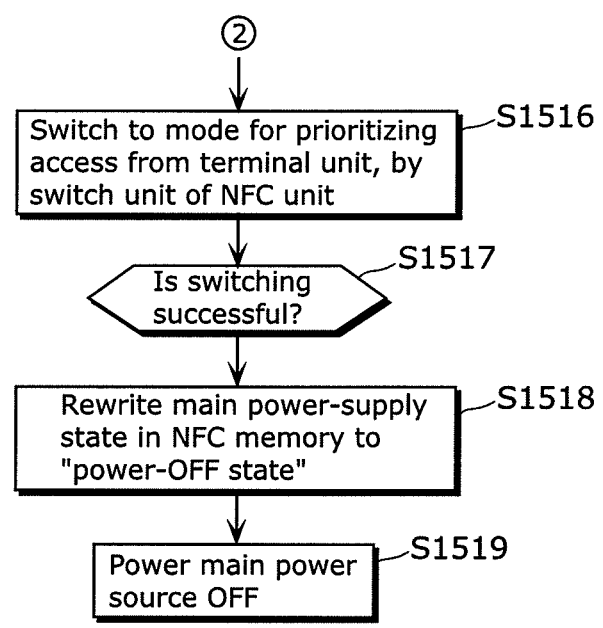
FIG. 17C is a flowchart showing processing performed by the controller of the terminal device according to Embodiment 5.

FIGS. 17A to 17C are flowcharts of the processing performed by the controller 1205 of the terminal unit 1301.

First, the user powers the terminal device 1201 ON, and the power-supply detection unit 1305 detects that the power-ON state based on a voltage level applied to the controller 1205 (S1501).

After the power-supply detection unit 1305 detects the power-ON state, the switch unit 1311 of the NFC unit 1207 switches to a mode for prioritizing access from the terminal unit 1301 (S1502). The switch unit 1311 performs the switching so that the NFC memory 1315 is activated by using power and clock supplied from the terminal unit 1301. After the switching, a switch completion signal is sent to the controller 1205.

The controller 1205 receives the switch completion signal from the switch unit 1311 and thereby determines whether or not the switching has been completed (S1503). If it is determined that the switching has not yet been performed (No at S1503), then setting is performed again to switch to the mode for prioritizing access from the terminal unit at S1502. On the other hand, if it is determined that the switching has been performed (Yes at S1503), then the main power-supply state in the NFC memory is rewritten to "power-ON state" (S1504).

If the rewriting of the main power-supply state in the NFC memory has been completed at S1504, the switch unit in the NFC unit releases the mode for prioritizing access from the terminal unit, and switches to a mode for prioritizing access from the NFC unit (S1505). Therefore, if the power-supply detection unit detects the power-ON state of the controller 1205 at S1501, after the switch unit 1311 of the NFC unit 1207 switches to the mode for prioritizing access from the terminal unit 1301, the terminal unit 1301 rewrites the main power-supply state in the NFC memory 1315 to "power-ON state", and the switch unit 1311 releases the mode for prioritizing access from the terminal unit 1301.

After releasing the mode for prioritizing access from the terminal unit 1301, the power-supply blockage detection unit 1306 determines whether or not the power supply is blocked (S1506a). If power-supply blockage is detected (yes at S1506a), then Steps 1513 to 1515 in FIG. 17B are performed by using power charged in the capacitor unit 1308 of the main power source 1307, and then this processing is completed.

As shown in FIG. 17B, at S1513, likewise S1502, the switch unit 1311 of the NFC unit 1207 sets the mode for prioritizing access from the terminal unit 1301. At S1514, it is determined whether or not the mode for prioritizing access from the terminal unit 1301 has been set. If it is determined that the mode has been set (yes at S1514), then the main power-supply state information in the NFC memory 1315 is rewritten to "power blocked state".

If any power-supply blockage is not detected (no at S1506), then it is determined whether or not a power-OFF operation of the controller is detected at S1506b. If the power-OFF operation is detected (yes at S1506b), then Steps S1516 to S1519 in FIG. 17C are performed.

As shown in FIG. 17C, at S1516, likewise S1502, the switch unit 1311 of the NFC unit 1207 sets the mode for prioritizing access from the terminal unit 1301. At S1517, it is determined whether or not setting to the mode for prioritizing access from the terminal unit 1301 has been completed. At S1518, the main power-supply state in the NFC memory 1315 is rewritten to "power-OFF state". Moreover, at S1519, after rewriting the power-supply state to "power-OFF state" at S1518, the power source of the terminal unit 1301 is set to be powered OFF and thereby the system of the terminal device is terminated.

Here, the power-supply state described in the present embodiment is described in more detail. The "power-ON state" in the present embodiment refers to a state where the terminal unit 1301 is powered ON and activated. The "power-OFF state" refers to a state where the system of the terminal device is terminated. In the power-OFF state, however, the terminal device is not blocked from a power supply source, and the system can be activated anytime by an operation from the user (for example, pressing of a power-ON button). The power-supply blocked state refers to a state where power supply to the terminal device is blocked. For example, a plug is disconnected, or a battery is removed from the terminal device. The power-supply blocked state differs from the power-OFF state in that the terminal device cannot be activated by user's key operation.

It should be noted that Steps S1505 and S1506 are performed in the system flow in the present embodiment, but each of the steps is desirably performed as a separate thread by an event of changing the power-supply state.

Moreover, if none of the power-supply blocked state and the power-OFF state is not detected at S1505 and S1506, the use history detection unit 1303 determines whether or not user's key operation is detected (S1507). If any user's key operation is detected (no at S1507), then the processing returns to S1505.

On the other hand, if the user's key operation is detected (yes at S1507), then the use history information in the main memory 1206 is updated according to the detected key operation (S1508).

Next, according to a key operation, the error detection unit 1304 determines whether or not an error is occurred in the terminal unit 1301 (S1509). If an error is not detected (no at S1509), then the processing returns to S1506a.

At S1509, if an error is detected (yes at S1509), then the switch unit 1311 of the NFC unit 1207 switches to the mode for prioritizing access from the terminal unit 1301 (S1510).

At S1511, it is determined whether or not the switching to the mode for prioritizing access from the terminal unit 1301 at S1510 has been completed. If the switching has not yet been completed (no at S1511), then the processing returns to S1510.

On the other hand, if the switching has been completed, then the use history information in the NFC memory 1315 is updated according to the use history information in the main memory 1206 (S1512) and the processing is completed.

Therefore, in the present embodiment, the use history information, such as a key operation, which is detected by the use history detection unit 1303 is temporarily accumulated in the main memory 1206. Furthermore, when the error detection unit 1304 detects an error, the use history information accumulated in the main memory 1206 is written together with identification information of the error into the NFC memory 1315. Moreover, if the use history storage region in the NFC memory 1315 is smaller than the use history information accumulated in the main memory 1206, a piece of use history information immediately close to a timing of detecting the error is selected to be recorded onto the NFC memory 1315.

With the above structure, the NFC memory 1315 accumulates use histories of a few steps leading up to the detection of the error. Furthermore, data in the NFC memory 1315 can be read by an external reader/writer by using NFC, even if the terminal unit 1301 is not activated. Therefore, for example, even if an error prevents the terminal unit 1301 from being powered ON, it is possible to read pieces of use history information of a few steps leading up to the error from the outside. As a result, it is possible to reduce a loss cost occurred by a problem of failing to replicate the trouble (error) in a repair plant. This is because the problem of failing to replicate the trouble in a repair plant occurs when use histories leading up to the error are not clear. The structure of the present embodiment, in which the use histories of a few steps leading up to the error can be read from the outside, can significantly suppress such a problem.

Figure 18:
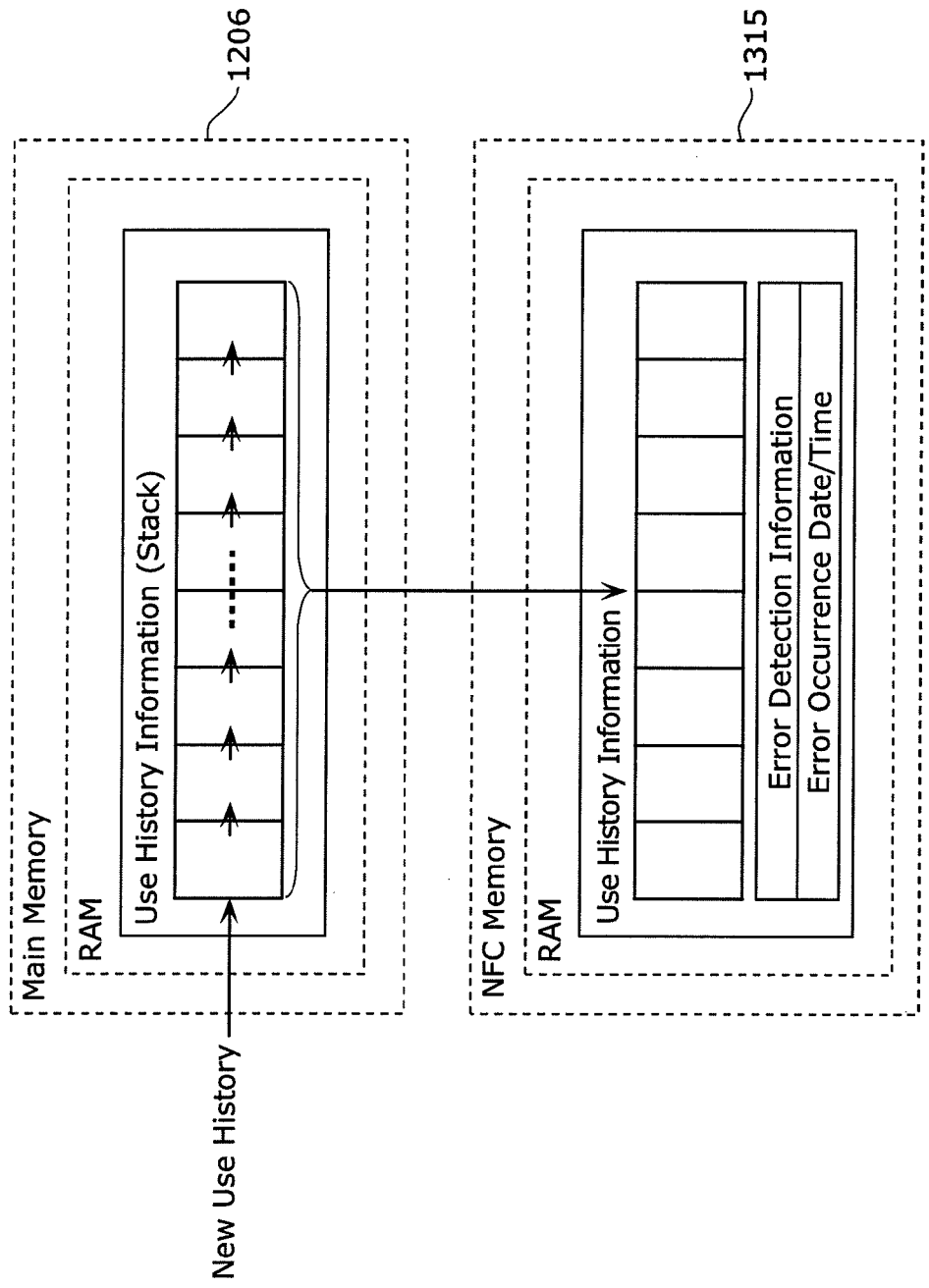
FIG. 18 is a schematic diagram showing a concept of processing for updating pieces of use history information in a main memory and the NFC memory according to Embodiment 5.

FIG. 18 is a schematic diagram showing a concept of processing for updating use history information between the main memory 1206 and the NFC memory 1315. The use history information in the main memory 1206 is stored in the RAM region of the main memory 1206 by using a so-called stack structure. By the stack structure, an older piece of use history information held in the RAM region is deleted every time the user performs operation such as a key operation, so that a newer piece of history information is stored.

On the other hand, regarding the structure of the NFC memory 1315 having the RAM region on which use history information is stored, use history information held in the main memory 1206 is copied into the NFC memory 1315 when the error detection unit 1304 detects an error. The use history information stored into the NFC memory 1315 is recorded in association with error identification information or error occurrence date/time which is used to specify the occurred error.

Thereby, if an external reader/writer reads data from the NFC memory 1315 by using NFC, pieces of use history information leading up to occurrence of an error can be obtained. As a result, a simple operation, such as single pressing of a button, is enough to read important information necessary to replicate the trouble or repair.

Figure 19:
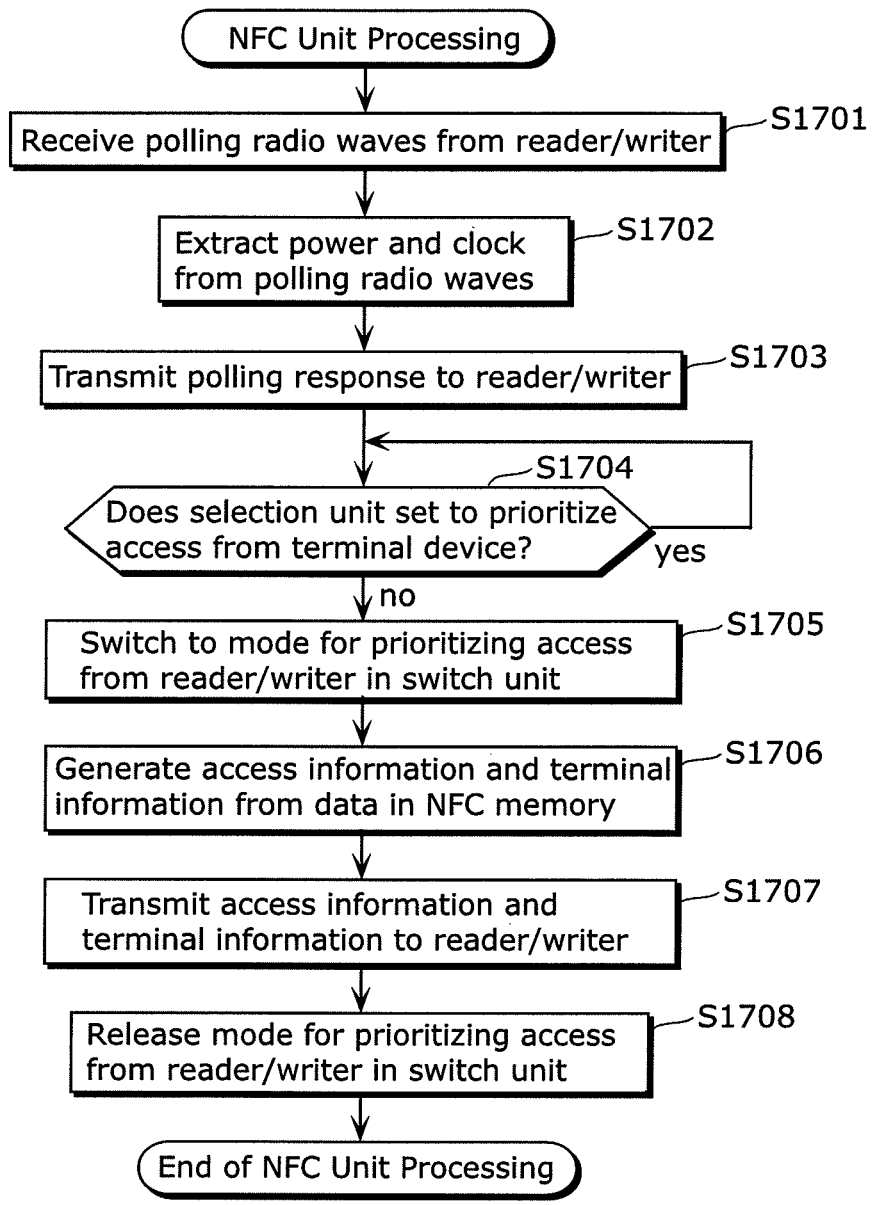
FIG. 19 is a flowchart of communication between a NFC unit and an external reader/writer, according to Embodiment 5.

FIG. 19 is a flowchart of processing in which the NFC unit 1207 communicates with an external reader/writer.

First, via the loop antenna 1208, the NFC unit 1207 receives polling radio waves that are a signal calling from a reader/writer to unspecified receivers (S1701). When the polling radio waves are received, the power extraction unit 1319 and the clock extraction unit 1320 extract power and clock signal, respectively, for operating the NFC unit 1207 from the polling radio waves (S1702). When the power and the clock are extracted, the system of the NFC unit 1207 is activated, and a polling response is sent back to the external reader/writer that has emitted the polling radio waves (S1703).

Next, it is determined whether or not the switch unit 1311 sets to prioritize access from the terminal device (S1704). If the switch unit 1311 sets to prioritize access from the terminal device (yes at S1704), then it means that the terminal unit 1301 is currently accessing the NFC memory 1315, and therefore the processing waits while access from the terminal device is prioritized.

On the other hand, if the switch unit 1311 does not set to prioritize access from the terminal device (no at S1704), then the switch unit 1311 switches to prioritize access from a reader/writer (S1705).

Next, access information and terminal information to be transmitted to the reader/writer are generated based on the information held in the NFC memory 1315 (S1706).

Then, the generated access information and terminal information are transmitted to the reader/writer (S1707). Of course, the transmission is performed in response to a read command from the reader/writer.

When the transmission is completed, the mode for prioritizing access from the reader/writer, which is set in the switch unit 1311, is released and the NFC processing is completed (S1708).

Figure 20:
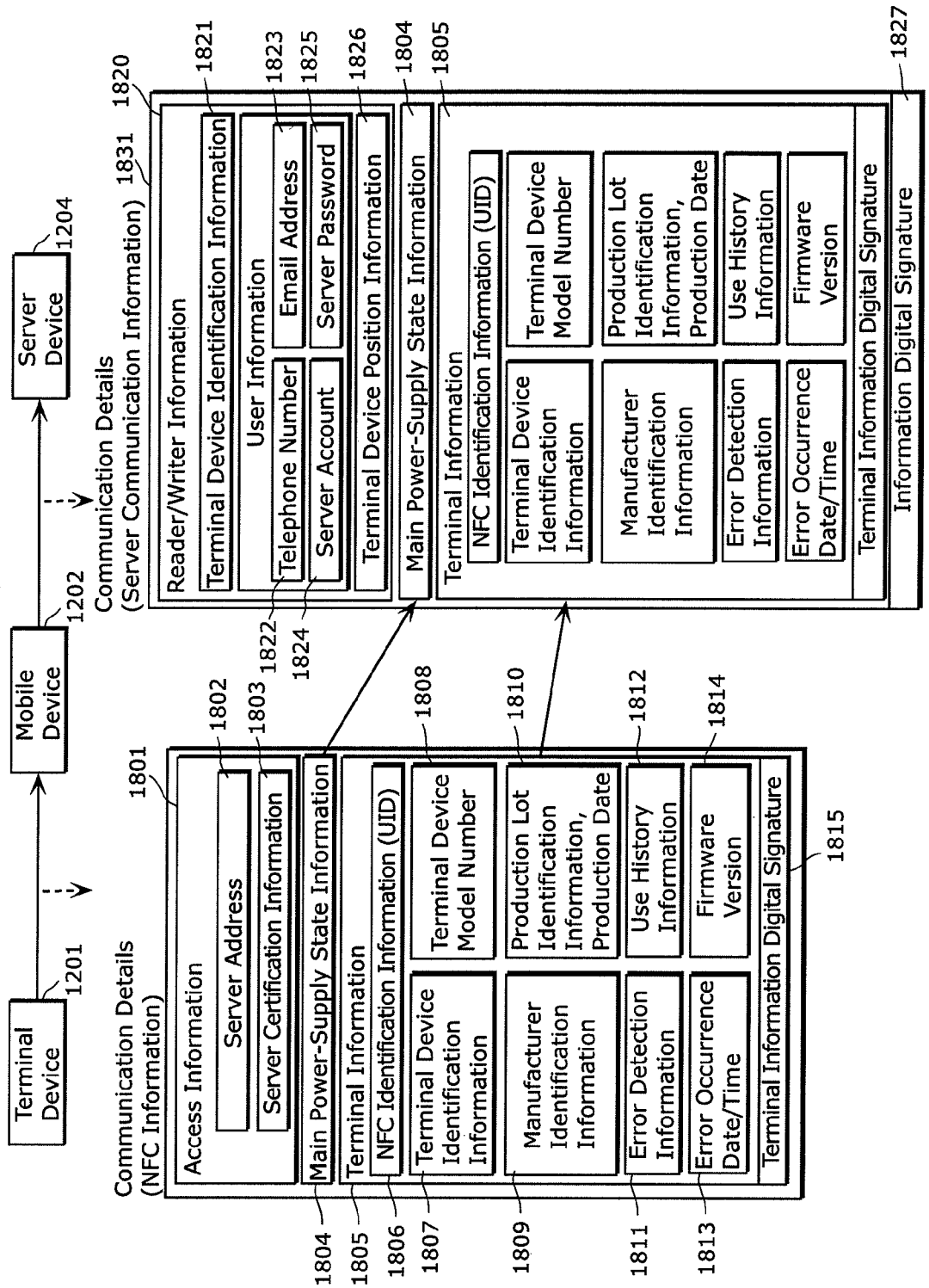
FIG. 20 is a schematic diagram showing pieces of communication information recorded on each of the devices according to Embodiment 5.
Figure 21:
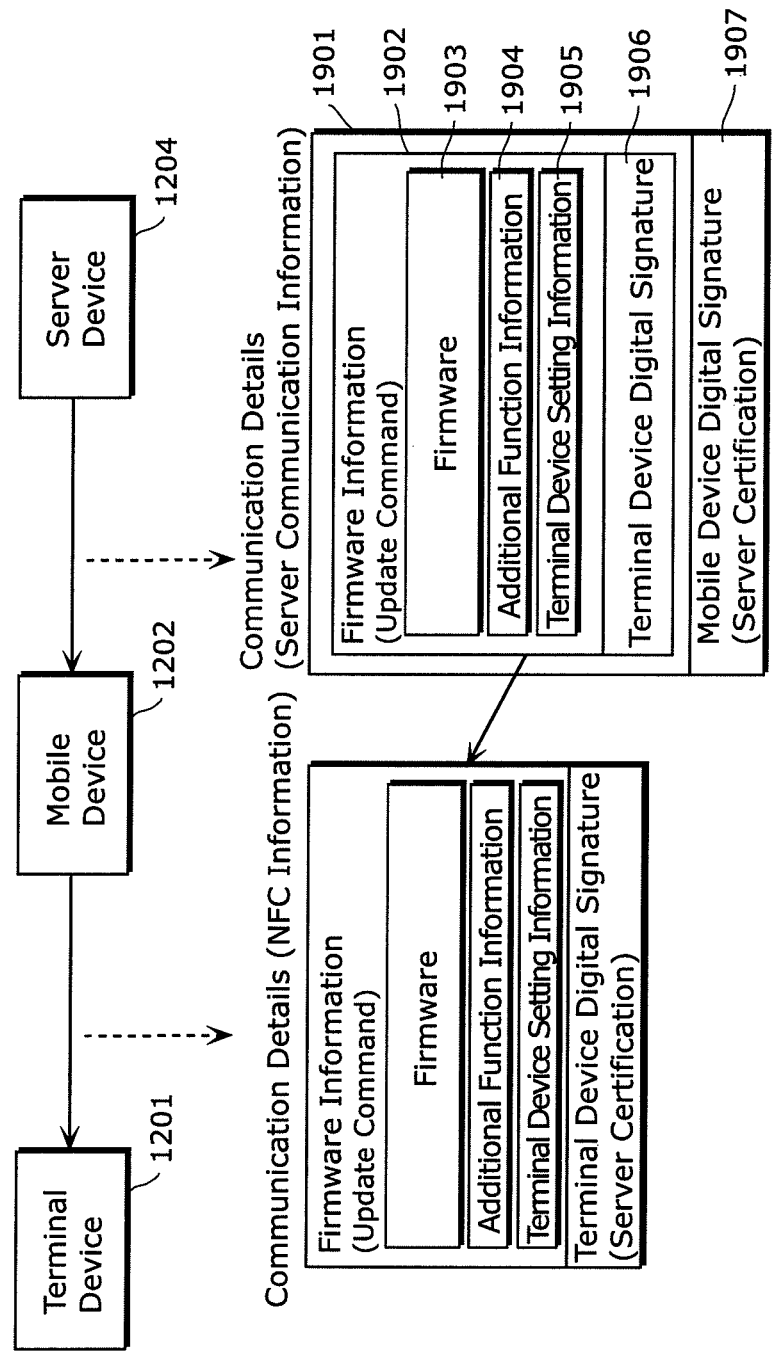
FIG. 21 is a schematic diagram showing details of pieces of communication information which are transmitted from a server device to the terminal device via a mobile device, according to Embodiment 5.

FIG. 20 is a schematic diagram showing pieces of communication information recorded on each of the devices according to Embodiment 5. More specifically, FIG. 21 shows pieces of communication information recorded on each of the terminal device 1201 as a system, the mobile device 1202, and the server device 1204. The pieces of communication information occur when the mobile device 1202 touches the terminal device 1201.

By causing the mobile device 1202 to touch the terminal device 1201, the access information, the main power-supply state information 1804, and the terminal information 1805 are generated based on the data recorded on the NFC memory 1315 of the terminal device 1201 via the NFC, and the terminal device 1201 transmits the generated information to the mobile device 1202 in response to a read command of the mobile device 1202.

The access information 1801 is information required to connect the mobile device 1202 to the server device 1204. The access information 1801 includes a sever address 1802 and a server certification information 1803.

The sever address 1802 includes Uniform Resource Locator (URL) information which is address information of the server device 1204. The server certification information 1803 includes certification information used to login the server device 1204. Both the sever address 1802 and the server certification information 1803 are recorded as the server access information 1407 on the ROM region of the NFC memory 1315. The access information 1801 may be generated as an access command to the server device 1204, which includes the sever address 1802 and the server certification information 1803.

The main power-supply state information 1804 is flag information indicating a power-supply state of the terminal unit 1301 of the terminal device 1201. The main power-supply state information 1804 is generated according to the main power-supply state information 1420 in the terminal unit read region 1415 of the RAM region of the NFC memory 1315. The main power-supply state information 1804 is information indicting, as a power-supply state, at least one of "power-ON state", "power-OFF state", and "power blocked state".

The terminal information 1805 is information to be transmitted to the server device 1204 via the mobile device 1202 to be registered in the database of the server device 1204. The terminal information 1805 includes NFC unit identification information 1806, terminal device identification information 1807, terminal device model number 1808, manufacturer identification information 1809, production lot identification information/production date 1810, error detection information 1811, use history information 1812, error occurrence date/time 1813, and a firmware version 1814. The terminal information 1805 is assigned with a terminal information digital signature 1815 that is signature information for the entire terminal information 1805.

The NFC unit identification information 1806 is identification information for uniquely identifying the NFC unit 1207 of the terminal device 1201. The NFC unit identification information 1806 is generated from the NFC unit identification information 1401 recorded on the NFC memory 1315.

The terminal device identification information 1807 is information for identifying the terminal device 1201. An example of the terminal device identification information 1807 is a product serial number of the terminal device 1201. The terminal device identification information 1807 is generated based on the terminal device identification information 1603 in the NFC memory 1315.

The terminal device model number 1808 is information indicating a model number, such as a product serial number, of the terminal device 1201. The terminal device model number 1808 is generated from the terminal device model number 1404 in the NFC memory 1315.

The manufacturer identification information 1809 is information for identifying a manufacturer of the terminal device 1201. The manufacturer identification information 1809 is generated from the manufacturer identification information 1405 in the NFC memory 1315.

The production lot identification information/production date 1810 is information for identifying a production lot number or a production date of the terminal device 1201. The production lot identification information/production date 1810 is generated from the production lot identification information/production date 1406 in the NFC memory 1315.

The error occurrence date/time 1813 is information for identifying an error detected by the error detection unit 1304. The error occurrence date/time 1813 is generated from the error detection information 1416 in the terminal unit write region 1415 of the NFC memory 1315.

The use history information 1812 is information generated from the use history information 1417 which is generated by copying the use history information stored in the main memory 1206 into the NFC memory 1315 when the error detection unit 1304 detects an error.

The error occurrence date/time 1813 is date and time of detecting an error by the error detection unit 1304. The error occurrence date/time 1813 is generated from the error occurrence date/time 1418 in the NFC memory 1315.

The firmware version 1814 is information of a version of the firmware of the terminal device 1201. The firmware version 1814 is generated from the firmware version 1419 written by the controller 1205 into the NFC memory 1315.

In addition, the terminal information digital signature 1815 is assigned to the terminal information 1805. The terminal information digital signature 1815 is a digital signature for preventing information from being falsified via a communication path or by wrong mobile devices. The algorithm of the digital signature is general secret key cryptography or public key cryptography.

Furthermore, each of the pieces of information in the terminal information 1805 (the NFC unit identification information 1806, the terminal device identification information 1807, the terminal device model number 1808, the manufacturer identification information 1809, the production lot identification information/production date 1810, the error detection information 1811, the use history information 1812, the error occurrence date/time 1813, and the firmware version 1814) may be in a form of a command transmitted via the mobile device 1202 to request for registering the information into a database of the server device 1204.

The mobile device 1202 transmits mobile device information 1820, the main power-supply state information 1804, and the terminal information 1805 to the server device 1204 via the Internet or a mobile phone communication network, based on the access information 1801 and the terminal information 1805 which are read from the terminal device 1201 by NFC.

Furthermore, based on the access information 1801 obtained from the terminal device 1201, the mobile device 1202 reads the address information and the certification information of the server device 1204 to be accessed. The mobile device 1202 thereby accesses the server device 1204, assigns the mobile device information 1820 to the terminal information 1805 obtained from the terminal device 1201 so as to generate information to be transmitted to the server device 1204.

The mobile device information 1820 is generated based on the information held in the mobile device 1202. The mobile device information 1820 includes mobile device identification information 1821, a telephone number 1822 as user information, an email address 1823, a server account 1824, a server password 1825, and mobile device position information 1826.

The mobile device identification information 1821 is identification information for uniquely identifying the mobile device 1202. The mobile device identification information 1821 is generated from identification information of the mobile terminal or identification information of a Subscriber Identity Module (SIM), if the mobile device 1201 is a mobile phone.

The telephone number 1822 is telephone number information set for the mobile device 1202.

Likewise, the email address 1823 is email address information also set for the mobile device 1202.

The server account 1824 is account information used for connection with the server device 1204.

The server password 1825 is password information used for connection with the server device 1204.

The mobile device position information 1826 is position information extracted by a position determination unit provided in the mobile device 1202. The mobile device position information 1826 is determined by a Global Positioning System (GPS) or based on a distance from a base station of the mobile device. The position information is obtained when the mobile device 1202 touches the terminal device 1201 to establish NFC. Since the NFC communicable range is generally several dozens of centimeters, the mobile device position information 1826 can be used as position information of the terminal device 1201 using the position information of the mobile device 1202.

Furthermore, each of the pieces of information in the mobile device information 1820 (the mobile device identification information 1821, the telephone number 1822, the email address 1823, the server account 1824, the server password 1825, and the mobile device position information 1826) may be in a form of a command for registering the information into the database of the server device 1204.

The main power-supply state information 1804 and the terminal information 1805 are directly transmitted from the terminal device 1201 to the server device 1204. Furthermore, the communication information transmitted from the mobile device 1202 to the server device 1204 is assigned with a information digital signature 1827 that is a digital signature for preventing falsification during communication.

It is desirable that the terminal information 1805 to be transmitted from the terminal device 1201 to the mobile device 1202 is encrypted in the terminal device 1201. It is also desirable that the encryption can be decrypted only by the server device 1204, not by the mobile device 1202. This is because, even if there is a malicious mobile device 1202 that transmits important terminal device information to a wrong server where the information is analyzed, the transmitted information can be decrypted only by the legitimate server device 1204. Therefore, the above-described encryption can protect the terminal device information from such frauds.

FIG. 21 is a schematic diagram showing details of pieces of communication information which are transmitted from the server device 1204 to the terminal device 1201 via the mobile device 1202. In general, the information transmission from the server device 1204 is performed after transmission from the terminal device 1201 shown in FIG. 20 to the server device 1204 via the mobile device 1202.

When the server device 1204 receives the terminal information 1805 and the mobile device information 1820 from the mobile device 1202, the server device 1204 registers the received terminal information 1805 in association with the reader/writer information 1820. At the same time, the server device 1204 confirms the firmware version 1814 in the terminal information 1805 in order to determine whether or not the firmware of the terminal device 1201 is to be updated. If the firmware is to be updated, the server device 1204 transmits a new firmware, additional function information, or terminal device setting information to the terminal device 1201 via the mobile device 1202, so that the version of the firmware of the terminal device is upgraded.

The information (server communication information 1901) transmitted from the server device 1204 to the mobile device 1202 includes firmware information 1902 including two pieces of signal information which are a terminal device digital signature 1906 and a mobile device digital signature 1907.

The firmware information 1902 includes a firmware 1903, additional function information 1904, and terminal device setting information 1905.

The firmware 1903 is information of a firmware itself to which the firmware of the terminal device 1201 is to be updated.

The additional function information 1904 is software having a function of adding a new function to the terminal device 1201, such as a function of adding a new recipe for a microwave.

The terminal device setting information 1905 is software for automatically setting the terminal device, such as a steaming program for a rice steamer.

Furthermore, the mobile device digital signature 1907 is a digital signature used to determine whether or not the server communication information 1901 has been falsified. The mobile device digital signature 1907 is generated by a secret key between the server device 1204 and the mobile device 1202.

Moreover, the terminal device digital signature 1906 is a digital signature used to determine whether or not the firmware information 1902 has been falsified. The terminal device digital signature 1906 is generated by a secret key between the server device 1204 and the terminal device 1201.

The mobile device digital signature 1907 is assigned mainly to determine whether or not the server communication information 1901 has been falsified in a communication path between the server device 1204 ad the mobile device 1202. On the other hand, the terminal device digital signature 1907 is assigned to determine whether or not the firmware information 1902 has been falsified by any malicious mobile device 1202.

There is a possibility of a serious accident in upgrading the firmware, especially if a malicious person falsifies the firmware to add an ignition program or the like. Therefore, the two digital signatures are used to check whether or not the communication path and the mobile device 1202 are correct. It should be noted that the digital signatures have been described as an example in the present embodiment, but, of course, other methods may offer the same effects within the scope of the present invention. For example, it is also possible that the pieces of information themselves are encrypted, then the mobile device 1202 decrypts the server communication information 1901, and the terminal device 1201 decrypts the firmware information 1902.

The mobile device 1202 determines, based on the mobile device digital signature 1907, whether or not the received server communication information 1901 has been falsified. Only if the information is legitimate, the mobile device 1202 transmits the firmware information 1902 and the terminal device digital signature 1906 to the terminal device 1201 by NFC.

Here, since the user needs to cause the mobile device 1202 to touch the terminal device 1201 to perform NFC, it is desirable that a display unit of the mobile device 1202 displays a message for requesting the touch to the terminal device 1201 when the examination of the mobile device digital signature 1907 is completed.

When the mobile device 1202 touches the terminal device 1201, the firmware information 1902 is transmitted to the terminal device 1201 by NFC. On the other hand, the terminal device 1201 examines the terminal device digital signature 1906 so as to examine whether or not the firmware information 1902 has been falsified. Only if the information is legitimate, the firmware is updated based on the firmware 1903, a new function is added to the terminal device 1201 based on the additional function information 1904, or a key of the terminal device 1201 is associated with an operation based on the terminal device setting information 1905.

As described above, even the mobile device 1202 not having a general-purpose network such as the Internet can be provided with an inexpensive NFC means which the use can easily and intuitively operate. As a result, the mobile device 1202 can upgrade the version of the firmware of the terminal device 1201 or add a new function to the terminal device 1201. Therefore, every time the user performs an operation, setting most suitable for usability can be provided to the terminal device 1201. Moreover, regarding the setting information or the like for the terminal device 1201, the server device generates device setting information or the like that is most suitable for the user, based on the use history information obtained by NFC. As a result, the terminal device can be optimized for each user.

Figure 22:
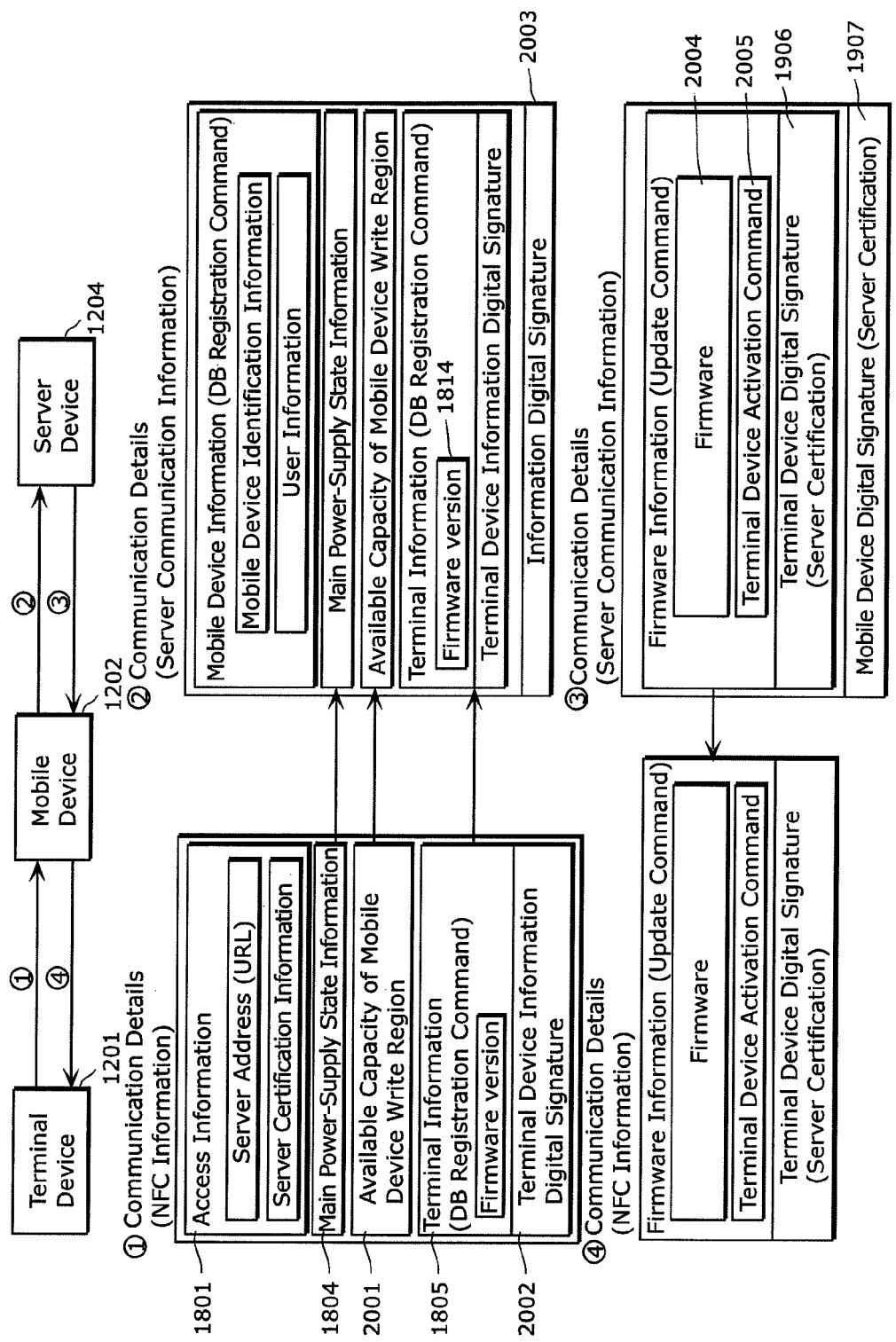
FIG. 22 is a schematic diagram showing pieces of communication information in the case where a firmware of the terminal device is updated by causing the mobile device to touch the terminal device.

FIG. 22 is a schematic diagram showing pieces of communication information in the case where the firmware of the terminal device 1201 is updated by causing the mobile device 1202 to touch the terminal device 1201, in the similar manner to FIG. 21. FIG. 22 differs from FIG. 21 in that the terminal device 1201 is in "power-OFF state".

First, when the mobile device 1202 touches the terminal device 1201, the terminal device 1201 transmits, to the mobile device 1202, the access information 1801, the main power-supply state information 1804, a write region available capacity 2001, the terminal information 1805, a terminal information digital signature 2002 that is signature information for the terminal information 1805.

The write region available capacity 2001 is information indicating a writable capacity of the RAM region in the NFC memory 1315.

The terminal information digital signature 2002 is digital signature information for the terminal information 1805. The terminal information digital signature 2002 is generated in the terminal device 1201.

The mobile device 1202 accesses the server device 1204 based on the access information 1801 obtained from the terminal device 1201. Then, the mobile device 1202 assigns the reader/writer information 1820 to the main power-supply state information 1804, the write region available capacity 2001, and the terminal information 1805 which are obtained from the terminal device 1201. The mobile device 1202 transmits these pieces of information to the server device 1204.

In addition, the mobile device 1202 generates information digital signature 2003 that is digital signature information, then assigns the information digital signature 2003 to the reader/writer information 1820, the main power-supply state information 1804, the write region available capacity 2001, and the terminal information 1805 which have been generated in the mobile device 1202. Then, the mobile device 1202 transmits these pieces of information to the server device 1204.

The server device 1204 examines the information digital signature 2003 assigned by the mobile device 1202, and also examines the terminal information digital signature 2002 assigned by the terminal device 1201. If both digital signatures are legitimate, the server device 1204 registers the terminal information in association with the reader/writer information 1820 into the database.

In addition, the server device 1204 determines, based on the firmware version 1814 in the terminal information 1805, whether or not the firmware is to be updated. If the firmware is to be updated, the server device 1204 transmits a corresponding firmware to the terminal device 1201 via the mobile device 1202.

Moreover, the terminal device 1201 determines, based on the main power-supply state information 1804, whether or not the power-supply state allows the firmware to be updated. More specifically, in the case of "power-ON state", the firmware updating is possible so that a new-version firmware is transmitted.

On the other hand, in the case of "power-OFF state", the firmware updating becomes possible by activation. Therefore, the new-version firmware and a terminal device activation command 2005 are transmitted to the terminal device 1201 via the mobile device 1202.

In addition, in the case of "power blocked state", it is impossible to perform the firmware updating even by transmitting a new-version firmware to the terminal device 1201. Therefore, an instruction is transmitted to the mobile device 1202 to be displayed on the display unit of the mobile device 1202, so that the user is instructed to power the mobile device 1202 ON to update the firmware.

Hereinafter, the description is given assuming that the terminal device 1201 is in "power-OFF state".

If the server device 1204 determines based on the firmware version 1814 that the firmware needs to be updated, that the power-supply state is "power-OFF state", and that the write region available capacity 2001 is enough for a data amount of the new-version firmware, the new-version firmware 2004 and the terminal device activation command 2005 are transmitted to the mobile device 1202 as firmware updating information.

The firmware information is assigned with (a) the terminal device digital signature 1906 that can be examined by the terminal device 1201 and (b) the mobile device digital signature 1907 that can be examined by the mobile device 1202. The resulting firmware information is transmitted to the mobile device 1202.

The mobile device 1202 examines the mobile device digital signature 1907 assigned to the received information. If the information is legitimate, then the firmware information is transmitted to the terminal device 1201.

The terminal device 1201 issues the activation command which the terminal unit 1301 receives by the NFC unit 1207 of the terminal device 1201, so as to activate the terminal unit 1301, and updates the firmware to the received new-version firmware.

As described above, the terminal device 1201 transmits the main power-supply state information 1804 and the write region available capacity 2001 to the server device 1204, so that the server device 1204 can determine whether or not the terminal device 1201 can update the firmware. The mobile device 1202 displays a message according to the situation, or transmits an activation command to the terminal device 1201. As a result, it is possible to significantly reduce a load on user operation for updating the firmware.

FIGS. 23A to 23D are schematic diagrams showing details displayed on the mobile device 1202 in updating the firmware described with reference to FIGS. 20 to 22.

Figure 23A:
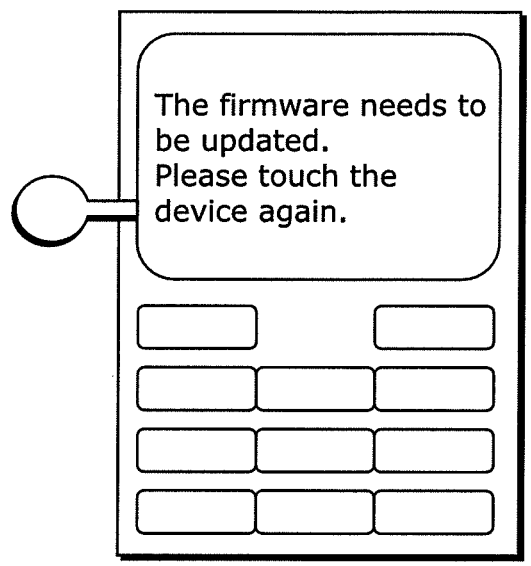
FIG. 23A is a schematic diagram showing details displayed on the mobile device according to Embodiment 5.

FIG. 23A shows the situation where the power-supply state indicated in the terminal information 1805 obtained from the terminal device 1202 is "power-ON state". FIG. 23A is a screen displayed after the mobile device 1202 obtains the firmware from the server device 1204. One more touching enables the firmware held in the mobile device 1202 to transmit to the terminal device 1201 so as to update the firmware.

Figure 23B:
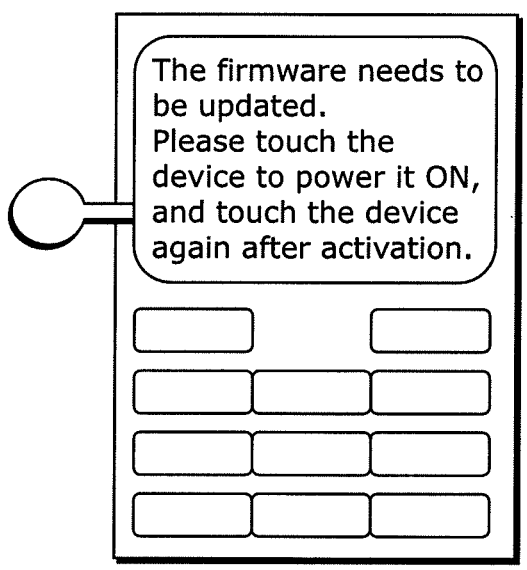
FIG. 23B is a schematic diagram showing details displayed on the mobile device according to Embodiment 5.

FIG. 23B shows the situation where the power-supply state indicated in the terminal information 1805 obtained from the terminal device 1202 is "power-OFF state". Here, the transmission information from the server device 1204 includes the terminal device activation command 2005. Therefore, one more touching transmits an activation command to the terminal device 1201 to activate the terminal device 1201. After activating the terminal device 1201, further touching transfers the new-version firmware so that the terminal device 1201 performs firmware updating.

In this example, a capacity of the NFC memory 1315 is not enough, and the activation command and the new-version firmware are transmitted separately by respective two touching actions. However, if the NFC memory 1315 has an enough capacity, the activation command and the new-version firmware (updating command) are transmitted at the same time, and the terminal device 1201 performs firmware updating after being activated by the activation command.

Figure 23C:
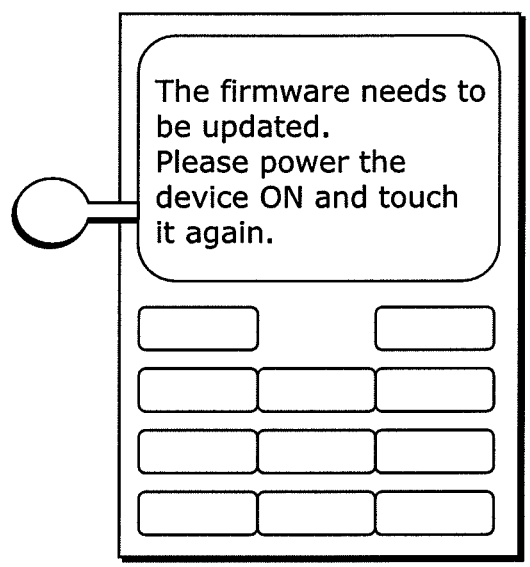
FIG. 23C is a schematic diagram showing details displayed on the mobile device according to Embodiment 5.

FIG. 23C shows the situation where the power-supply state indicated in the terminal information 1805 obtained from the terminal device 1202 is "power blocked state". In this situation, since it is necessary to instruct power activation to the user, the server device 1204 displays an instruction for power activation on the display unit of the mobile device 1202.

Figure 23D:
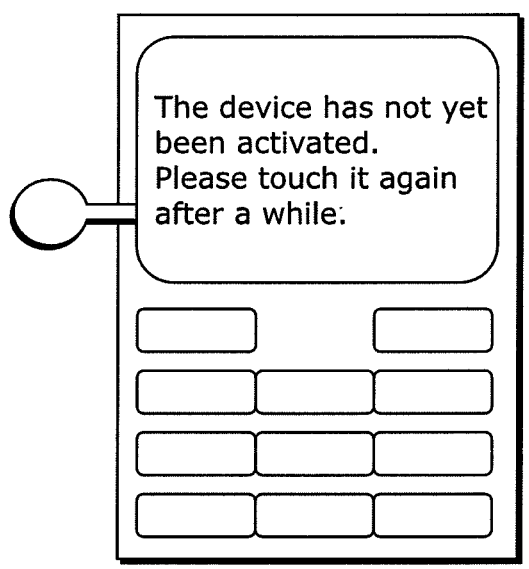
FIG. 23D is a schematic diagram showing details displayed on the mobile device according to Embodiment 5.

FIG. 23D shows a message displayed when the terminal device 1201 has not yet been activated by further touching after displaying the screen of FIG. 23B. If the activation has not yet been completed, the main power-supply state information 1804 in the NFC memory 1315 has not yet been updated so that the power-supply state is still "power-OFF state". The mobile device 1202 or the server device 1204 determines that the main power-supply state information 1804 indicates the "power-OFF state", so that the mobile device 1202 can display a message such as the message shown in FIG. 23 on the display unit. As a result, the firmware can be safely updated.

Figure 24:
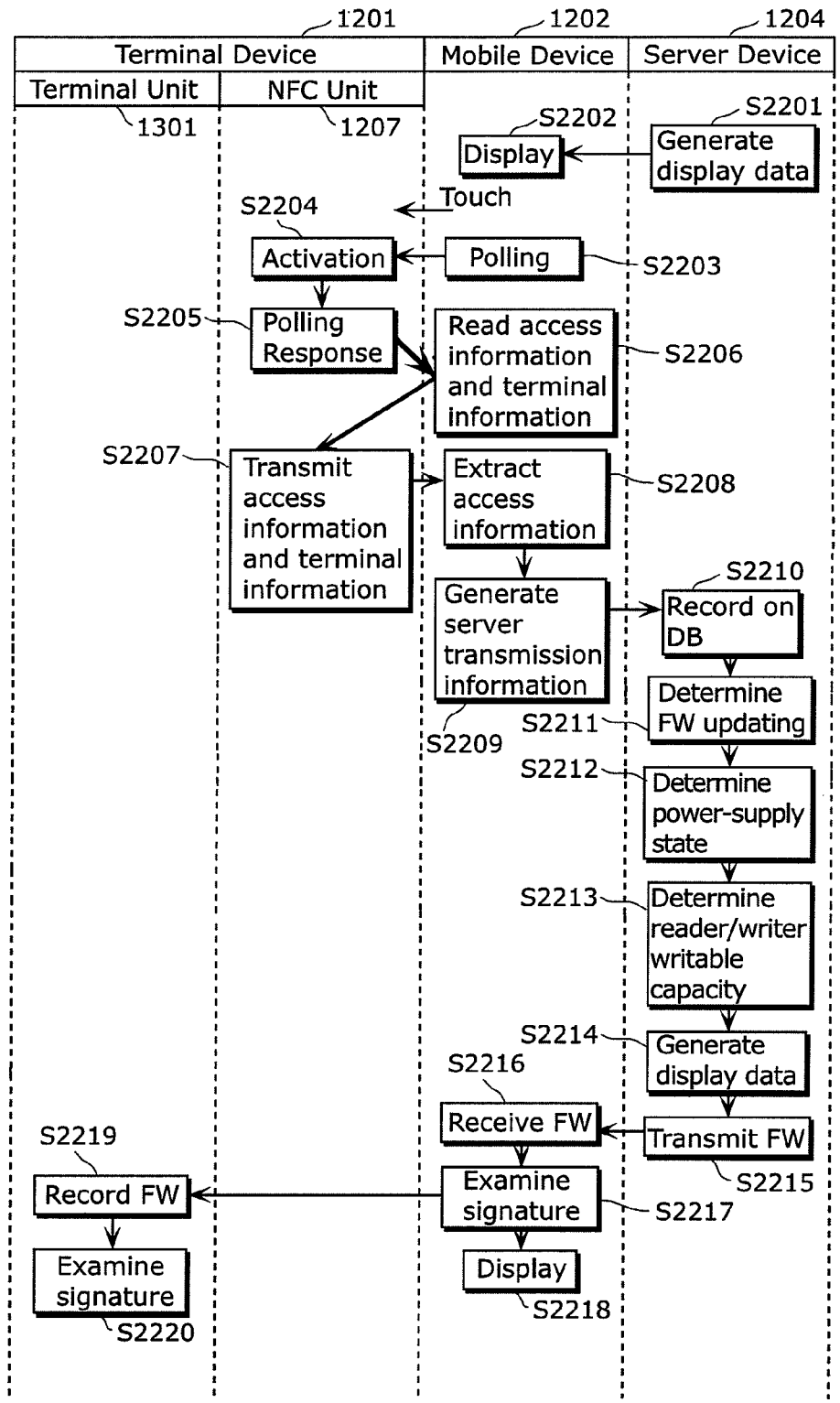
FIG. 24 is a sequence diagram showing a flow of processing performed by the devices according to Embodiment 5.
Figure 25:
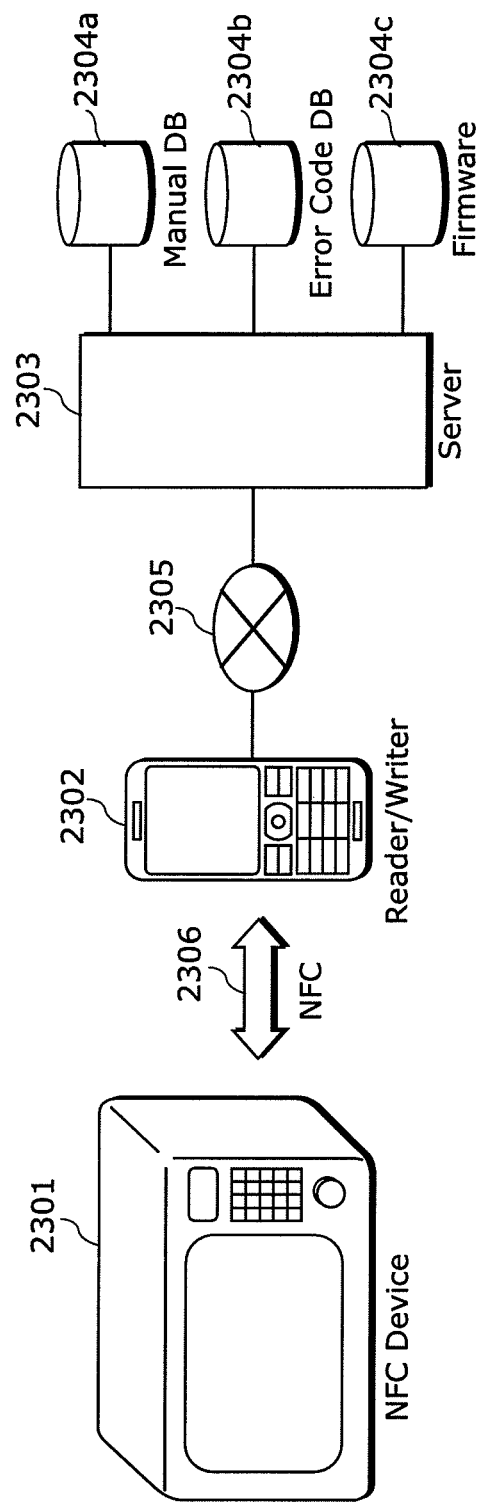
FIG. 25 is a diagram showing an example of a configuration of a system including a conventional NFC device.
Figure 26:
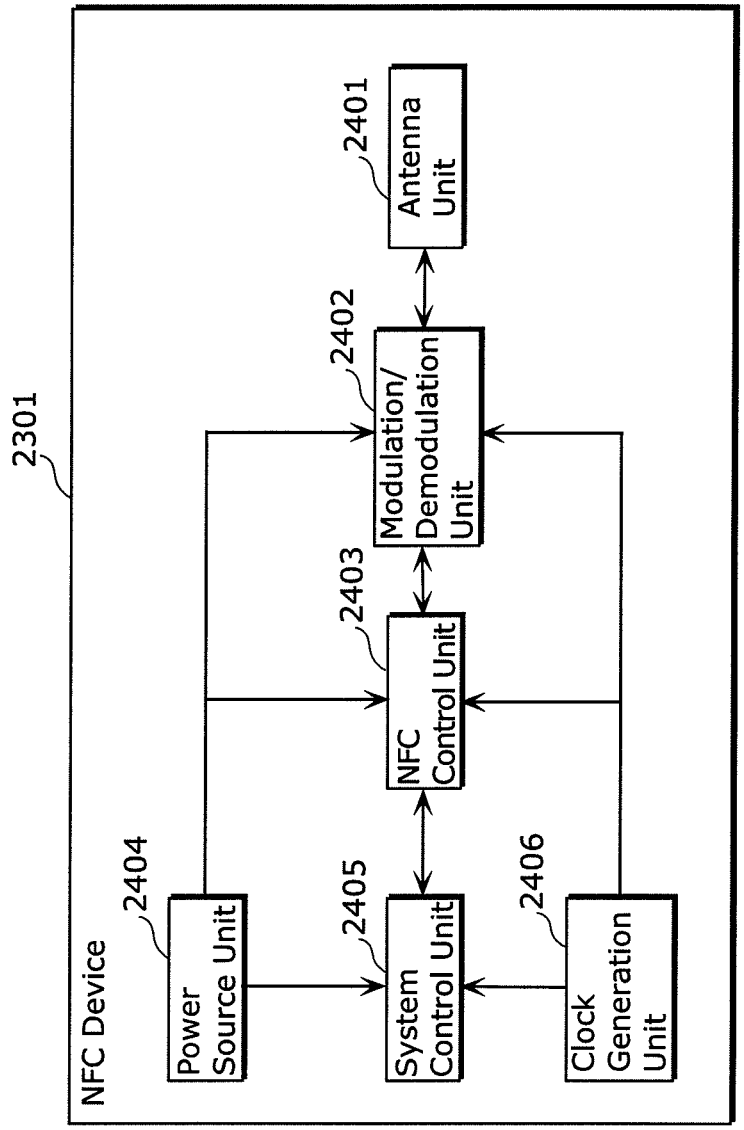
FIG. 26 is a diagram showing an example of a structure of the conventional NFC device.

FIG. 24 is a sequence diagram showing a flow of processing performed by the terminal device, the mobile device, and the server device according to Embodiment 5.

The server device 1204, which has a database, always determine whether or not there is any addition of firmware or function improving program for devices registered in the database. If the server device 1204 determines that there is firmware updating or function improving program for a specific device, the server device 1204 generates a message for persuading the firmware updating or function improving program addition (S2201). This message is generated to be displayed on the display unit of the mobile device 1202. The message may be a pop-up message appeared on the display unit or email. The message enables the user possessing the specific device for which the updating is necessary, to perform the updating.

Next, the mobile device (reader/writer) 1202 which has received the message displays the received message on the display unit 1210 (S2202).

Then, the user who has confirmed the message starts an application for activating a reader/writer to perform NFC of the mobile device 1202, so that the mobile device 1202 starts polling (S2203).

Next, the user causes the mobile device 1202, which has started polling, to touch a region of the terminal device 1201 that is the specific device for which the updating is necessary. In the region, an antenna for NFC is provided. After touching, the terminal device 1201 receives radio waves from the mobile device 1202 via the antenna of the NFC unit 1207, and the terminal device 1201 generates at least power and clock signal for activating the NFC unit 1207 of the terminal device 1202 from electric field of the mobile device 1202 so as to activate the NFC unit 1207 (S2204).

After the activation has been completed, the NFC unit 1207 of the terminal device 1202 transmits a polling response signal to the mobile device 1202, and thereby establishes NFC between the terminal device 1201 and the mobile device 1202 (S2205).

When the mobile device 1202 receives the polling response signal from the terminal device 1201, the mobile device 1202 generates a command for reading access information and terminal information from the NFC memory 1315 of the terminal device 1201, and then transmits the command to the terminal device 1201 (S2206).

When the command is received, the NFC unit 1207 of the terminal device 1201 transmits the access information and the terminal information recorded on the internal NFC memory 1315 to the mobile device 1202 (S2207).

Then, the mobile device 1202 extracts the access information and the terminal information from the information received from the terminal device 1201, so as to obtain an address of the server device 1204 to be connected to (S2208).

It should be noted that the present invention provides a system in which the user causes the mobile device 1202 to touch the terminal device 1201, therefore accesses to the server device 1204 run by the manufacturer of the terminal device 1201, and thereby registers, onto the server device, the use history information by being triggered by (a) user registration for registering a product serial number, (b) dealing with error occurrence, or (c) error occurrence, so that various customer services can be offered to the user. Therefore, the address information of the server device 1204 to be connected to is recorded on the NFC memory 1315 of the terminal device 1201. With the above configuration, it is possible to access the server device corresponding to the terminal device 1201, even if, for example, a manufacturer of the mobile device 1202 is different from a manufacturer of the terminal device 1201. If the sever address is not recorded on the terminal device 1201, the mobile device 1202 needs to determine the manufacturer of the terminal device 1201, or a redundant server is necessary for re-direction to a server for each manufacturer. In order to address the above, the sever address is recorded on the terminal device 1201 to eliminate such redundant mechanism. As a result, it is possible to reduce a total cost.

Next, the mobile device 1202 combines the terminal information 1805 received from the terminal device 1201 with the reader/writer information 1820 recorded in the mobile device 1202 to generate data to be transmitted to the server device 1204, and then transmits the generated data to the server device indicated in the access information 1801 received from the terminal device 1201 (S2209).

Then, based on the received information, the server device 1204 records the terminal information 1805 of the terminal device 1201 in association with the reader/writer information 1820 of the mobile device 1202, into the database held in the server device 1204, and manages the recorded information (S2210).

It should be noted that the registration to the database is not necessary if target information has been registered. First, it is determined whether or not the reader/writer information 1820 has been registered. If the reader/writer information 1820 has not yet been registered, the mobile device information is registered. If the same mobile device information has been registered, it is determined whether or not the terminal information 1805 associated with the mobile device information is registered. If such terminal information 1805 is not registered, the terminal information 1805 is registered. The determination as to whether or not the reader/writer information 1820 has already been registered is made based on the telephone number 1822, the email address 1823, the mobile device identification information 1821, or the like included in the reader/writer information 1820. The mobile device identification information 1821 refers to user identification information set in the mobile device, such as identification information unique to each mobile device. The user identification information refers, for example, to identification information set for a Subscriber Identity Module (SIM) of a mobile phone terminal.

Next, the server device 1204 determines, based on the firmware version 1814 obtained from the received terminal information 1805, whether or not the firmware of the terminal device 1201 needs to be updated (S2211). Then, the server device 1204 determines a power-supply state of the terminal device 1201, based on the main power-supply state information 1804 included in the terminal information 1805 (S2212). Furthermore, the server device 1204 determines a writable capacity of the NFC memory 1315 of the terminal device 1201 which is indicated in the terminal information 1805 (S2213). If it is determined at S2211 that the firmware needs to be updated, the server device 1204 generates display data to be displayed on the display unit of the terminal device 1201, based on the power-supply state of the terminal device 1201 which has been confirmed at S2212 or the determination result regarding the writable region of the NFC memory 1315 (S2214). Regarding the display data, for example, regardless of necessity of the firmware updating, if power supply to the terminal device 1201 is blocked, it is possible to display a message on the display unit of the mobile device 1202 to persuade the user to power the terminal device 1201 ON.

If it is determined at Steps S2211 to S2213 that the firmware needs to be updated and the current power-supply state allows the updating, then the server device 1204 transmits the new-version firmware to the terminal device 1201 (S2215).

Next, when the mobile device 1202 receives the new-version firmware from the server device 1204 (S2216), the mobile device 1201 temporarily holds the new-version firmware. Then, the mobile device 1202 examines the mobile device digital signature 1907 assigned to the new-version firmware, so as to determine whether or not the new-version firmware has been falsified on the communication path from the server device 1204 to the mobile device 1202 (S2217).

Then, if the mobile device digital signature 1907 of the new-version firmware has been examined as legitimate, then the mobile device 1202 displays, on the display unit of the mobile device 1202, a message for persuading the user to cause the mobile device 1202 to touch the terminal device 1201 (S2218).

Then, when the mobile device 1202 on which the new-version firmware is recorded touches the terminal device 1201, the terminal device 1201 receives the new-version firmware from the mobile device 1201 and records the new-version firmware onto the main memory 1206 of the terminal unit 1301 via the NFC unit 1207 (S2219).

Then, before performing firmware updating, the terminal unit 1301 confirms whether the new-version firmware has not been falsified, based on the assigned terminal device digital signature 1906 (S2220).

Therefore, in the present embodiment, the mobile device examines the mobile device digital signature 1907 for the new-version firmware transmitted from the server device 1204, and the terminal device 1201 examines the terminal device digital signature 1906. It is thereby possible to examine whether or not falsification has been occurred on the communication path from the server device 1204 to the mobile device 1202, and also examine whether or not falsification has been occurred in the mobile device 1202. Therefore, even if a malicious mobile device 1202 appears and falsifies the new-version firmware, the terminal device 1201 can detect the falsification and therefore the firmware updating can be safely performed.

As described above, the terminal device 1201 according to the present embodiment records the use history information onto the NFC memory 1315 of the terminal device 1201, when a trouble (error) occurs in the terminal device 1201. Therefore, the NFC memory 1315 holds only pieces of use history information leading up to the occurrence of the error. Even if the terminal unit 1301 of the terminal device 1201 has an error and cannot be operated, data recorded on the NFC memory 1315 can be read by the mobile device 1201 by receiving power generated from radio waves provided from the mobile device 1202. Therefore, the reading of pieces of use history information leading up to the error makes it possible to improve trouble replication and speedily repair the trouble, for example. As a result, it is possible to significantly reduce a cost with quality loss.

Furthermore, the use history information is desirably encrypted by the terminal unit 1301 of the terminal device 1201. This is because a configuration in which the use history information can be read by any mobile devices 1202 allows mobile devices 1202 manufactured by other manufacturers different from the manufacturer of the target terminal device 1201 to read the use history information, so that such configuration has a risk that valuable information such as user use histories are browsed by other manufacturers. It is desirable that encrypted use history information can be decrypted only by the server device 1204 corresponds to the target terminal device 1201. It is therefore desirable that the NFC memory 1315 of the terminal device 1201 previously holds address information of the server device 1204 corresponds to the target terminal device 1201. The above structure makes it possible to run a server device for each terminal device manufacturer. As a result, user registration for the terminal device 1201 becomes possible.

Moreover, based on the firmware version information and the power-supply state of the terminal device 1201, the server device 1204 can determine whether nor not the firmware needs to be updated and whether or not the firmware updating is possible. Therefore, the server device 1204 can perform processing according to the state of the terminal device 1201.

Furthermore, the server device 1204 can register, in the database, the reader/writer apparatus information 1820 of the mobile device 1202 as main data, and the terminal information 1805 of the terminal device 1201 as sub-data. In other words, the reader/writer information 1820 is equivalent to user registration information for conventional user registration using a server. In the case of user registration information, complicated registration operations are necessary for the user to register a name, an address, and email address.

On the other hand, in the present embodiment using the reader/writer information 1820, the user does not need to register such user registration information, but the mobile device 1202 can add such information to the read terminal information 1805 of the terminal device 1202 and transmit them to the server device 1204. In general, the registration information such as a name, an address, and email address is used to ensure traceability of the user possessing the terminal device 1201. The present embodiment can produce the same effect, because the identification information unique to the mobile device 1202, the email address and telephone number which are set in the mobile device 1201, and the like can be used as the mobile device information. Therefore, the mobile device 1202 according to the present embodiment, if the mobile device 1202 is a mobile phone, can provide all of the disclosure in this description. It is desirable that information determined by using a GPS provided in a mobile phone or the like is used instead of address information. Since GPS can determine a position with an accuracy of several dozens centimeters, GPS can determine the position of the terminal device in detail and also eliminate complicated operations such as address inputting.

It should also be noted that any of the terminal devices according to the embodiments does not need to be connected to a general-purpose network such as the Internet. This is because the terminal devices can access the server device via the mobile device which is connectable to a general-purpose network. Furthermore, in general, a cost of a module for NFC is lower than a module for connecting to a general-purpose network. Therefore, kinds of terminal devices having the NFC module can be expanded. As a result, any device can be provided with such user interface. Moreover, in the case of NFC, the terminal device does not need to be connected to a power source. Therefore, the terminal device does not need to be connected to the power source for user registration or the like. As a result, usability can be improved. Furthermore, in the case of NFC, power consumption is remarkably low. Therefore, NFC can be applied to the terminal device driven by a battery, for example.

INDUSTRIAL APPLICABILITY

According to the present invention, regardless of a state of a power source (the second power source unit) of the device, a reader/writer can refer to a power-supply state of a system control unit of the device, and perform processing or screen display appropriate for the power-supply state. Therefore, the present invention is useful for a system in which a device having an NFC function performs communication via a reader/writer. Furthermore, the present invention can be applied to any devices having an NFC function, such as electronic devices including cameras and home appliances including microwaves and air conditioners.

REFERENCE SIGNS LIST

1 system
10 NFC device
20, 2302 reader/writer
30, 2303 server
40, 2305 Internet
100, 200, 300, 400, 2301 NFC device
101, 2401 antenna unit
102 first power source unit
103 power source switch unit
104 second power source unit
105, 2402 modulation/demodulation unit
106, 406, 2403 NFC control unit
107, 207, 507 power-supply state holding unit
108 memory unit
109, 209, 409, 2405 system control unit
110 first clock generation unit
111 clock switch unit
112 second clock generation unit
113 plug
171, 172 Vcc
173 host power-supply state
174 transistor
175, 176, 177, 179, 180 resistance
178 photocoupler
209a update unit
213 capacitor unit
314 system activation unit
407 power-supply state detection unit
408 power-supply state recording unit
606, 1207 NFC unit
1201 terminal device
1202 mobile device
1203 network
1204 server device
1205 controller
1206 main memory
1208 loop antenna
1209 antenna
1210 display unit
1211, 1302 keys
1301 terminal unit
1303 use history detection unit
1304 error detection unit
1305 power-supply detection unit
1306 power-supply blockage detection unit
1307 main power source
1308 capacitor unit 1309 main power source control unit
1310 interface
1311 switch unit
1312 power source switch unit
1313 clock switch unit
1314 access switch unit
1315 NFC memory
1316 communication control unit
1317 modulation unit
1318 demodulation unit
1319 power extraction unit
1320 clock extraction unit
1401, 1806 NFC identification number (UID)
1402 ROM region
1403 terminal device identification number (product serial number)
1404 terminal device model number (product model number)
1405, 1809 manufacturer identification information
1406, 1810 production lot identification information, production date
1407 server access information
1408, 1802 sever address
1409 server certification information
1410 RAM region
1411 reader/writer write region
1412 firmware region
1413 terminal device setting information
1414 communication setting information
1415 terminal unit write region
1416, 1811 error detection information
1417, 1812 use history information
1418, 1813 error occurrence date/time
1419, 1814 firmware version
1420, 1804 main power-supply state information
1603, 1807 terminal device identification information
1801 access information
1803 server certification information
1805 terminal information
1808 terminal device model number
1815, 2002 terminal information digital signature
1820 reader/writer information
1821 terminal device identification information
1822 telephone number
1823 email address
1824 server account
1825 server password
1826 terminal device position information
1827, 2003 information digital signature
1901 server communication information
1902 firmware information
1903, 2004 firmware
1904 additional function information
1905 terminal device setting information
1906 terminal device digital signature
1907 mobile device digital signature
2001 available capacity of mobile device write region
2005 activation command
2217 signature verification
2304a manual DB
2304b error code DB
2404 power source unit
2406 clock generation unit

The invention claimed is:

1. A Near Field Communication (NFC) device that performs NFC with a reader/writer, said NFC device comprising:
an antenna unit configured to receive radio waves from the reader/writer by NFC;
a first power source unit configured to generate power from the radio waves received by said antenna unit;
a second power source unit that is a drive power source different from said first power source unit and that is capable of being powered ON or OFF;
a power-supply state recording unit configured to record power-supply state information indicating a power-supply state of said second power source unit;
an NFC unit configured to transmit the power-supply state information recorded on said power-supply state recording unit to the reader/writer via said antenna unit by using NFC;
a power source switch unit configured to switch between said first power source unit and said second power source unit according to the power-supply state of said second power source unit, in order to supply power to activate at least said NFC unit and said power-supply state recording unit;
a system control unit configured to receive power from said second power source unit and rewrite the power-supply state information recorded on said power-supply state recording unit;
a first clock generation unit configured to generate a first clock signal according to the radio waves received by said antenna unit;
a second clock generation unit configured to generate a second clock signal to be used for operating said system control unit, from a voltage supplied from said second power source unit; and
a clock selection unit configured to select between the first clock signal and the second clock signal so as to be provided to said power-supply state recording unit,
wherein said power source switch unit is configured to: (i) switch from said first power source unit to said second power source unit in order to supply power to said NFC unit and said power-supply state recording unit, when said second power source unit supplies power to said system control unit; and (ii) switch from said second power source unit to said first power source unit in order to supply power to said NFC unit and said power-supply state recording unit, when said second power source unit does not supply power to said system control unit,
said system control unit is configured to: (i) rewrite the power-supply state information recorded on said power-supply state recording unit to indicate that said second power source unit is powered ON, when said second power source unit is powered ON from OFF; and (ii) rewrite the power-supply state information recorded on said power-supply state recording unit to indicate that said second power source unit is powered OFF, when said second power source unit is powered OFF from ON, and
said clock selection unit is configured to select the first clock signal while said power-supply state recording unit is activated by power supplied from said first power source unit.

2. The NFC device according to claim 1,
wherein said power-supply state recording unit is a non-volatile memory on which the power-supply state of said second power source unit is recorded.

3. The NFC device according to claim 2,
wherein said power-supply state recording unit is:
at least writable by receiving power from said second power source unit, when said power source switch unit switches to said second power source unit to supply power to activate said power-supply state recording unit; and at least readable by receiving power from said first power source unit, when said power source switch unit switches said second power source unit to said first power source unit to supply power to activate said power-supply state recording unit.

4. The NFC device according to claim 3,
wherein said system control unit is configured to, when said NFC device receives a termination request, (i) control said second power source unit to be powered OFF, and (ii) control the power-supply state information recorded on said power-supply state recording unit to be updated to indicate that said second power source unit is powered OFF.

5. The NFC device according to claim 3,
wherein said system control unit is configured to, when said NFC device receives an activation request, (i) control said second power source unit to be powered ON, and (ii) control the power-supply state information recorded on said power-supply state recording unit to be updated to indicate that said second power source unit is powered ON.

6. The NFC device according to claim 3, further comprising
a capacitor unit in which power supplied from said second power source unit is charged,
wherein said capacitor unit is configured to supply the charged power to said system control unit, when said second power source unit is powered OFF, and
said system control unit is configured to control the power-supply state information recorded on said power-supply state recording unit to be updated to indicate that said second power source unit is powered OFF.

7. The NFC device according to claim 3, further comprising
a capacitor unit in which power supplied from said second power source unit is charged,
wherein said capacitor unit is configured to supply the charged power to said system control unit, when power supply to said second power source unit is blocked, and
said system control unit is configured to control the power-supply state information recorded on said power-supply state recording unit to be updated to indicate that power supply to said second power source is blocked and said second power source unit is incapable of being activated.

8. The NFC device according to claim 1,
wherein said power-supply state recording unit records at least one of: (a) power-supply state information indicating whether said system control unit is activated or stopped; and (b) power-supply state information indicating whether or not said second power source unit supplies power to said system control unit.

9. The NFC device according to claim 1, further comprising
a system activation unit configured to be activated at least by said first power source unit,
wherein said system activation unit is configured to power said second power source unit ON, according to a system activation request received from the reader/writer via said antenna unit.

10. A Near Field Communication (NFC) device that performs NFC with a reader/writer, said NFC device comprising:
an antenna unit configured to receive radio waves from the reader/writer by NFC;
a first power source unit configured to generate power from the radio waves received by said antenna unit;
a second power source unit that is a drive power source different from said first power source unit and that is capable of being powered ON or OFF;
a power-supply state recording unit configured to record power-supply state information indicating a power-supply state of said second power source unit;
an NFC unit configured to transmit the power-supply state information recorded on said power-supply state recording unit to the reader/writer via said antenna unit by using NFC;
a power source switch unit configured to switch between said first power source unit and said second power source unit according to the power-supply state of said second power source unit, in order to supply power to activate at least said NFC unit and said power-supply state recording unit;
a system control unit configured to receive power from said second power source unit and rewrite the power-supply state information recorded on said power-supply state recording unit;
a main memory on which data regarding said NFC device is recorded, the data including at least a use history indicating a history of an operation of said NFC device; and
an NFC memory on which a part of the data recorded on said main memory is mirror-recorded, the part of the data being readable directly by said NFC unit,
wherein said power source switch unit is configured to: (i) switch from said first power source unit to said second power source unit in order to supply power to said NFC unit and said power-supply state recording unit, when said second power source unit supplies power to said system control unit; and (ii) switch from said second power source unit to said first power source unit in order to supply power to said NFC unit and said power-supply state recording unit, when said second power source unit does not supply power to said system control unit,
said system control unit is configured to: (i) rewrite the power-supply state information recorded on said power-supply state recording unit to indicate that said second power source unit is powered ON, when said second power source unit is powered ON from OFF; and (ii) rewrite the power-supply state information recorded on said power-supply state recording unit to indicate that said second power source unit is powered OFF, when said second power source unit is powered OFF from ON,
said NFC memory has a flag indicating whether or not a remaining part of the data recorded on said main memory is recorded on said main memory, the remaining part not being mirror-recorded on said NFC memory, and
said NFC unit is configured to read the remaining part of the data from said main memory, when the flag indicates that the remaining part of the data is recorded on said main memory.

11. A control method of controlling a Near Field Communication (NFC) device that performs NFC with a reader/writer, said control method comprising:
receiving radio waves from the reader/writer by using NFC, by an antenna unit provided in the NFC device;
generating power from the radio waves received in said receiving, by a first power source unit provided in the NFC device;
recording, by a power-supply state recording unit, power-supply state information indicating a power-supply state of a second power source unit, the second power source unit being a drive power source different from the first power source unit and being capable of being powered ON or OFF;

transmitting the power-supply state information to the reader/writer via the antenna unit by using NFC;

switching between the first power source unit and the second power source unit according to the power-supply state of the second power source unit, in order to supply power to be used in at least said transmitting of the power-supply state information and said recording of the power-supply state information;

causing a system control unit to receive power from the second power source unit and rewrite the power-supply state information recorded in said recording;

generating a first clock signal according to the radio waves received in said receiving;

generating a second clock signal to be used for operating the system control unit, from a voltage supplied from the second power source unit; and selecting between the first clock signal and the second clock signal so as to be provided to the power-supply state recording unit, wherein, in said switching, (i) the first power source unit is switched to the second power source unit in order to supply power to be used in said transmitting and said recording of the power-supply state information, when the second power source unit supplies power to the system control unit; and (ii) the second power source unit is switched to the first power source unit in order to supply power to be used in said transmitting and said recording of the power-supply state information, when the second power source unit does not supply power to the system control unit, in said causing, the system control unit is caused to: (i) rewrite the power-supply state information recorded in said recording to indicate that the second power source unit is powered ON, when the second power source unit is powered ON from OFF, and (ii) rewrite the power-supply state information recorded in said recording to indicate that the second power source unit is powered OFF, when the second power source unit is powered OFF from ON, and in said selecting, the first clock signal is selected while the power-supply state recording unit is activated by power supplied from the first power source unit.

12. The control method according to claim 11, further comprising:

controlling the second power source unit to be powered OFF or ON; and controlling the information indicating the power-supply state recorded in said recording, to be updated, wherein, when the NFC device receives a termination request, (i) in said controlling of the second power source unit, the second power source unit is controlled to be powered OFF, and (ii) in said controlling of the information, the information indicating the power-supply state recorded in said recording is updated to indicate that the second power source unit is powered OFF, and when the NFC device receives an activation request, (i) in said controlling of the second power source unit, the second power source unit is controlled to be powered ON, and (ii) in said controlling of the information, the information indicating the power-supply state recorded in said recording is updated to indicate that the second power source unit is powered ON.

* * * * *